US009835798B2

(12) United States Patent
Oka

(10) Patent No.: US 9,835,798 B2
(45) Date of Patent: Dec. 5, 2017

(54) PLANAR OPTICAL WAVEGUIDE DEVICE, POLARIZATION MULTIPLEXING 4-VALUE PHASE MODULATOR, COHERENT RECEIVER, AND POLARIZATION DIVERSITY

(71) Applicant: FUJIKURA LTD., Tokyo (JP)

(72) Inventor: Akira Oka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/418,878

(22) Filed: Jan. 30, 2017

(65) Prior Publication Data

US 2017/0139136 A1    May 18, 2017

Related U.S. Application Data

(63) Continuation of application No. PCT/JP2015/070548, filed on Jul. 17, 2015.

(30) Foreign Application Priority Data

Aug. 14, 2014 (JP) .................... 2014-165190

(51) Int. Cl.
*G02B 6/126* (2006.01)
*G02B 6/27* (2006.01)
(Continued)

(52) U.S. Cl.
CPC ............. *G02B 6/126* (2013.01); *G02B 6/122* (2013.01); *G02B 6/125* (2013.01); *G02B 6/14* (2013.01); *G02B 6/2766* (2013.01)

(58) Field of Classification Search
CPC .................... G02B 6/14; G02B 6/126
See application file for complete search history.

(56) References Cited

U.S. PATENT DOCUMENTS 5,127,081 A    6/1992    Koren et al.
5,165,001 A    11/1992    Takagi et al.
(Continued)

FOREIGN PATENT DOCUMENTS

JP    04-212108 A    8/1992
JP    04-240605 A    8/1992
(Continued)

OTHER PUBLICATIONS

Daoxin Dai et al., "Novel concept for ultracompact polarization splitter-rotator based on silicon nanowires", Optics Express, May 23, 2011, pp. 10940-10949, vol. 19, No. 11.
(Continued)

*Primary Examiner* — Omar R Rojas
(74) *Attorney, Agent, or Firm* — Sughrue Mion, PLLC

(57) ABSTRACT

A planar optical waveguide device includes: a substrate; and an optical waveguide that includes a core and a cladding. The core forms a preceding-stage mode conversion section and a subsequent-stage mode conversion section, the preceding-stage mode conversion section being configured to convert a mode of input light, the subsequent-stage mode conversion section being configured to convert a mode of light output from the preceding-stage mode conversion section. Sectional shapes of the first core portion and the second core portion are not congruent with each other at an input end of the preceding-stage mode conversion section, the sectional shape or size of at least one core is continuously changed along a light waveguide direction, and sectional shapes of the first core portion and the second core portion are congruent with each other at an output end of the preceding-stage mode conversion section.

15 Claims, 57 Drawing Sheets

(51) Int. Cl.
*G02B 6/14* (2006.01)
*G02B 6/122* (2006.01)
*G02B 6/125* (2006.01)

(56) References Cited

U.S. PATENT DOCUMENTS

| | | |
|---|---|---|
| 6,236,784 B1 | 5/2001 | Ido |
| 2003/0219188 A1 | 11/2003 | Doi et al. |
| 2007/0086704 A1 | 4/2007 | Ishikawa et al. |
| 2014/0126855 A1 | 5/2014 | Onishi |
| 2015/0279394 A1 | 10/2015 | Peng |
| 2015/0338577 A1* | 11/2015 | Shi .................. G02B 6/126 385/11 |

FOREIGN PATENT DOCUMENTS

| | | |
|---|---|---|
| JP | 09-178967 A | 7/1997 |
| JP | 2000-121857 A | 4/2000 |
| JP | 2003-329986 A | 11/2003 |
| JP | 2007-114253 A | 5/2007 |
| JP | 2013-068909 A | 4/2013 |
| JP | 2014-092759 A | 5/2014 |
| JP | 2015-184680 A | 10/2015 |

OTHER PUBLICATIONS

Michael G. F. Wilson et al., "Tapered Optical Directional Coupler", IEEE Transactions on Microwave theory and Techniques, Jan. 1975, pp. 85-92, vol. MTT-23, No. 1.

Po Dong et al., "112-Gb/S Monolithic PDM-QPSK Modulator in Silicon", European Conference and Exhibition on Optical Communication, 2012, vol. 1, p. Th.3.B.1.

C. R. Doerr et al., "Packaged Monolithic Silicon 112-Gb/s Coherent Receiver", IEEE Photonics Technology Letters, Jun. 15, 2011, pp. 762-764, vol. 23, No. 12.

Qing Fang et al., "Suspended optical fiber-to-waveguide mode size converter for Silicon photonics", Optics Express, Apr. 12, 2010, pp. 7763-7769, vol. 18, No. 8.

Hiroshi Fukuda et al., "Silicon photonic circuit with polarization diversity", Optics Express, Mar. 31, 2008, pp. 4872-4880, vol. 16, No. 7.

Po Dong et al., "112-Gb/s monolithic PDM-QPSK modulator in silicon", Optics Express, Dec. 10, 2012, pp. B624-B629, vol. 20, No. 26.

Foreign Office Action for JP 2014-165190 dated May 10, 2016.

Foreign Notice of Allowance for JP 2014-165190 dated Oct. 25, 2016.

* cited by examiner

PRIOR ART

PLANAR OPTICAL WAVEGUIDE DEVICE, POLARIZATION MULTIPLEXING 4-VALUE PHASE MODULATOR, COHERENT RECEIVER, AND POLARIZATION DIVERSITY

CROSS REFERENCE TO RELATED APPLICATIONS

This application is a continuation application based on a PCT Patent Application No. PCT/JP2015/070548, filed Jul. 17, 2015, whose priority is claimed on Japanese Patent Application No. 2014-165190, filed on Aug. 14, 2014, the entire content of which are hereby incorporated by reference.

BACKGROUND OF THE INVENTION

Field of the Invention

The present invention relates to a planar optical waveguide device, a polarization multiplexing 4-value phase modulator, a coherent receiver, and a polarization diversity used in optical fiber communication.

Description of the Related Art

In recent years, the amount of information transmitted through optical communications has been steadily increasing. To cope with the increase in the amount of information, measures such as increasing a signal speed or increasing the number of channels based on wavelength multiplexing communication have been developed. Particularly, in the next generation 100 Gbps digital coherent transmission technology for high-speed information communication, in order to double the amount of information per unit time, a polarization multiplexing method for carrying information in two polarizations where electric fields are orthogonal to each other is used.

However, in a modulation method for high-speed communication including polarization multiplexing, an optical modulator having a complicated structure is necessary, which can cause a problem in that the size of an apparatus becomes large and the manufacturing cost increases. In order to solve these problems, research regarding an optical modulator based on a planar optical waveguide using silicon having merits such as easy processing, size reduction due to integration, cost reduction due to mass production, or the like has been performed.

However, polarization multiplexing in such a planar optical waveguide can have the following problems. In general, a planar optical waveguide has an asymmetric shape in a width direction parallel to a substrate and in a height direction perpendicular to the substrate. Thus, a characteristic such as an effective refractive index varies between two types of polarization modes of a mode (hereinafter, referred to as a TE mode) in which a width-directional electric field component is a main component and a mode (hereinafter, referred to as a TM mode) in which a height-directional electric field component is a main component. In many cases, $TE_0$ and $TM_0$ among the two polarization modes are frequently used. Here, $TE_0$ is a mode in which an effective refractive index is largest in the TE mode, and $TM_0$ is a mode in which an effective refractive index is largest in the TM mode.

In a case where an optical modulation operation is performed with respect to these polarization modes in which characteristics are different from each other, it is difficult to perform the optical modulation operation by only using a single planar optical waveguide device. Thus, it is necessary to provide a planar optical waveguide device optimally designed for each polarization mode, which causes a problem in that a large amount of effort is necessary for development of a planar optical waveguide device.

In order to solve the problems, a method for using $TE_0$ as input light to a planar optical waveguide device optimally designed for $TE_0$ and polarization-converting output light thereof into $TM_0$ may be used. Here, the "polarization conversion" refers to conversion from $TE_0$ to $TM_0$ or from $TM_0$ to $TE_0$. In order to perform the optical modulation operation, it is necessary to provide a planar optical waveguide device that performs polarization conversion on a substrate.

In order to perform polarization conversion on a substrate, a technique that combines a conversion between $TE_0$ and $TE_1$ and a conversion between $TE_1$ and $TM_0$ may be used. The invention pays attention to the conversion between $TE_0$ and $TE_1$ among these conversions. Here, $TE_1$ represents a mode having a second largest effective refractive index in the TE mode.

As a related art relating to an optical waveguide device having a function for the conversion between $TE_0$ and $TE_1$, there is an optical waveguide device disclosed in Daoxin Dai and John E. Bowers, "Novel concept for ultracompact polarization splitter-rotator based on silicon nanowires." Optics Express, Vol. 19, Issue. 11, pp. 10940-10949 (2011) (hereinafter, referred to as Non-Patent Document 1).

FIGS. 69A and 69B are diagrams illustrating an optical waveguide device which is a model of a structure disclosed in Non-Patent Document 1. FIG. 69A is a plan view thereof, and FIG. 69B is a sectional view thereof.

The optical waveguide device includes core portions 81 and 82, and a cladding 15. The cladding 15 includes a lower cladding 7 and an upper cladding 6.

The core portions 81 and 82 are linear waveguides, and are disposed in parallel to form a directional coupler. In the directional coupler, $TE_0$ of the core portion 81 and $TE_1$ of the core portion 82 are coupled to perform mode conversion.

In order to efficiently perform mode conversion in the directional coupler, it is necessary to maintain effective refractive indexes in $TE_0$ and $TE_1$ at the same level. Thus, a waveguide structure is adjusted according to each mode.

In this optical waveguide device, in order to maintain the effective refractive indexes in $TE_0$ and $TE_1$ at the same level, the widths of the core portions 81 and 82 are adjusted. Since the widths of the core portions 81 and 82 are different from each other, such a directional coupler is referred to as an "asymmetric directional coupler".

However, the above-described optical waveguide device combines different modes. Thus, even if the condition for "maintaining effective refractive indexes in $TE_0$ and $TE_1$ at the same level" with respect to a specific wavelength is satisfied by adjustment of a waveguide structure (adjustment of the width of a core portion, or the like), a wavelength may deviate from the specific wavelength. Further, in a case where a waveguide structure is changed due to a manufacturing error, deviation occurs between effective refractive indexes of the two modes. Accordingly, conversion efficiency may be lowered.

Accordingly, in the related art, there are problems in that a wavelength band for allowing highly efficient conversion is narrow and stability against a manufacturing error is weak.

Hereinafter, the problems will be described using an asymmetric directional coupler in the related art shown in FIGS. 69A and 69B as an example.

In this example, core portions 81 and 82 are formed of Si (having a refractive index of 3.48), and an upper cladding 6 and a lower cladding 7 are formed of $SiO_2$ (having a refractive index of 1.44). The heights of the core portions 81 and 82 are 220 nm. A gap between the core portions 81 and 82 is 200 nm.

A waveguide which guides light in $TE_0$ which is a mode conversion target and has the core portion 81 having a smaller width is referred to as "waveguide 1", and a waveguide which guides light in $TE_1$ and has the core portion 82 having a larger width is referred to as "waveguide 2".

The width of the core portion 81 is 400 nm. Here, at a wavelength of 1580 nm, the width of the core portion 82 is set to 838 nm so that effective refractive indexes in $TE_0$ of the core portion 81 and $TE_1$ of the core portion 82 are at the same level. Calculation results of the effective refractive indexes are shown in Table 1. A finite element method (FEM) is used for the calculation.

TABLE 1

|  | $TE_0$ of waveguide 1 | $TE_1$ of waveguide 2 |
| --- | --- | --- |
| Effective refractive index | 2.178818 | 2.178940 |

A conversion efficiency of the asymmetric directional coupler is as follows. Here, a conversion efficiency T is a ratio of power of output $TE_1$ to power of input $TE_0$.

[Expression 1]

$$T = F \sin^2(qL) \quad (1)$$

Here, F and q are expressed as the following expressions, respectively.

[Expression 2]

$$F = \frac{1}{1 + \left(\frac{\delta}{\chi}\right)^2} \quad (2)$$

[Expression 3]

$$q = \sqrt{\chi^2 + \delta^2} \quad (3)$$

Here, δ is expressed as the following expression.

[Expression 4]

$$\delta = \frac{\pi}{\lambda} \Delta N \quad (4)$$

Here, L represents the length of an asymmetric directional coupler in a light propagation direction, ΔN represents a difference between effective refractive indexes (difference between effective refractive indexes in Table 1) in $TE_0$ of the waveguide 1 and $TE_1$ of the waveguide 2 in a case where two waveguides are independently present, and λ represents a wavelength. Further, χ represents the strength of coupling of two waveguides, and is referred to as a coupling coefficient.

In the asymmetric directional coupler, even if effective refractive indexes of two modes which are coupling targets match each other by adjusting a waveguide structure such as the width of a core portion or the like at a certain wavelength (1580 nm in this example), if the wavelength is changed, deviation occurs in the effective refractive indexes.

This problem does not occur in a symmetric directional coupler that has the same heights and widths in two cores and handles coupling of the same modes but occurs in an asymmetric directional coupler that handles coupling of different modes.

FIG. 70 is a diagram illustrating a relationship between a wavelength and an absolute value of ΔN in an optical waveguide device in this example. It can be understood from FIG. 70 that the absolute value of ΔN becomes larger as the wavelength deviates farther from 1580 nm.

Since the conversion efficiency T is lowered according to the deviation of the wavelength, from Expression (1), (2), and (4), highly efficient conversion is not preferable in a wide wavelength band.

Then, the conversion efficiency with respect to the wavelength (1520 nm to 1640 nm) is calculated based on Expression (1) to Expression (4). The result is shown in FIG. 71. Here, L in Expression (1) is a value in which a minimum value of the conversion efficiency in the wavelength band of 1520 nm to 1640 nm becomes a maximum, and in this case, L is 16.1 μm.

Referring to FIG. 71, the conversion efficiency becomes lower as the wavelength becomes more distant from the vicinity of 1580 nm, and becomes equal to or greater than approximately −0.94 dB in the wavelength band of 1520 nm to 1640 nm. This is because the absolute value of ΔN increases with respect to the above-described wavelength.

Subsequently, a relationship between a manufacturing error and conversion efficiency will be described. If a waveguide structure is changed, the level of light confinement is changed, and an effective refractive index associated therewith is changed. Thus, even if a waveguide structure is designed so that effective refractive indexes of two modes which are coupling targets are at the same level at a certain wavelength, the waveguide structure is changed due to a manufacturing error, and the effective refractive indexes of two modes deviate from each other.

Thus, the conversion efficiency is lowered as in the above description regarding the wavelength dependency.

In order to confirm this problem, a manufacturing error of the width of a core portion generated due to lithography or etching will be described as an example.

Normally, a manufacturing error locally occurs in two core portions 81 and 82 by the same amount (δ), as shown in FIG. 72, with respect to design values of the widths of the core portions (the widths of core portions regulated by a mask, for example, $W_{81}$ and $W_{82}$ in FIG. 72). In this example, it is assumed that that positions on both side edges of respective cores are changed inward or outward by δ/2, respectively.

Hereinafter, a case where a manufacturing error δ (=−30 nm) occurs with respect to the core portion 81 (design value: width of 400 nm) and the core portion 82 (design value: width of 838 nm) of the optical waveguide device shown in FIGS. 69A and 69B is considered. FIG. 73 is a diagram illustrating a relationship between a wavelength and an absolute value of ΔN.

It can be understood from FIG. 73 that effective refractive indexes in $TE_0$ of the core portion 81 and $TE_1$ of the core portion 82 significantly deviate from each other, and thus, the absolute value of ΔN becomes large. The conversion efficiency is calculated based on this result. L employs the above-described value (L=16.1 μm). A result thereof is shown in FIG. 74.

It can be understood from FIG. 74 that since the absolute value of ΔN becomes large due to the manufacturing error, the conversion efficiency is significantly lowered. Specifically, the conversion efficiency becomes equal to or greater than about −5.16 dB at 1580 nm, and becomes equal to or greater than −7.32 dB in a range of 1520 nm to 1640 nm. In this view, it can be said that an asymmetric directional coupler is weak against a manufacturing error.

In this way, in an optical waveguide device including an asymmetric directional coupler in the related art, there are problems in that a wavelength band in mode conversion is narrow and stability against a manufacturing error is weak.

In consideration of the above-described problems, an object of the invention is to provide a planar optical waveguide device capable of securing high conversion efficiency in a wide wavelength band, and securing efficient mode conversion even in a case where a waveguide structure is changed due to a manufacturing error.

SUMMARY

According to a first aspect of the invention, a planar optical waveguide device includes: a substrate; and an optical waveguide that includes a core and a cladding, the core including a first core portion and a second core portion that are disposed in parallel on the substrate, the cladding having a refractive index smaller than that of the core. The core forms a preceding-stage mode conversion section and a subsequent-stage mode conversion section, the preceding-stage mode conversion section being configured to convert a mode of input light, the subsequent-stage mode conversion section being configured to convert a mode of light output from the preceding-stage mode conversion section. Sectional shapes of the first core portion and the second core portion are not congruent with each other at an input end of the preceding-stage mode conversion section, the sectional shape or size of at least one core is continuously changed along a light waveguide direction, and sectional shapes of the first core portion and the second core portion are congruent with each other at an output end of the preceding-stage mode conversion section. The subsequent-stage mode conversion section includes an output portion to which the first core portion and the second core portion are connected with a gap being provided therebetween in a width direction. At a connection end at which the first core portion and the second core portion are connected to the output portion, the center of the output portion in the width direction and the center of a width directional range including the first core portion, the second core portion, and a gap between the first core portion and the second core portion match each other.

At the connection end, the width of the output portion may be larger than a sum of the width of the first core portion, the width of the second core portion, and the gap between the first core portion and the second core portion.

The first core portion, the second core portion and the output portion may have rectangular sections vertical to the light waveguide direction.

In the preceding-stage mode conversion section, the heights of the first core portion and the second core portion may be same, and the width of the first core portion having a larger section than that of the second core portion at the input end continuously may decrease along the light waveguide direction so that the sectional shapes of the first core portion and the second core portion are congruent with each other at the output end.

The core may include a slab portion that extends in the width direction of the first core portion and the second core portion, and the slab portion may have a height dimension smaller than those of the first core portion and the second core portion, may be provided at least between the first core portion and the second core portion, and may be formed to connect the first core portion and the second core portion.

The slab portion may have an outer extension region that is formed to extend outward in the width direction from each of the first core portion and the second core portion.

The slab portion may have an outer extension region that is formed to extend outward in the width direction from the output portion.

The subsequent-stage mode conversion section may be configured so that an output-side core portion having a width smaller than that of the output portion is connected to a rear end of the output portion to form a multi-mode interferometer.

The preceding-stage mode conversion section may be capable of converting $TE_0$ into an odd mode which is a super mode of $TE_0$, and the subsequent-stage mode conversion section may be capable of converting the odd mode which is the super mode into TE1.

The core may include a bent waveguide formed by bending at least one of the first core portion and the second core portion in a planar view on an input side of the preceding-stage mode conversion section, and in the bent waveguide, the first core portion and the second core portion may become closer to each other as a distance to the preceding-stage mode conversion section becomes shorter.

The planar optical waveguide device may further include: an intermediate core portion that is provided between the preceding-stage mode conversion section and the subsequent-stage mode conversion section and connects the preceding-stage mode conversion section and the subsequent-stage mode conversion section.

The core may be formed of Si, and the cladding may be formed of $SiO_2$.

The planar optical waveguide device may further include: a high-order polarization-converting section that is connected to an output-side of the subsequent-stage mode conversion section and is capable of converting $TE_1$ obtained in the subsequent-stage mode conversion section into $TM_0$.

According to a second aspect of the invention, a polarization multiplexing 4-value phase modulator is provided including the planar optical waveguide device.

According to a third aspect of the invention, a coherent receiver is provided including the planar optical waveguide device.

According to a fourth aspect of the invention, a polarization diversity is provided including the planar optical waveguide device.

The planar optical waveguide device according to the above-described aspect has a configuration in which a preceding-stage mode conversion section (super mode-generating element) and a subsequent-stage mode conversion section (matching coupling element) are combined.

In the super mode-generating element having a structure (for example, a tapered waveguide) in which a waveguide structure is changed in a light waveguide direction, input $TE_0$ is converted into an odd mode which is a super mode of $TE_0$. In the matching coupling element, the odd mode is converted into $TE_1$ by using similarity of electric field distributions of the odd mode which is the super mode of $TE_0$ and $TE_1$ of a rectangular waveguide.

Since the super mode-generating element has a configuration in which shapes and sizes of sections of two core portions at an output end are the same (congruent with each other), the super mode-generating element is not easily affected by a manufacturing error and also has small wavelength dependency.

Since even in a case where a wavelength changes or a waveguide structure is changed due to a manufacturing error, electric field distributions of both of the odd mode and $TE_1$ are changed, the matching coupling element is not easily affected by wavelength change or a manufacturing error.

Accordingly, it is possible to perform conversion over a wide wavelength band with high efficiency, and to secure efficient mode conversion even in a case where a waveguide structure is changed due to a manufacturing error.

BRIEF DESCRIPTION OF THE DRAWINGS

FIG. 64C is a sectional view of an ending portion of the high-order polarization conversion element, illustrating the example of the planar optical waveguide device using the high-order polarization conversion element.

FIG. 64D is a sectional view of a start portion of the high-order polarization conversion element, illustrating the example of the planar optical waveguide device using the high-order polarization conversion element.

FIG. 65 is a plan view illustrating an example of the planar optical waveguide device using the high-order polarization conversion element.

FIG. 66 is a schematic view illustrating an example of a DP-QPSK modulator.

FIG. 67 is a schematic view illustrating an example of a polarization diversity coherent receiver.

FIG. 68 is a schematic view illustrating an example of a polarization diversity technique.

FIG. 69A is a plan view illustrating an example of a planar optical waveguide device in the related art.

FIG. 69B is a sectional view illustrating the example of the planar optical waveguide device in the related art.

FIG. 70 is a graph illustrating a relationship between a wavelength of light and an absolute value of $\Delta N$.

FIG. 71 is a graph illustrating a relationship between a wavelength of light and conversion efficiency.

FIG. 72 is a diagram illustrating a manufacturing error of the width of a core portion.

FIG. 73 is a graph illustrating a relationship between a wavelength and an absolute value of $\Delta N$ in a case where the width of a core portion is changed.

Figure 74:
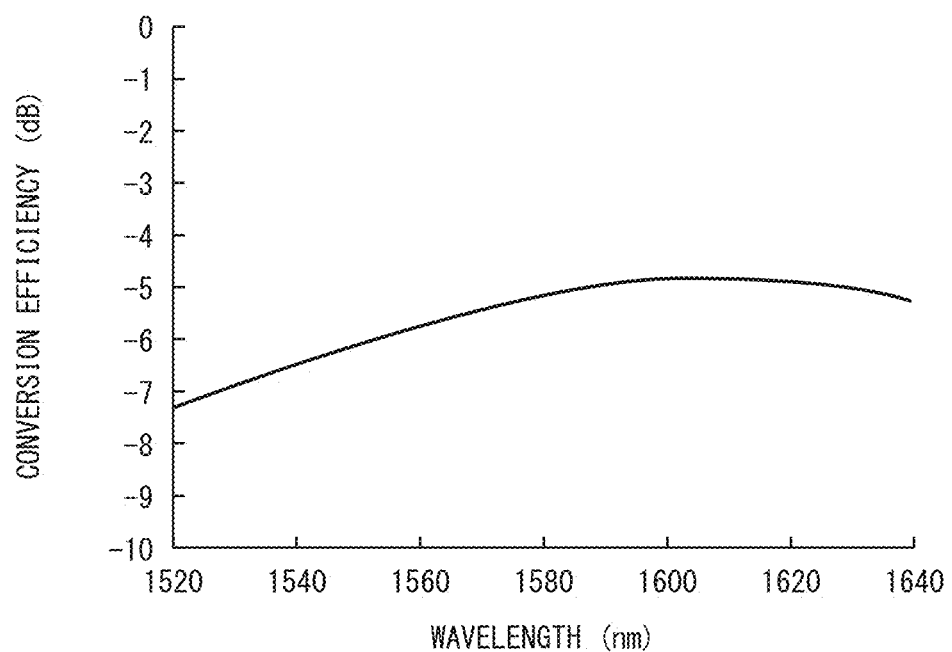

FIG. 74 is a graph illustrating a relationship between a wavelength and conversion efficiency in a case where the width of a core portion is changed.

DETAILED DESCRIPTION OF THE PREFERRED EMBODIMENTS

<Overview of Present Embodiment>

A planar optical waveguide device according to an embodiment of the invention has a configuration in which a preceding-stage mode conversion section (super mode-generating element) and a subsequent-stage mode conversion section (matching coupling element) are combined.

In the super mode-generating element having a structure (for example, a tapered waveguide) in which a waveguide structure changes in a light waveguide direction, $TE_0$ which is input is converted into an odd mode which is a super mode of $TE_0$. In the matching coupling element, the odd mode is converted into $TE_1$.

The super mode-generating element converts the mode of $TE_0$ into the odd mode by continuously changing the waveguide structure in the light waveguide direction, using a so-called adiabatic change phenomenon. Thus, if a waveguide (for example, a tapered waveguide) of such a structure is set to be sufficiently long, it is possible to enhance conversion efficiency to the odd mode.

The matching coupling element uses electric field distribution similarity between the odd mode which is the super mode of $TE_0$ and $TE_1$ of a rectangular waveguide, to thereby make it possible to enhance conversion efficiency to $TE_1$ from the odd mode.

Since the super mode-generating element has a configuration in which shapes and sizes of sections of two core portions at an output end are the same (congruent), the super mode-generating element is not easily affected by a manufacturing error and also has small wavelength dependency.

Since even in a case where a wavelength changes or a waveguide structure is changed by a manufacturing error, electric field distributions of both of the odd mode and $TE_1$ are changed, the matching coupling element is not easily affected by wavelength change or a manufacturing error.

Accordingly, in the present embodiment, it is possible to perform conversion over a wide wavelength band with high efficiency, and to secure efficient mode conversion even in a case where a waveguide structure is changed due to a manufacturing error.

Hereinafter, the planar optical waveguide device according to the present embodiment will be described in detail.

First, a specific example of the planar optical waveguide device according to the present embodiment will be presented. Then, a conversion principle between $TE_0$ and the odd mode in the super mode-generating element will be described with reference to the specific example. Thereafter, a conversion principle between the odd mode and $TE_1$ in the matching coupling element will be described, and then, effects of the invention will be described.

<Planar Optical Waveguide Device>

Figure 1A:
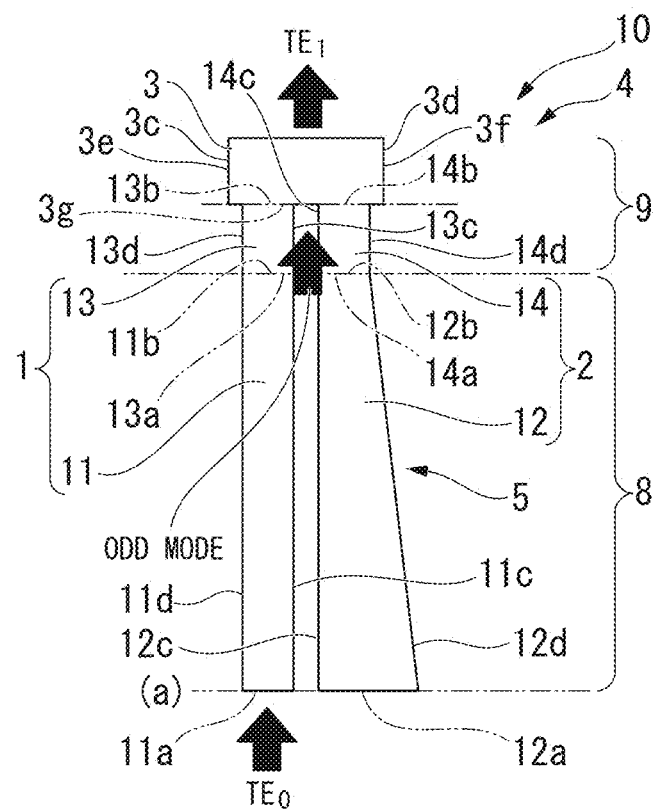
FIG. 1A is a plan view illustrating a planar optical waveguide device according to a first embodiment of the invention.

A structure of a planar optical waveguide device 10 according to a first embodiment of the invention will be described with reference to FIGS. 1A and 1B. FIG. 1A is a plan view illustrating the planar optical waveguide device 10, and FIG. 1B is a sectional view at a sectional position (a) in FIG. 1A, which shows a cross section perpendicular to a light waveguide direction.

In the cross section, a dimension in a direction where a core portion 1 and a core portion 2 face each other (a direction perpendicular to the light waveguide direction) is referred to as a width, and a dimension in a direction perpendicular to the width direction (a direction vertical to a substrate S) is referred to as a height.

Figure 1B:
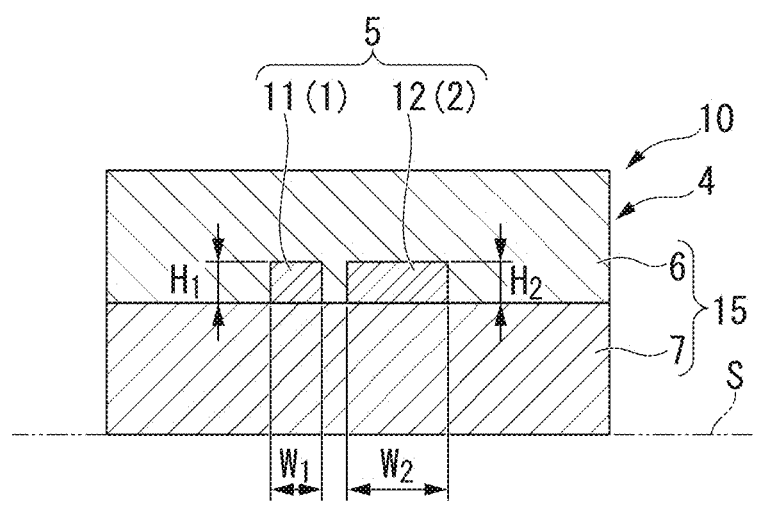
FIG. 1B is a sectional view at a sectional position (a) of the planar optical waveguide device according to the first embodiment of the invention.

As shown in FIGS. 1A and 1B, the planar optical waveguide device 10 (mode conversion element) includes an optical waveguide 4 that includes a core 5 and a cladding 15. The optical waveguide 4 is formed on the substrate S.

The cladding 15 is formed of a material having a refractive index which is lower than that of the core 5, and is formed to cover the core 5. The cladding 15 includes an upper cladding 6 and a lower cladding 7. The upper cladding 6 is provided on the core 5 and the lower cladding 7.

The lower cladding 7 is formed of $SiO_2$, for example. The upper cladding 6 is formed of $SiO_2$ or an air layer, for example.

The core 5 is formed of a material having a refractive index which is higher than that of the cladding 15, and includes a pair of core portions 1 and 2 which are disposed in parallel with each other, and an output portion 3 provided in a subsequent-stage (output-side) of the core portions 1 and 2.

The core portions 1 and 2 and the output portion 3 are preferably formed of Si (silicon).

Hereinafter, the core portion 1 may be referred to as a first core portion 1, and the core portion 2 may be referred to as a second core portion 2.

The invention is not limited to a silicon waveguide in which a core is formed of Si, and may be applied to an optical waveguide using a core formed of SiO2, for example, an optical waveguide such as a planar lightwave circuit (PLC).

As shown in FIG. 1B, sectional shapes of the core portions 1 and 2 may be rectangular. The sectional shapes of the core portions 1 and 2 are not limiting.

It is preferable that heights $H_1$ and $H_2$ of the core portions 1 and 2 be equal to each other. If the heights of the core portions 1 and 2 are equal to each other, it is possible to reduce the number of times of etching to the minimum when forming the core.

As shown in FIG. 1A, the core 5 includes a preceding-stage mode conversion section 8 (super mode-generating element) that converts the mode of light that propagates through the core portions 1 and 2, and a subsequent-stage mode conversion section 9 (matching coupling element) that converts the mode of light passed through the preceding-stage mode conversion section 8.

The planar optical waveguide device 10 may be manufactured by processing a silicon-on-insulator (SOI) substrate. For example, an $SiO_2$ layer of the SOI substrate may be formed as a lower cladding, and an Si layer thereof may be formed as a core through a lithography/etching process. After formation of the core, an $SiO_2$ layer may be provided as an upper cladding.

<Principle of Super Mode-Generating Element>

A basic principle of the super mode-generating element will be described.

In the super mode-generating element, $TE_0$ of one waveguide among two contiguous waveguides is gradually mode-coupled with $TE_0$ of the other waveguide, and thus, $TE_0$ is converted into the odd mode which is the super mode of $TE_0$.

The two waveguides in the planar optical waveguide devices are respectively referred to as a waveguide 1 and a waveguide 2. The waveguide 1 is formed so that the width of a core portion is smaller than the width of a core portion of the waveguide 2 at an input end.

The waveguide refers to a path which guides light and is formed by a core and a cladding.

In the preceding-stage mode conversion section 8 of the planar optical waveguide device 10 shown in FIGS. 1A and 1B, the waveguide 1 is formed by a core portion 11 and a cladding portion that covers the core portion 11. The waveguide 2 is formed by a core portion 12 and a cladding portion that covers the core portion 12.

The "mode coupling" refers to a phenomenon that with respect to light that propagates through a core portion of one waveguide in a certain mode, a part of the light leaks out from the core portion through which the light propagates and moves to the other waveguide.

In order to efficiently perform the mode coupling, it is necessary that effective refractive indexes of respective coupling target modes in waveguides are at the same level. The "same level" means that a difference between effective refractive indexes is smaller than χ×wavelength/π using a coupling coefficient χ (which will be described later). A state where this condition is satisfied is referred to as "phase matching". Here, in a case where the shapes and sizes of the cores are the same (congruent), since effective refractive indexes of light components in the same mode that propagate through the core portions become the same, phase-matching is constantly achieved. The constant phase matching is established since even when a wavelength changes, the shape of the core is not changed. In addition, even in a case where manufacturing errors of the same amount occur in two core portions, such as a case where the same variation (variation in width or height) occurs in two core portions, since a congruent relationship of the core is not broken, phase matching is not broken.

Figure 2A:
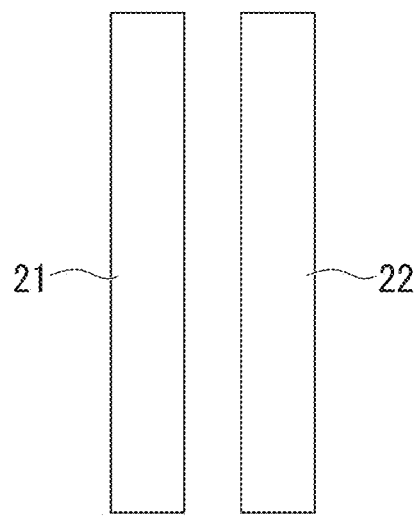
FIG. 2A is a plan view illustrating an example of an optical waveguide device.
Figure 2B:
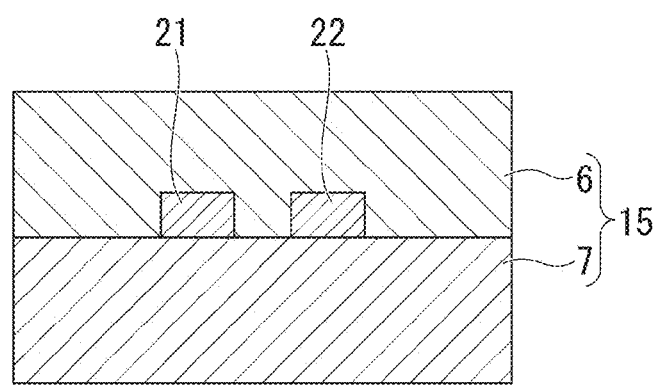
FIG. 2B is a sectional view illustrating an example of the optical waveguide device.

FIGS. 2A and 2B show an optical waveguide device having core portions 21 and 22 having the same width.

As shown in FIGS. 2A and 2B, when both $TE_0$ and $TE_0$ are mode-coupled between contiguous waveguides, in a case where heights of core portions are equal to each other, since the shapes of the cores become the same by setting the widths of the core portions to be the same, the phase-matching condition is satisfied. This condition is constantly satisfied even when a wavelength changes.

Furthermore, in a structure in which the widths of the core portions are equal to each other, even in a case where manufacturing errors of the same amount occur in two core portions, such as a case where the same variation (variation in width or height) occurs in two core portions, phase matching is not broken.

Figure 3A:
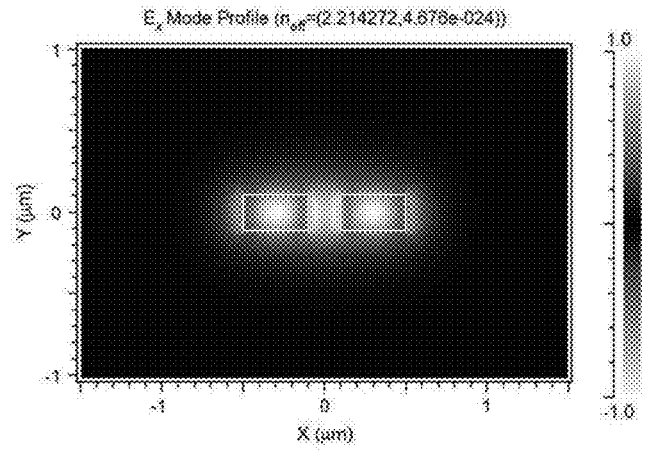
FIG. 3A is a diagram illustrating a simulation result of an electric field distribution ($E_x$ component) in an even mode in the optical waveguide device shown in FIGS. 2A and 2B.
Figure 3B:
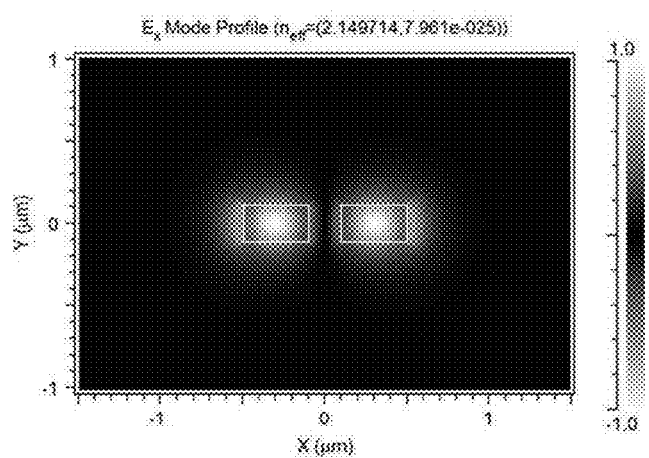
FIG. 3B is a diagram illustrating a simulation result of an electric field distribution ($E_x$ component) in an odd mode in the optical waveguide device shown in FIGS. 2A and 2B.
Figure 3C:
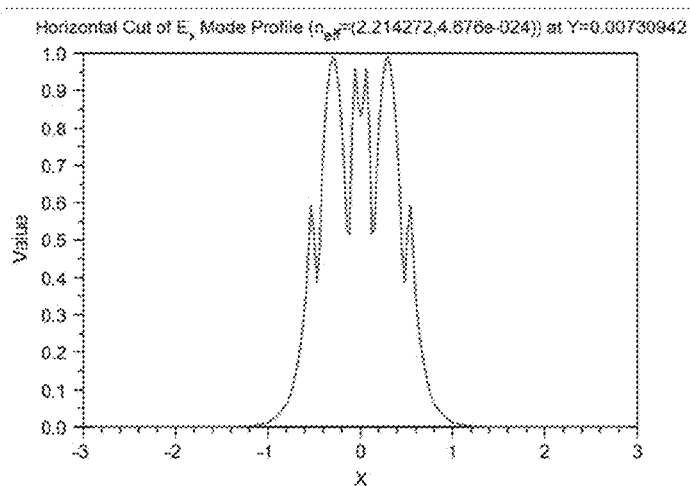
FIG. 3C is a graph of the electric field distribution ($E_x$ component) in the even mode in the optical waveguide device shown in FIGS. 2A and 2B.
Figure 3D:
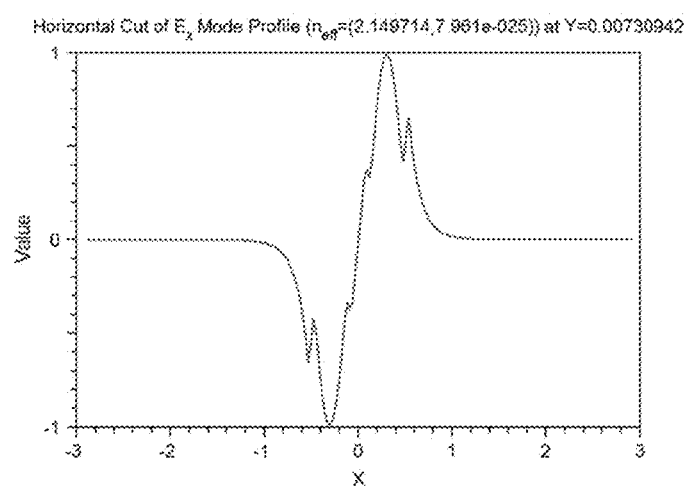
FIG. 3D is a graph of the electric field distribution ($E_x$ component) in the odd mode in the optical waveguide device shown in FIGS. 2A and 2B.

Here, both $TE_0$ and $TE_0$ in waveguides which are contiguous to each other are mode-coupled. Thus, modes in which light is guided through cross sections in which two core portions are disposed in parallel are divided into a mode (referred to as an even mode) in which $TE_0$ and $TE_0$ of respective waveguides are coupled and electric field components are symmetric to each other in a width direction, as shown in FIGS. 3A and 3C, and a mode (referred to as an odd mode) in which $TE_0$ and $TE_0$ of respective waveguides are coupled and electric field components are asymmetric to each other in a width direction, as shown in FIGS. 3B and 3D. These modes are collectively referred to as a super mode of $TE_0$ (or simply a super mode).

When phase matching of respective modes which are coupling targets in contiguous waveguides is established, the lengths of waveguides necessary for movement of light leaked out from one waveguide to the other waveguide to form a super mode depend on the coupling coefficient χ which represents the strength of mode coupling. Here, χ is expressed as follows.

[Expression 5]

$$\chi \propto \int_{-\infty}^{\infty}\int_{-\infty}^{\infty}(N_2-N_1^2)E_1^* \cdot E_2 dxdy \text{ or } \int_{-\infty}^{\infty}\int_{-\infty}^{\infty}(N_2-N_2^2)E_1 \cdot E_2^* dxdy \quad (5)$$

Here, $E_i$ (i=1, 2) represents electric field vectors of modes of coupling targets that are guided by two contiguous waveguides i (i=1, 2), N represents a refractive index distribution when two waveguides are contiguous, $N_i$ represents a refractive index distribution when a waveguide i is independently present, and coordinates x and y represent a width direction and a height direction, respectively.

It can be understood from Expression (5) that since inner products of electric fields of both modes are integrated in the waveguide 1 or the waveguide 2, coupling between the waveguides becomes stronger as light leaked out from a core portion becomes larger. As the coupling coefficient χ becomes larger, it is possible to generate the super mode at a shorter distance.

<Specific Example of Super Mode-Generating Element>

The preceding-stage mode conversion section 8 which is a specific example of a super mode-generating element will be described with reference to FIGS. 1A and 1B.

Ranges of the core portions 1 and 2 where the preceding-stage mode conversion section 8 is configured are respectively referred to as a preceding-stage first core portion 11 and a preceding-stage second core portion 12.

Input ends 11a and 12a (preceding-stage input ends) of the core portions 11 and 12 are end portions at which light is input to the core portions 11 and 12, respectively. Output ends 11b and 12b (preceding-stage output ends) are end portions at which light is output from the core portions 11 and 12.

It is preferable that the preceding-stage first core portion 11 linearly extend in a planar view and the width and the height thereof be uniform in a length direction (light waveguide direction). In the example shown in the figure, since the width and the height are uniform in the length direction, in the preceding-stage first core portion 11, a sectional shape (the shape of a cross section vertical to the light waveguide direction) is also uniform over an entire length thereof.

An inner edge 11c (side edge on the side of the core portion 12 among both side edges of the core portion 11) and an outer edge 11d (side edge opposite to the inner edge 11c) of the preceding-stage first core portion 11 are linearly formed, respectively.

It is preferable that the sectional shapes of the core portions 11 and 12 be rectangular.

A waveguide structure of the preceding-stage second core portion 12 is continuously changed from the input end 12a to the output end 12b.

In order to change the waveguide structure in the light waveguide direction, it is preferable that the width of the core portion be changed along the light waveguide direction.

Since the width of the core portion is related to light confinement to the core portion, it is possible to arbitrarily adjust an effective refractive index in a mode of light that is guided by the core portion by changing the width.

A method for changing the waveguide structure may include a method for changing the height of the core portion. On the other hand, a method for changing the width of the core portion in the length direction of the core portion while maintaining the height of the core portion to be uniform is preferable since the core portion can be manufactured by one time of etching in processing of an SOI substrate.

An inner edge 12c of the preceding-stage second core portion 12 (side edge on the side of the core portion 11 among both side edges of the core portion 12) is formed in a linear shape which is parallel to the inner edge 11c of the preceding-stage first core portion 11.

An outer edge 12d of the preceding-stage second core portion 12 (side edge opposite to the inner edge 12c) is inclined and formed in a linear shape to gradually approach the inner edge 12c from the input end 12a to the output end 12b.

Thus, the preceding-stage second core portion 12 is formed in a tapered shape in which the width (width $W_2$ in FIG. 1B) continuously decreases from the input end 12a to the output end 12b at a constant rate.

Since the width of the preceding-stage second core portion 12 gradually decreases, the size of a cross section thereof continuously decreases from the input end 12a to the output end 12b at a constant rate.

In the present embodiment, in the input ends 11a and 12a, since the width of the second core portion 12 (width $W_2$ in FIG. 1B) is larger than the width (width $W_1$ in FIG. 1B) of the first core portion 11, the cross section of the core portion 12 is larger than the cross section of the core portion 11. That is, a sectional area of the core portion 12 is larger than a sectional area of the core portion 11.

At the output ends 11b and 12b, the widths of the core portion 11 and 12 are equal to each other as the second core portion 12 is tapered. Thus, at the output ends 11b and 12b, the shapes and sizes of the cross sections of the core portions 11 and 12 are equal to each other.

The core portions 11 and 12 are separated from each other. A gap between the core portions 11 and 12 may be set to be uniform from the input ends 11a and 12a to the output ends 11b and 12b.

As long as the sectional shapes at the input ends 11a and 12a are not congruent with each other and the shape or size of a cross section of at least one core continuously changes along the light waveguide direction so that the sectional shapes of the core portions 11 and 12 are congruent with each other at the output ends 11b and 12b, the structure of the core portions 11 and 12 is not limited to the example shown in the figure.

For example, a structure in which the size of a core portion having a small cross section at an input end continuously increases in the light waveguide direction so that sectional shapes of two core portions become congruent with each other at output ends may be used.

Here, the "continuous change" means that the cross sections of the core portions 11 and 12 are changed to such a degree that there is no rapid change in the structures of the core portions 11 and 12 and, for example, such a non-continuous uneven portion as to form a step difference portion is not generated on any outer surface of the core portions.

Hereinafter, the preceding-stage mode conversion section 8 will be more specifically described with reference to FIGS. 4A to 4D.

Figure 4A:
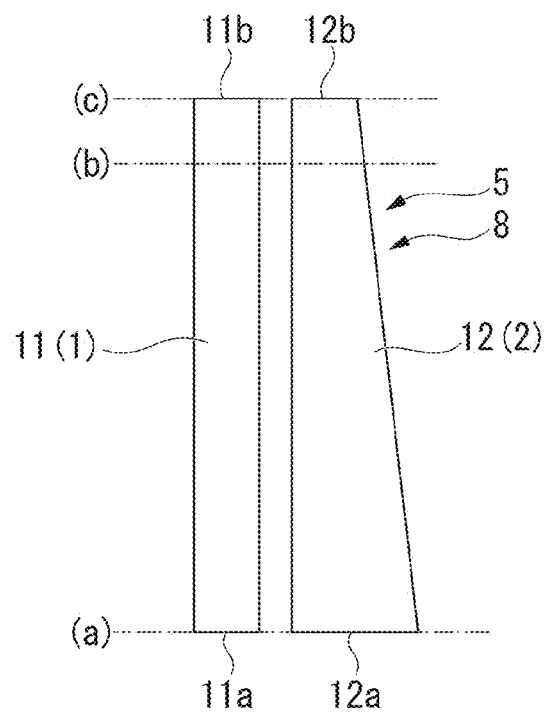
FIG. 4A is a plan view illustrating a structure of a preceding-stage mode conversion section.
Figure 4B:
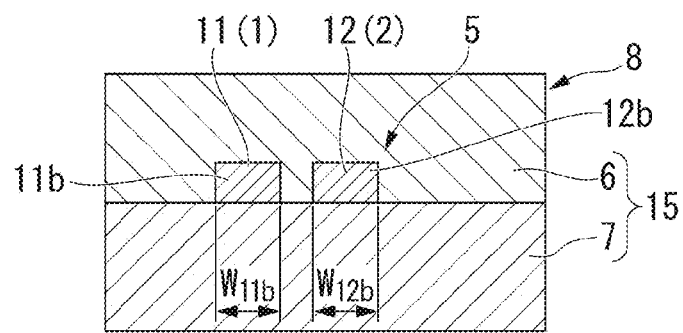
FIG. 4B is a sectional view at a sectional position (c), illustrating the structure of the preceding-stage mode conversion section.
Figure 4C:
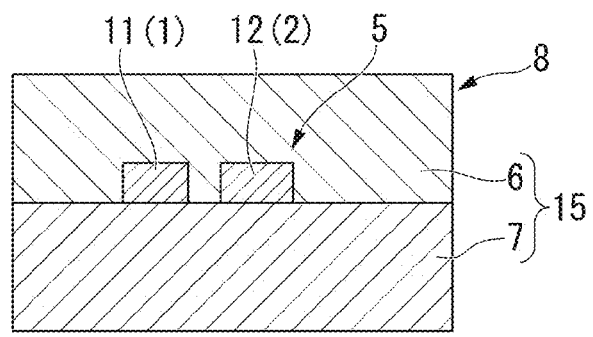
FIG. 4C is a sectional view at a sectional position (b), illustrating the structure of the preceding-stage mode conversion section.
Figure 4D:
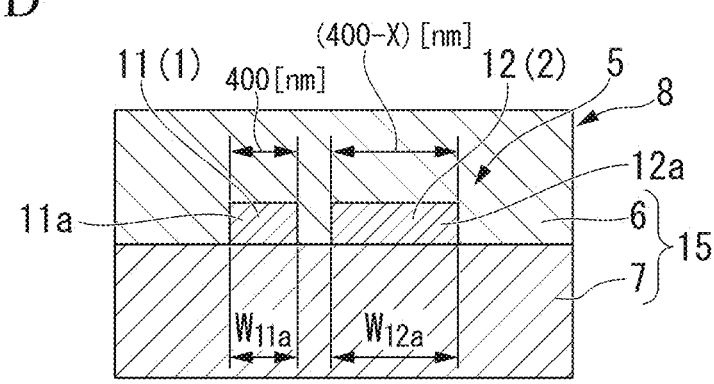
FIG. 4D is a sectional view at a sectional position (a), illustrating the structure of the preceding-stage mode conversion section.

FIGS. 4A to 4D are diagrams illustrating the preceding-stage mode conversion section 8. FIG. 4A is a plan view thereof, FIG. 4B is a sectional view at a sectional position (c) in FIG. 4A, FIG. 4C is a sectional view at a sectional position (b), and FIG. 4D is a sectional view at a sectional position (a).

The core portion 11 (core portion 1) and the core portion 12 (core portion 2) are formed of Si (having a refractive index of 3.48 (at a wavelength of 1580 nm)), and the upper cladding 6 and the lower cladding 7 are formed of $SiO_2$ (having a refractive index of 1.44 (at the wavelength of 1580 nm)). Further, the heights of the core portions 11 and 12 (core portions 1 and 2) are 220 nm. The gap between the core portions 11 and 12 (core portions 1 and 2) is 200 nm.

As shown in FIG. 4D, the width of the core portion 11 (core portion 1) is 400 [nm], and the width of the core portion 12 (core portion 2) is 400−X [nm] (−200≤X≤0). X is linearly changed from −200 to 0, from the input end 12a to the output end 12b.

Thus, the core portion 12 (core portion 2) is formed in a tapered shape so that the width gradually decreases from the input end 12a (X=−200) to the output end 12b (X=0).

FIG. 4C shows a cross section at an intermediate position (X=−20) between the input ends 11a and 12a and the output ends 11b and 12b.

In the super mode-generating element, based on the above-described phase-matching condition, core shapes of contiguous waveguides are set not to be congruent with each other at input ends. Thus, the phase-matching condition is broken. On the other hand, at output ends, the phase-matching condition is satisfied since the core shapes of contiguous waveguides are congruent with each other.

Further, by continuously changing the shape or size of the core portion along the light waveguide direction (that is, by forming the core portion in a tapered shape), phase matching is continuously performed from the input ends to the output ends.

In the example illustrated in FIGS. 4A and 4D, at the input ends 11a and 12a, the width (width $W_{12a}$ in FIG. 4D) of the core portion 12 (core portion 2) is larger than the width (width $W_{11a}$ in FIG. 4D) of the core portion 11 (core portion 1). Thus, the cross section of the core portion 12 is formed to be larger than the cross section of the core portion 11. Thus, phase matching is not established, and mode coupling is not nearly performed.

On the other hand, at the output ends 11b and 12b, the widths (widths $W_{11b}$ and $W_{12b}$ in FIG. 4B) of the core portions 11 and 12 (core portions 1 and 2) are equal to each other, and thus, the shapes and sizes of cross sections of the core portions 11 and 12 are equal to each other. Thus, phase matching is established.

Since the core portion 12 is formed in a tapered shape, phase matching is gradually performed along the light waveguide direction from the input end to the output end, and as a result, mode coupling is progressed. Thus, by sufficiently increasing the length (taper length) of the tapered waveguide (core portion 12), it is possible to convert $TE_0$ input to the waveguide 1 into the odd mode with almost no loss.

As described above, the lengths of waveguides necessary for movement of light leaked out from one waveguide to the other waveguide to form a super mode depend on the coupling coefficient $\chi$. Thus, as the coupling coefficient $\chi$ becomes larger, mode conversion may be performed with higher accuracy using shorter waveguides (shorter device length).

A method for adjusting an effective refractive index by changing the width of a waveguide employs a phenomenon that as the size of the waveguide becomes larger, confinement of light in a core portion becomes larger, and thus, the influence of a refractive index of the core portion more strongly acts and an effective refractive index becomes larger.

This principle will be more specifically described with reference to the above-described specific example.

Figure 5:
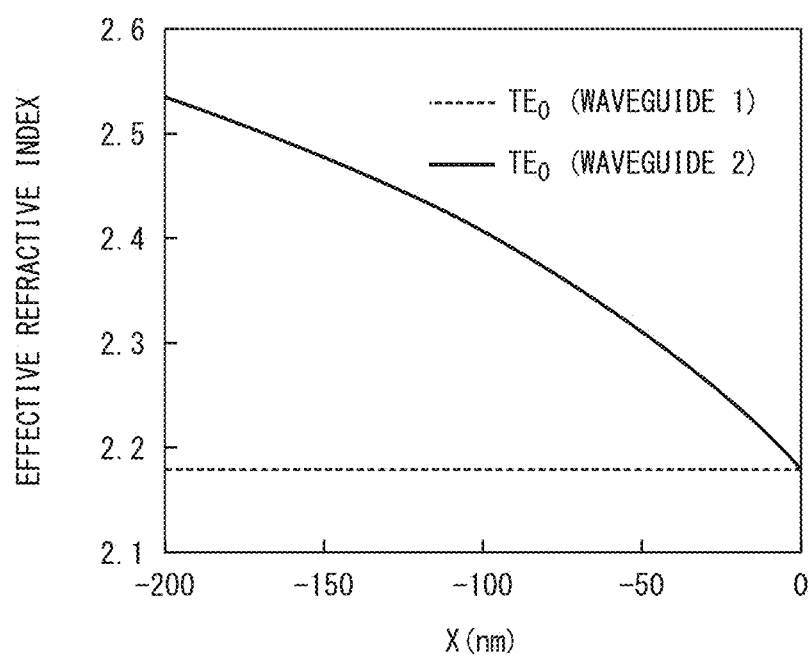
FIG. 5 is a diagram illustrating effective refractive indexes in a case where two waveguides are independently present.

In order to check that it is possible to break the phase-matching condition at input ends by changing the width of a core portion (that is, by tapering a waveguide) in a light waveguide direction, mode effective refractive indexes in a case where waveguides 1 and 2 are independently present were calculated. A result thereof is illustrated in FIG. 5. A wavelength was set to 1580 nm.

It can be understood from FIG. 5 that effective refractive indexes of $TE_0$ of the waveguide 1 and $TE_0$ of the waveguide 2 are the same and phase matching is established when X=0.

As X is separated from 0, deviation occurs in the effective refractive indexes in $TE_0$ and $TE_0$ of the waveguides 1 and 2, the phase-matching condition is broken.

The reason why the effective refractive index in $TE_0$ of the waveguide 1 is smaller than the effective refractive index in $TE_0$ of the waveguide 2 in the range of $-200 \leq X < 0$ is that the width of the core portion in the waveguide 1 is smaller than that of the waveguide 2.

Figure 6:
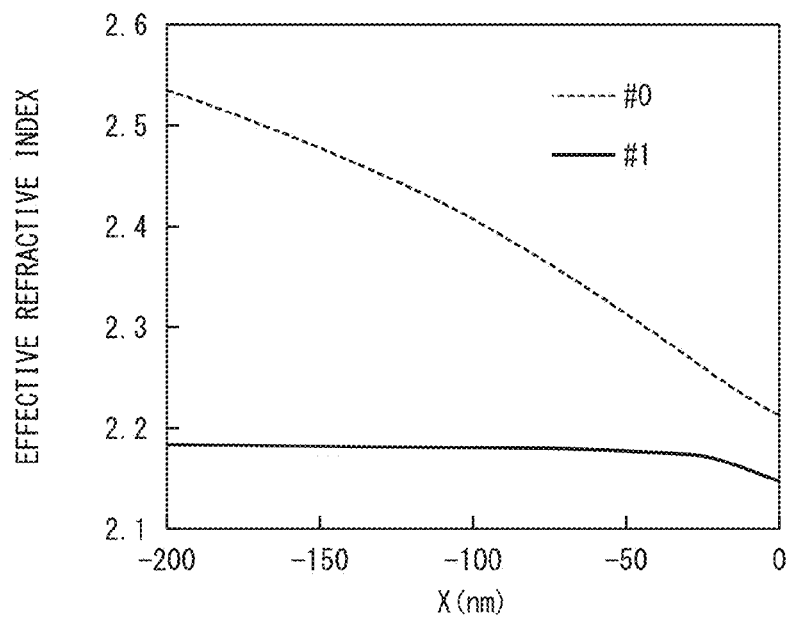
FIG. 6 is a diagram illustrating effective refractive indexes in a case where two waveguides are contiguous to each other.

Subsequently, FIG. 6 illustrates effective refractive indexes in modes in a case where the waveguides 1 and 2 are contiguous to each other.

0 and #1 represent effective refractive indexes in modes in which effective refractive indexes are largest and second largest, respectively, among modes on cross sections of two waveguides.

Compared with FIG. 5 illustrating the effective refractive indexes in a case where the waveguides are independently present, in FIG. 6, #0 and #1 do not match and are separated from each other when X=0.

This is because two modes mutually act due to mode coupling to form a mixed mode (super mode) since the phase-matching condition is satisfied between $TE_0$ of the waveguide 1 and $TE_0$ of the waveguide 2.

If X is separated from 0, since the phase-matching condition is not satisfied, such a mutual action does not occur, and the same mode distribution as in a case where the waveguides are independently present is obtained. As a result, effective refractive indexes do not greatly change compared with a case where the waveguides are independently present. When X=0, the mode #0 becomes an even mode, and the mode #1 becomes an odd mode.

In a structure in which a structure of a waveguide is gradually changed in a light waveguide direction, such as a tapered waveguide, it is known that mode conversion is performed so as to change on a curve of one curve effective refractive index (referred to as an adiabatic change).

Thus, in FIG. 6, by inputting $TE_0$ to the waveguide 1 when X=−200 (input end) and gradually changing X from −200 to 0 in the length direction of the waveguide, it is possible to convert $TE_0$ into the odd mode which is the super mode of $TE_0$ when X=0.

In order to confirm this mode conversion, FIGS. 7A to 7F illustrate electric field distributions in modes #0 and #1 at sectional positions (a) to (c) (see FIG. 4A).

Figure 7A:
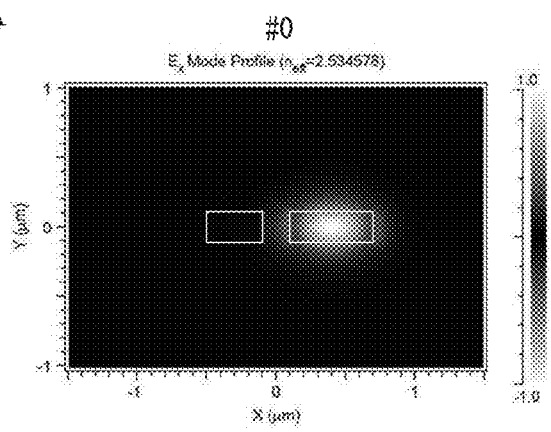
FIG. 7A is a diagram illustrating a simulation result of an electric field distribution ($E_x$ component) in a mode #0 at the sectional position (a) in FIG. 4A.
Figure 7B:
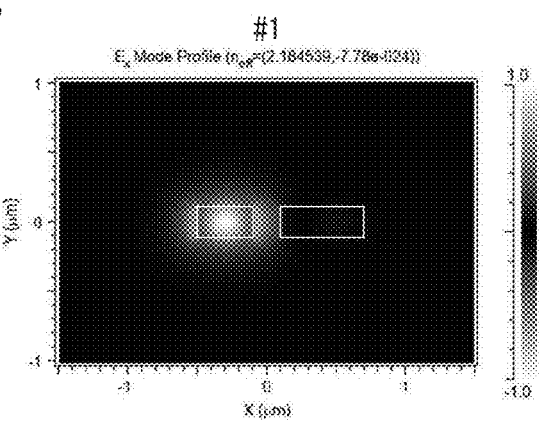
FIG. 7B is a diagram illustrating a simulation result of an electric field distribution ($E_x$ component) in a mode #1 at the sectional position (a) in FIG. 4A.
Figure 7C:
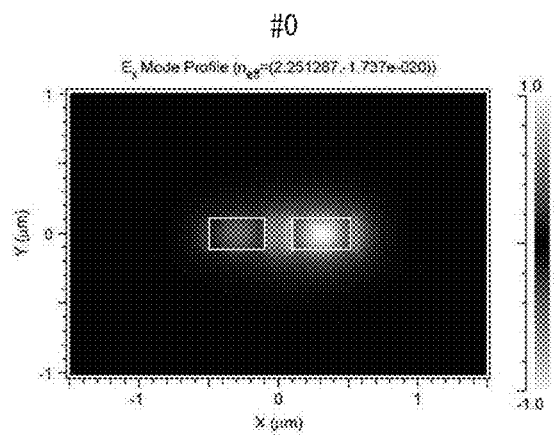
FIG. 7C is a diagram illustrating a simulation result of an electric field distribution ($E_x$ component) in the mode #0 at the sectional position (b) in FIG. 4A.
Figure 7D:
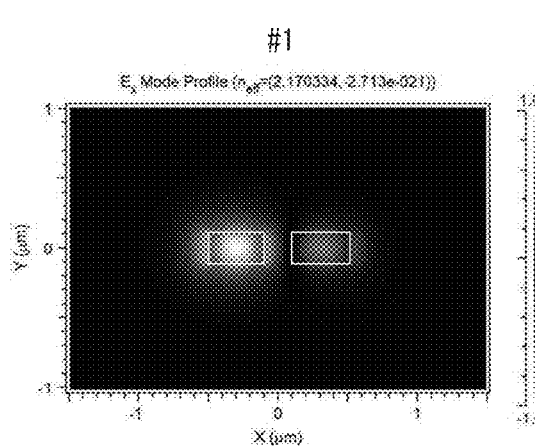
FIG. 7D is a diagram illustrating a simulation result of an electric field distribution ($E_x$ component) in the mode #1 at the sectional position (b) in FIG. 4A.
Figure 7E:
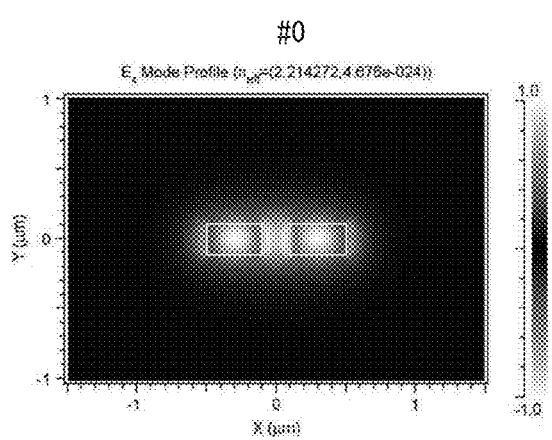
FIG. 7E is a diagram illustrating a simulation result of an electric field distribution ($E_x$ component) in the mode #0 at the sectional position (c) in FIG. 4A.
Figure 7F:
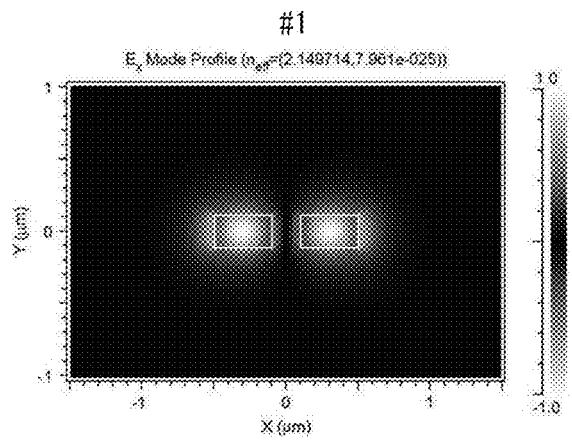
FIG. 7F is a diagram illustrating a simulation result of an electric field distribution ($E_x$ component) in the mode #1 at the sectional position (c) in FIG. 4A.

FIGS. 7A and 7B are diagrams illustrating simulation results (mode #0 in FIG. 7A and mode #1 in FIG. 7B) showing electric field distributions ($E_x$ components) at the sectional position (a). FIGS. 7C and 7D are diagrams illustrating simulation results (mode #0 in FIG. 7C and mode #1 in FIG. 7D) showing electric field distributions ($E_x$ components) at the sectional position (b). FIGS. 7E and 7F are diagrams illustrating simulation results (mode #0 in FIG. 7E and mode #1 in FIG. 7F) showing electric field distributions ($E_x$ components) at the sectional position (c).

Here, x and y represent a width direction and a height direction, respectively. The electric field distributions in FIGS. 7E and 7F are the same as in FIGS. 3A and 3B, respectively.

Referring to the mode #1, at the sectional position (a) (X=−200) illustrated in FIG. 7B, $TE_0$ is present in the waveguide 1.

At the sectional position (b) (X=−20) illustrated in FIG. 7D, it can be understood that mode coupling to $TE_0$ of the waveguide 2 starts.

At the sectional position (c) (X=0) illustrated in FIG. 7F, since the phase-matching condition is satisfied, an odd mode which is a super mode in which $TE_0$ of the waveguide 1 and $TE_0$ of the waveguide 2 are mixed can be viewed.

In this way, it can be understood that it is possible to change $TE_0$ input to the waveguide 1 to an odd mode by gradually changing a waveguide structure in a light waveguide direction.

Hereinbefore, the principle of the super mode-generating element has been described.

In the illustrated example, since the width continuously decreases from the input end 12a to the output end 12b, the preceding-stage second core portion 12 is formed in a tapered shape over the entire length. However, the shape of the preceding-stage second core portion 12 is not limited thereto, and only a part thereof in the length direction may be formed in a tapered shape in which the width continuously decreases.

In FIGS. 4A to 4D, the gap between the waveguides (gap between the core portion 11 and 12) of the super mode-generating element (preceding-stage mode conversion section) is uniform. However, the gap is not limited thereto, and may vary in the length direction of the waveguides.

Furthermore, as long as a condition that in two core portions which are contiguous to each other, the sizes of cross sections thereof at output ends are equal to each other and an effective refractive index in $TE_0$ of a first core portion is smaller than an effective refractive index in $TE_0$ of a second core portion in a range other than the output ends is satisfied, a configuration in which only one of two core portions is tapered may be used, or a configuration in which both of two core portions are tapered may be used.

For example, the first core portion 11 may be formed in a tapered shape in which the width continuously decreases from the input end 11a to the output end 11b, similar to the second core portion 12.

Furthermore, in the above-described specific example, the core portion 2 is a tapered waveguide in which the width linearly changes in the length direction, but the tapered waveguide is not limited thereto, and may be a curve-tapered waveguide.

A method for changing the waveguide structure may include a method for changing the height of a core portion in a light waveguide direction, instead of a method for changing the width of the core portion. By changing the height of the core portion, it is possible to arbitrarily adjust an effective refractive index in a mode of light that is guided by the core portion.

Further, in the specific example, the input ends and the output ends of the core portions are formed to be vertical to the light waveguide direction, but may be inclined with respect to the vertical direction.

<Principle of Matching Coupling Element>

Subsequently, a principle of converting an odd mode into $TE_1$ by a matching coupling element will be described.

The odd mode between $TE_0$ and $TE_0$ is asymmetric in an $E_x$ component which is a main electric field distribution in a TE mode, and shows an electric field distribution having two peaks.

On the other hand, $TE_1$ also has an asymmetric $E_x$ component, and has an electric field distribution having two peaks.

Thus, $TE_1$ and the odd mode have high similarity. Thus, even when two waveguides through which the odd mode propagates and one waveguide by which $TE_1$ is guided are discontinuously connected, it is possible to convert the odd mode into $TE_1$ with high coupling efficiency.

<Specific Example of Matching Coupling Element>

The subsequent-stage mode conversion section 9 which is a specific example of a matching coupling element will be described with reference to FIGS. 1A and 1B.

The subsequent-stage mode conversion section 9 includes a subsequent-stage first core portion 13 formed to be connected to an output-side of the core portion 11, a subsequent-stage second core portion 14 formed to be connected to an output-side of the core portion 12, and an output portion 3 to which output ends 13b and 14b of the core portions 13 and 14 are connected.

The input ends 13a and 14a (subsequent-stage input ends) of the core portions 13 and 14 are end portions at which light is input to the core portions 13 and 14, respectively, and the output ends 13b and 14d (subsequent-stage output ends) are end portions at which light is output from the core portions 13 and 14.

Since the subsequent-stage mode conversion section 9 is formed to be connected to the output-side of the preceding-stage mode conversion section 8, the input end 13a is disposed at the same position as that of the output end 11b, and the input end 14a is disposed at the same position as that of the output end 12b.

It is preferable that the subsequent-stage first core portion 13 linearly extend and the width and the height thereof be uniform in the length direction (light waveguide direction). It is preferable that the width of the subsequent-stage first core portion 13 be the same as the width of the preceding-stage first core portion 11.

An inner edge 13c (side edge on the side of the core portion 14 among both side edges of the core portion 13) and an outer edge 13d (side edge opposite to the inner edge 13c) of the subsequent-stage first core portion 13 are linearly formed, respectively.

It is preferable that the subsequent-stage second core portion 14 linearly extend and the width and the height thereof be uniform in the length direction (light waveguide direction). It is preferable that the width of the subsequent-stage second core portion 14 be the same as the width on the output end 12b of the preceding-stage second core portion 12.

An inner edge 14c (side edge on the side of the core portion 13 among both side edges of the core portion 14) and an outer edge 14d (side edge opposite to the inner edge 14c) of the subsequent-stage second core portion 14 are linearly formed, respectively.

It is preferable that the subsequent-stage first core portion 13 and the subsequent-stage second core portion 14 be parallel with each other in a planar view.

The core portions 13 and 14 are linear waveguides that extend in the same direction as that of the preceding-stage second core portion 12.

It is preferable that the core portions 13 and 14 have the same width. It is preferable that sectional shapes of the core portions 13 and 14 be rectangular.

The core portions 13 and 14 are separated from each other, and a gap therebetween is uniform from the input ends 13a and 14a to the output ends 13b and 14b.

Since the widths and heights of the core portions 13 and 14 illustrated in the figures are uniform in the length direction, the sectional shapes (shapes of cross sections vertical to the light waveguide direction) are uniform over the entire length.

The output ends 13b and 14b of the core portions 13 and 14 are commonly connected to an input end 3g (connection end) of the output portion 3.

It is preferable that the output portion 3 be a linear waveguide that linearly extends and the width and the height thereof be uniform in the length direction (light waveguide direction). The output portion 3 may be formed in a rectangular sectional shape.

It is preferable that the width of the output portion 3 on the input end 3g be equal to or greater than a sum ($W_{13}+W_{14}$+gap) of the widths of the core portions 13 and 14 and the gap between the core portions 13 and 14 at the output ends 13b and 14b, and it is more preferable that the width be greater than the sum ($W_{13}+W_{14}$+gap).

In the output portion 3 in the example illustrated in the figures, one side edge 3c is disposed outwardly with reference to the outer edge 13d. Thus, the one side portion of the output portion 3 is formed to protrude outward from the outer edge 13d of the core portion 13. The portion that protrudes outward (to the left in FIG. 1A) from the outer edge 13d is referred to as a protrusion 3e.

The other side edge 3d of the output portion 3 is disposed outwardly with reference to the outer edge 14d. Thus, the other side portion of the output portion 3 is formed to protrude outward from the outer edge 14d of the core portion 14. The portion that protrudes outward (to the right in FIG. 1A) from the outer edge 14d is referred to as a protrusion 3f.

The output portion 3 is a linear waveguide that extends in the same direction as those of the core portions 13 and 14. Thus, the side edges 3c and 3d of the output portion 3 are parallel with the outer edges 13d and 14d.

It is preferable that the input end 3g to which the core portions 13 and 14 are connected be vertical to the extension directions of the core portions 13 and 14 in a planar view.

It is preferable that the height of the output portion 3 be equal to the heights of the core portions 1 and 2.

Hereinafter, the subsequent-stage mode conversion section 9 will be more specifically described with reference to FIGS. 8A to 8C.

Figure 8A:
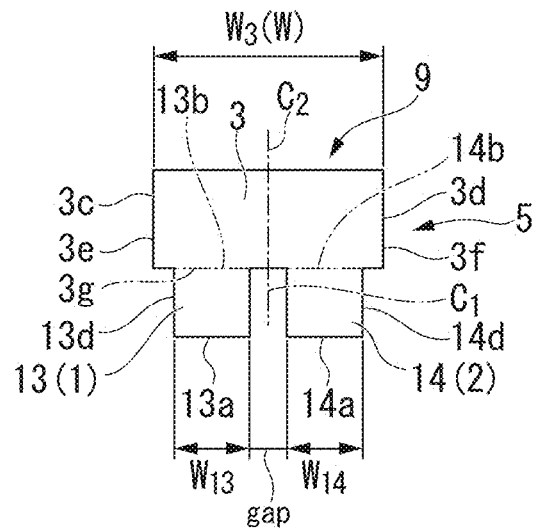
FIG. 8A is a plan view illustrating a structure of a subsequent-stage mode conversion section.
Figure 8B:
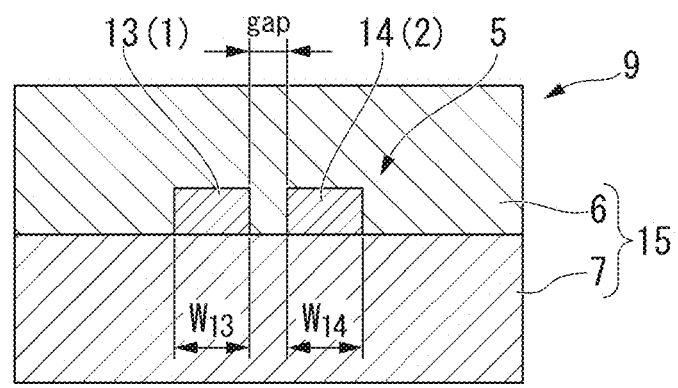
FIG. 8B is a sectional view of core portions, illustrating the structure of the subsequent-stage mode conversion section.
Figure 8C:
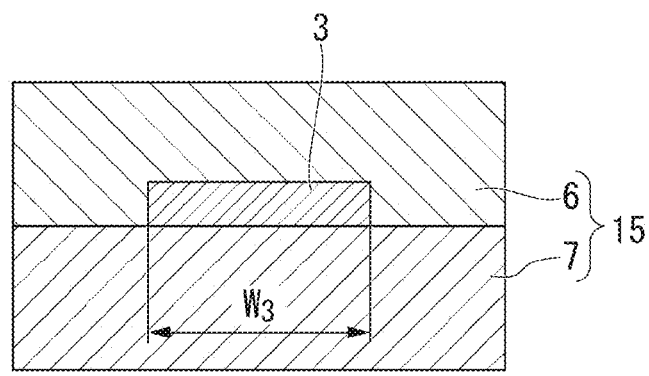
FIG. 8C is a sectional view of an output portion, illustrating the structure of the subsequent-stage mode conversion section.

FIGS. 8A to 8C are diagrams illustrating the subsequent-stage mode conversion section 9, in which FIG. 8A is a plan view thereof, FIG. 8B is a sectional view of core portions, and FIG. 8C is a sectional view of an output portion.

In the subsequent-stage mode conversion section 9, "waveguide 1" corresponds to a waveguide having the core portion 13, and "waveguide 2" corresponds to a waveguide having a core portion 14. "Waveguide 3" corresponds to a waveguide having the output portion 3.

The core portion 13 (core portion 1) and the core portion 14 (core portion 2) are formed of Si (having a refractive index of 3.48 (at a wavelength of 1580 nm)), and the upper cladding 6 and the lower cladding 7 are formed of $SiO_2$ (having a refractive index of 1.44 (at the wavelength of 1580 nm)). Further, the heights of the core portions 13 and 14 (core portions 1 and 2) are 220 nm.

The widths $W_{13}$ and $W_{14}$ of the core portions 13 and 14 (core portions 1 and 2) are set to 400 [nm], respectively.

The gap between the core portions 13 and 14 (core portions 1 and 2) is set to "gap" [nm] ("gap"=200).

As shown in FIG. 8A, at the input end 3g, a central line $C_2$ of the output portion 3 in the width direction and a central line $C_1$ between the core portions 13 and 14 in the width direction match each other.

The central line $C_1$ between the core portions 13 and 14 is a line that passes through the center of a width directional range (range from the outer edge 13d of the core portion 13 to the outer edge 14d of the core portion 14) including the core portions 13 and 14 and the gap therebetween, at the output ends 13b and 14b (input end 3g), and extends along the direction where the core portions 13 and 14 extend.

Distances from the central line $C_1$ to the outer edges $13d$ and $14d$ are respectively $(W_{13}+W_{14}+gap)/2$.

The central line $C_2$ of the output portion 3 is a line that extends along the direction where the output portion 3 extends in a planar view. At the input end $3g$, distances from the central line $C_2$ to the side edges $3c$ and $3d$ are respectively $W_3/2$.

The central lines $C_1$ and $C_2$ may be set to be parallel with each other.

First, a case where W which represents the width of the waveguide 3 is equal to the sum of the widths $W_{13}$ and $W_{14}$ of the waveguides 1 and 2 and the gap between the waveguides 1 and 2, that is, a case where $W=W_{13}+W_{14}+gap$ (=1000 nm) is satisfied may be considered. In this case, a "protrusion" is not formed in the waveguide 3.

Figure 9A:
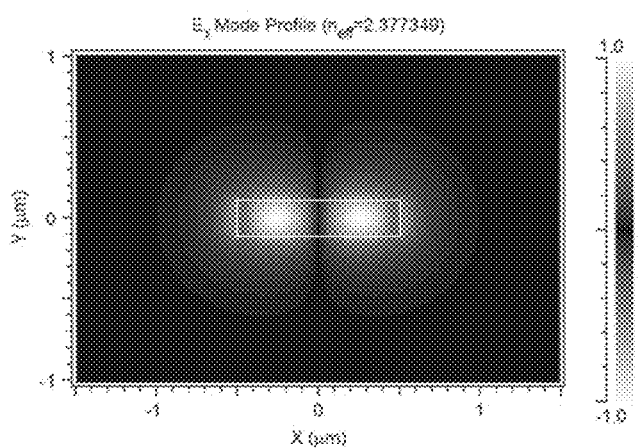
FIG. 9A is a diagram illustrating a simulation result showing an electric field distribution ($E_x$ component) in the output portion of the subsequent-stage mode conversion section.
Figure 9B:
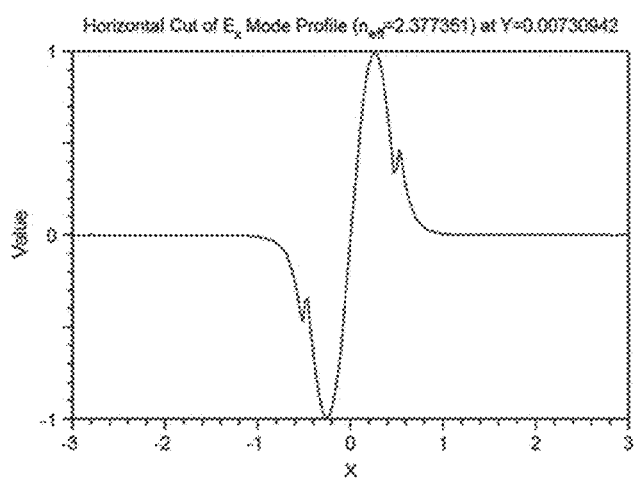
FIG. 9B is a graph illustrating the electric field distribution ($E_x$ component) in the output portion of the subsequent-stage mode conversion section.

FIGS. 9A and 9B are diagrams showing an Ex component (y=−0.00730942 μm) of $TE_1$ in the waveguide 3 (output portion 3) under the condition that W=1000. FIG. 9A is a diagram illustrating a simulation result showing an electric field distribution ($E_x$ component), and FIG. 9B is a graph illustrating the $E_x$ component.

Figure 10A:
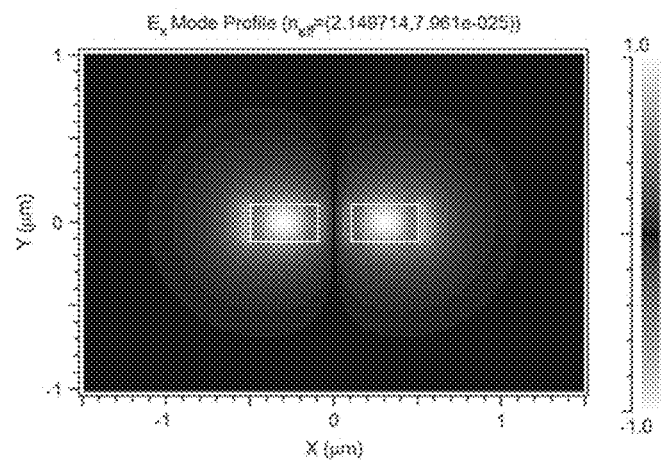
FIG. 10A is a diagram illustrating a simulation result showing an electric field distribution ($E_x$ component) in the core portions of the subsequent-stage mode conversion section.
Figure 10B:
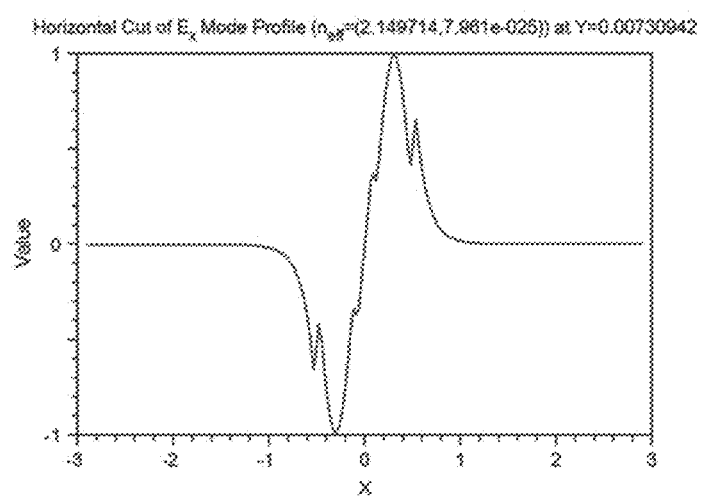
FIG. 10B is a graph illustrating the electric field distribution ($E_x$ component) in the core portions of the subsequent-stage mode conversion section.

FIGS. 10A and 10B are diagrams showing an odd mode in the waveguides 1 and 2 (core portions 13 and 14) under the same condition as in FIGS. 9A and 9B. FIG. 10A is a diagram illustrating a simulation result showing an electric field distribution ($E_x$ component), and FIG. 10B is a graph illustrating the $E_x$ component. Here, the electric field distributions in FIGS. 10A and 10B are the same as in FIGS. 3B and 3D, respectively.

When comparing FIGS. 9A and 9B (electric field distributions of $TE_1$ in the output portion 3) with FIGS. 10A and 10B (electric field distributions in the odd mode in the core portions 13 and 14), it can be understood that they are similar to each other.

In a case where the waveguides 1 and 2 and the waveguide 3 are discontinuously connected to each other, a conversion efficiency based on matching coupling therebetween is expressed as the following expression (here, since the $E_x$ component is a main component in the TE mode, contribution of other components is ignored).

[Expression 6]

$$T = K \iint E_x^{odd\ mode\ of\ waveguides\ 1\ and\ 2} \times (E_x^{TE1\ of\ waveguide\ 3})^* dx dy \quad (6)$$

Here, signs are determined as follows. Integration is performed over an overall cross section of a connecting portion of the waveguides 1 and 2 and the waveguide 3.

[Expression 7]

$$T = K \iint E_x^{odd\ mode\ of\ waveguides\ 1\ and\ 2} \times (E_x^{TE1\ pf\ waveguide\ 3})^* dx dy \quad 6$$

$E_x^{odd\ mode\ of\ waveguides\ 1\ and\ 2}$: $E_x$ component of electric field in odd mode of waveguides 1 and 2
$E_x^{TE1\ of\ waveguide\ 3}$: $E_x$ component in $TE_1$ of waveguide 3
K: other constant It can be understood from Expression (6) that as the electric field distributions in the odd mode of the waveguides 1 and 2 and $TE_1$ of the waveguide 3 become more similar to each other, the conversion efficiency becomes higher. In reality, in the matching coupling element shown in FIG. 8A, a conversion efficiency at W=1000 becomes a high value (about −0.294 dB) (at a wavelength of 1580 nm).

Then, a case where the width W of the waveguide 3 is larger than the sum of the widths $W_{13}$ and $W_{14}$ of the waveguides 1 and 2 and the gap between the waveguides 1 and 2, that is, a case where $W>W_{13}+W_{14}+gap$ is satisfied may be considered.

The output portion 3 includes the protrusion $3e$ that protrudes toward one side (to the left in FIG. 8A) from the outer edge $13d$ of the core portion 13, and the protrusion $3f$ that protrudes toward the other side (to the right in FIG. 8A) from the outer edge $14d$ of the core portion 14.

By employing such a structure, it is possible to make the electric field distributions in the odd mode of the waveguides 1 and 2 and $TE_1$ of the waveguide 3 to be closer to each other, which will be described as follows.

Figure 11:
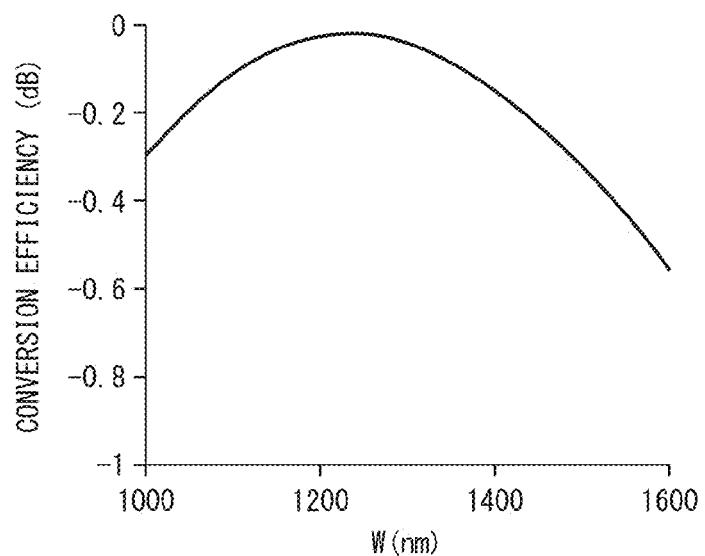
FIG. 11 is a graph illustrating a relationship between the width of the output portion of the subsequent-stage mode conversion section and conversion efficiency.

FIG. 11 illustrates a relationship between the width of the waveguide 3 and the conversion efficiency between the odd mode and $TE_1$ (at a wavelength of 1580 nm).

As shown in FIG. 11, the conversion efficiency becomes a maximum value (−0.022 dB) in the vicinity of W=1250.

This is because peak positions with respect to the odd mode are aligned by increasing W (compared with a case where W is 1000) and an integrated value of Expression (6) is increased.

Figure 12A:
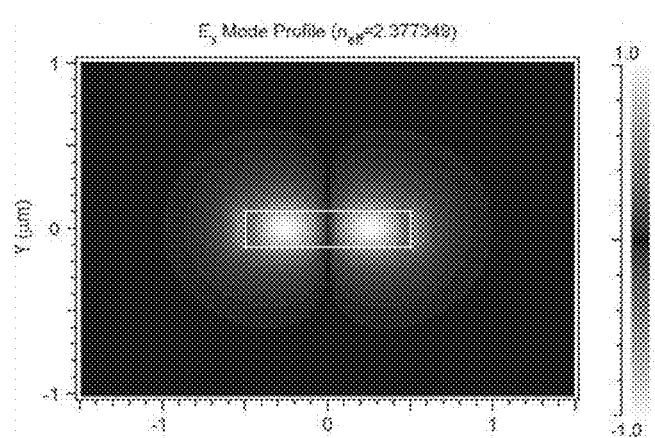
FIG. 12A is a diagram illustrating a simulation result showing an electric field distribution ($E_x$ component) in the output portion of the subsequent-stage mode conversion section.
Figure 12B:
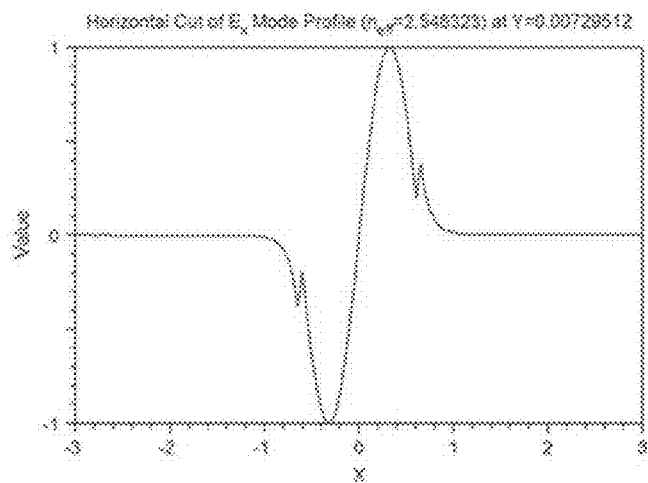
FIG. 12B is a graph illustrating the electric field distribution ($E_x$ component) in the output portion of the subsequent-stage mode conversion section.

FIGS. 12A and 12B are diagrams illustrating electric field distributions in $TE_1$ and an Ex component (y=0.00729512 μm) in a case where W=1250, that is, $W(=W_3)>W_{13}+W_{14}+gap$.

When comparing FIG. 12B with FIG. 9B (W=1000), peak positions move outward in the width direction in FIG. 12B, compared with FIG. 9B. That is, it can be understood that the peak positions in FIG. 12B approach the peak positions in the odd mode in FIG. 10B. Thus, overlapping of the electric field distributions in the odd mode of the waveguides 1 and 2 and $TE_1$ of the waveguide 3 becomes large.

In this way, by forming the output portion of the matching coupling element to satisfy "$W_3>W_{13}+W_{14}+gap$", it is possible to convert the odd mode into $TE_1$ using similarity in electric field distributions of the odd mode and $TE_1$.

$TE_0$ input to the super mode-generating element is converted into the odd mode, and then, is input to the matching coupling element and is converted into $TE_1$.

In FIGS. 1A and 1B and FIGS. 8A to 8C, the matching coupling element (subsequent-stage mode conversion section 9) includes the output portion 3 and the core portions 13 and 14, but the matching coupling element may be configured by only the output portion 3.

Effects of the Present Embodiment

[First Effect 1]

As a first effect, by applying the present embodiment, it is possible to achieve conversion with high accuracy over a long wavelength band, and to reduce the influence of a manufacturing error. The reason is as follows.

In an asymmetric directional coupler in the related art, it is necessary to maintain a phase-matching condition for maintaining high conversion efficiency.

However, in a case where a wavelength changes or a waveguide structure is changed due to a manufacturing error, the condition is not satisfied, and the conversion efficiency decreases.

On the other hand, in the super mode-generating element used in the present embodiment, since the shapes and sizes of the cross sections of the core portions are equal to each other at the output ends, even when a wavelength changes, deviation does not occur in effective refractive indexes, and phase matching is not broken.

Accordingly, it is possible to secure high conversion efficiency at a wide wavelength band.

Further, since a general manufacturing error due to lithography, etching or the like occurs in two core portions by the same amount, phase matching is not broken even when the widths or heights of the core portions vary due to a manufacturing error. In addition, even in a case where there is variation in the heights of layers in a wafer (SOI substrate or the like) to be used, its influence equally affects two core portions, which does not cause an obstacle in establishment of phase matching.

Accordingly, it is possible to secure efficient mode conversion even in a case where a waveguide structure is changed due to a manufacturing error.

Further, in the super mode-generating element, since a waveguide structure is gradually changed in a light waveguide direction, it is possible to sufficiently reduce decrease energy loss due to a so-called adiabatic change.

Thus, by setting the length (taper length) of a portion (for example, tapered waveguide) in which a waveguide structure is changed to be sufficiently long, it is possible to perform mode conversion with low loss.

In the matching coupling element used in the present embodiment, it is also possible to perform high efficiency conversion over a wide wavelength band, and the influence of a manufacturing error is small. The reason is as follows.

In a case where a wavelength changes, an electric field distribution in a mode accordingly spreads (in a case where the wavelength increases) or shrinks (in a case where the wavelength decreases) with respect to a core.

Since the change is the same in an arbitrary mode, even in the case of the odd mode and $TE_1$, the same change of the electric field distribution occurs according to the change of the wavelength. Thus, the conversion efficiency of the matching coupling becomes a high value.

Figure 13:
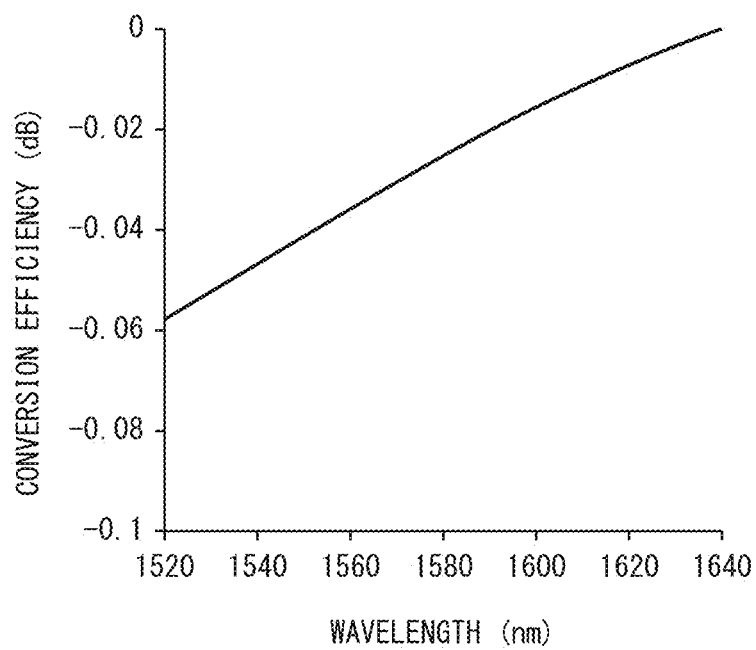
FIG. 13 is a graph illustrating a relationship between a wavelength of light in the subsequent-stage mode conversion section and conversion efficiency.

In order to confirm this, FIG. 13 illustrates a relationship between a wavelength and conversion efficiency when W is 1250.

It can be understood from FIG. 13 that high conversion efficiency is maintained even though the wavelength changes.

Further, in a case where there is a manufacturing error due to lithography or etching or variation in the heights of layers of a wafer (SOI substrate or the like), its influence (change or the like in the width or height of a core) locally occurs in respective portions of waveguides by the same amount. Thus, the waveguides 1 and 2 and the waveguide 3 are changed in the same manner (for example, the widths increase or decrease together). Accordingly, electric field distributions in modes of the respective waveguides also spread or shrink in the same manner.

Thus, in the matching coupling element, reduction in conversion efficiency does not occur, and thus, it is possible to secure high conversion efficiency.

Figure 14:
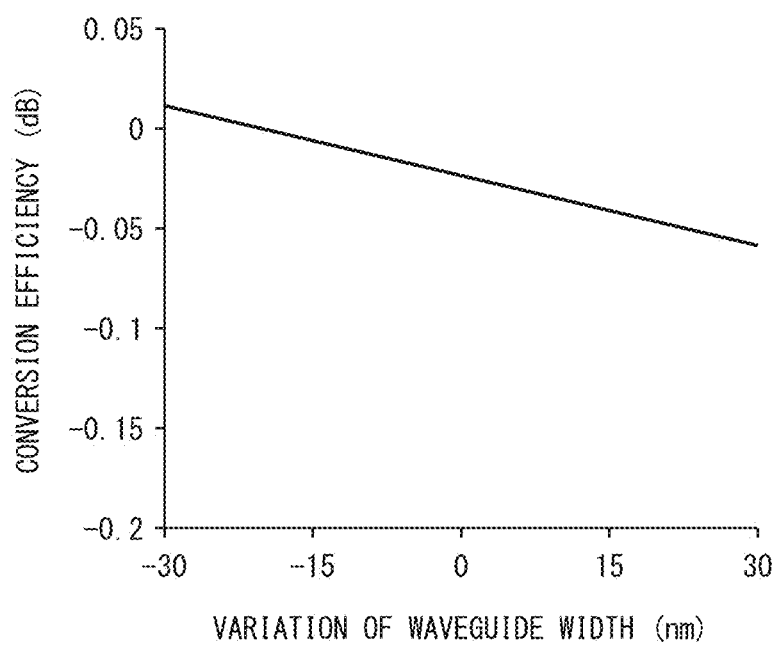
FIG. 14 is a graph illustrating a relationship between a variation of a core width (waveguide width) and conversion efficiency.

As a specific example, FIG. 14 illustrates a relationship between a variation and conversion efficiency in a case where core widths (in the figure, written as waveguide widths) (for example, $W_3$, $W_{13}$, and $W_{14}$ in FIG. 8A) of the waveguides 1 to 3 of the matching coupling element (subsequent-stage mode conversion section) are all changed by −30 nm. In FIG. 14, a portion in which the conversion efficiency exceeds 100% is present, as a matter of calculation accuracy.

It can be understood from FIG. 14 that even when the core widths of the waveguides 1 to 3 are changed, high conversion efficiency is maintained.

As described above, the super mode-generating element (preceding-stage mode conversion section) and the matching coupling element (subsequent-stage mode conversion section) are all excellent in terms of wavelength dependency and characteristics against a manufacturing error.

Accordingly, in the present embodiment, by using the super mode-generating element (preceding-stage mode conversion section) and the matching coupling element (subsequent-stage mode conversion section), it is possible to perform conversion with high accuracy over a wide wavelength band, and to secure efficient mode conversion even in a case where a waveguide structure is changed due to a manufacturing error.

Further, $TE_1$ is obtained by inputting the odd mode of $TE_0$ to the matching coupling element, but in the present embodiment, it is possible to use a new super mode-generating element using a part of the principle of the tapered directional coupler (see MICHAEL G. F. WILSON, et. al., "Tapered Optical Directional Coupler," IEEE TRANSACTIONS ON MICROWAVE THEORY AND TECHNIQUES, VOL. MTT-23, NO. 1, JANUARY 1975) known in the related art in order to generate the odd mode.

Further, in the present embodiment, regardless of handling of conversion to a different mode, in at least an output end of the super mode-generating element and the matching coupling element, it is possible to use a symmetric waveguide structure. As described above, the symmetric waveguide structure is excellent in terms of wavelength dependency and characteristic when a manufacturing error occurs.

In addition, it is possible to use the adiabatic change phenomenon by using the super mode-generating element, and to use similarity of electric field distributions of the odd mode and $TE_1$ in the matching coupling element.

Accordingly, in the present embodiment, there are remarkable effects that it is possible to secure high conversion efficiency in a wide wavelength band, and it is possible to secure efficient mode conversion even in a case where a waveguide structure is changed due to a manufacturing error.

[Second Effect]

As a second effect, it is possible to perform mode multiplexing between $TE_0$ and $TE_1$.

In the present embodiment, if $TE_0$ is input to the waveguide 2 of the super mode-generating element, $TE_0$ is output from the matching coupling element as it is.

This is because $TE_0$ input to the waveguide 2 becomes the even mode in the super mode-generating element in the effective refractive index curve shown in FIG. 6, and then, is coupled with $TE_0$ of the waveguide 3 in the matching coupling element.

Accordingly, by inputting $TE_0$ to the waveguides 1 and 2, respectively, it is possible to output light in which $TE_0$ and $TE_1$ are multiplexed.

The electric field distribution in the even mode is symmetric in the width direction, and thus is not coupled with $TE_1$ of the waveguide 3 which is asymmetric in the width direction. Thus, mixture with $TE_1$ does not occur.

Here, the "mode multiplexing" represents a phenomenon that light in a mode (referred to as a mode B) which is different from a mode (referred to as a mode A) generated by mode conversion from one waveguide to the other waveguide is input to the other waveguide, so that light in the mode A and light in the mode B are simultaneously output from the other waveguide.

[Third Effect]

As a third effect, it is possible to manufacture a core by one lithography/etching process, to thereby easily perform manufacturing.

For example, it is possible to form the Si layer of the SOT substrate as the core 5 (the core portions 1 and 2, and the output portion 3) illustrated in FIGS. 1A, 1B or the like by one lithography/etching process.

Further, since there is no particular request for the height of the core or the like, and since it is sufficient if a general condition for optical waveguides is satisfied, it is possible to easily perform integration with other optical waveguide devices.

[Fourth Effect]

As a fourth effect, it is possible to easily perform manufacturing without necessity of a fine process.

For example, as a conversion structure $TE_0$ and $TE_1$ in the related art, there is an asymmetric Y branch, but in the Y branch, it is not easy to manufacture a base portion with high accuracy, and low formation accuracy leads to low performance. Particularly, this problem is noticeable in silicon wire waveguides in which the dimensions of respective portions are in the order of sub-micrometers.

On the other hand, in the present embodiment, a gap between core portions is uniform in the length direction. Since it is not necessary to gradually bring two waveguides closer to each other until they are in contact with each other, differently from the base portion of the Y portion, it is possible to easily perform manufacturing.

[Fifth Effect]

As a fifth effect, it is possible to reduce a device length.

As a conversion structure between the odd mode and $TE_1$, a symmetric Y branch structure may be considered, but in this case, since it is necessary to gradually bring waveguides closer to each other, a device length tends to be long.

On the other hand, in the present embodiment, the matching coupling element is used for conversion between the odd mode and $TE_1$. Since the matching coupling can be performed in a very short distance, it is possible to reduce the device length, compared with the Y branch structure.

In the planar optical waveguide device according to the present embodiment, in a case where input and output directions are opposite to the above-described directions, an operation opposite to the above-described operation can be performed. For example, in the planar optical waveguide device 10 illustrated in FIGS. 1A and 1B, if $TE_1$ is input to the output portion 3, $TE_0$ is output from the input end 11a of the core portion 11. On the other hand, if $TE_0$ is input to the output portion 3, $TE_0$ is output from the input end 12a of the core portion 12. In this way, since a core portion for output is changed according to an input mode, the planar optical waveguide device 10 may be applied to a mode splitter.

Example 1

<Planar Optical Waveguide Device>

Figure 15A:
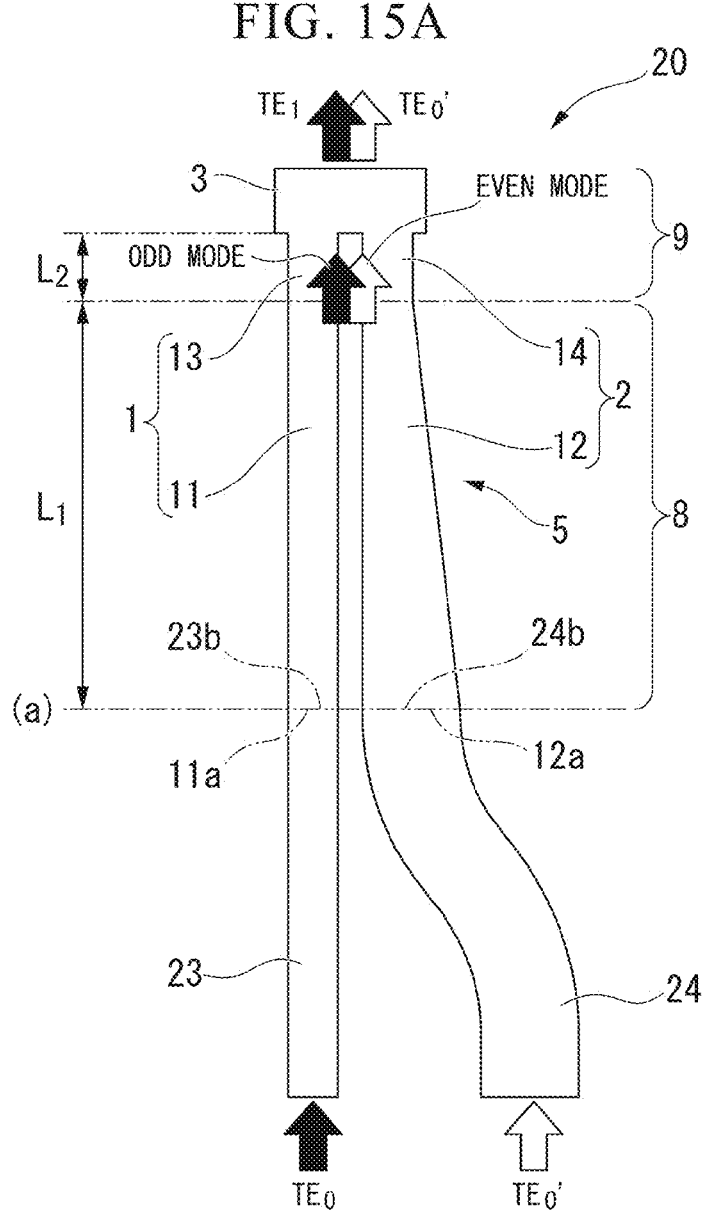
FIG. 15A is a plan view illustrating an example of a planar optical waveguide device having a bent waveguide.
Figure 15B:
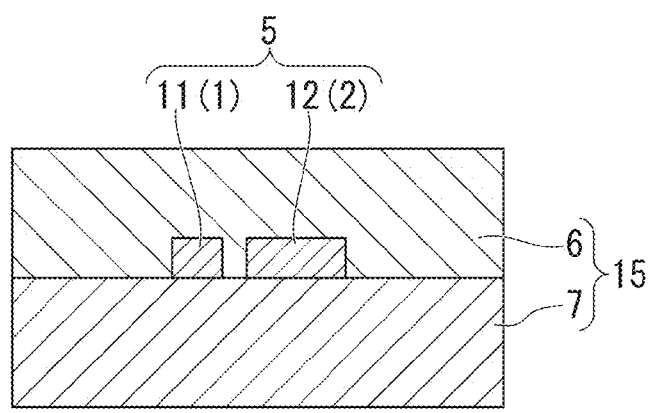
FIG. 15B is a sectional view at a sectional position (a), illustrating the example of the planar optical waveguide device having the bent waveguide.

FIGS. 15A and 15B are diagrams illustrating a planar optical waveguide device (mode conversion element) 20 according to Example 1 of the invention. FIG. 15A is a plan view thereof, and FIG. 15B is a sectional view at a sectional position (a) in FIG. 15A. The same reference numerals are given to the same configurations as those of the above-described planar optical waveguide device, and description thereof will not be repeated.

The width of the core portion 11 (core portion 1) is 400 [nm], and the width of the core portion 12 (core portion 2) is 400–X [nm] ($-200 \leq X \leq 0$). Here, X is linearly changed from –200 to 0, from the input end 12a to the output end 12b. The widths of the core portions 13 and 14 are respectively 400 [nm]. The gap between the core portions 1 and 2 is 200 [nm]. The width of the output portion 3 is 1250 [nm]. The heights of the core portions 1 and 2 and the output portion 3 are 220 nm.

In the planar optical waveguide device 20, the first core portion 1 includes a linear waveguide 23, and the second core portion 2 includes a bent waveguide 24. The linear waveguide 23 is formed on an input side of the core portion 11, and the bent waveguide 24 is formed on an input side of the core portion 12.

The bent waveguide 24 is formed to be bent in a planar view.

Thus, the core portion 1 (linear waveguide 23) and the core portion 2 (bent waveguide 24) become closer to each other as a distance to the preceding-stage mode conversion section 8 becomes shorter in a length range including at least output ends 23b and 24b.

The curved shape of the bent waveguide 24 may be an arc shape, for example. The shape of the bent waveguide 24 is not limited thereto, and may be an arbitrary shape. For example, a high-order curve shape (for example, a quadratic curve shape) such as an elliptical arc shape, a parabolic shape, or a hyperbolic shape may be employed. The bent waveguide 24 illustrated in the figure has an S shape formed by combining two approximately circular arcs.

In the planar optical waveguide device 20, on an input side of the preceding-stage mode conversion section 8, the first core portion 1 (linear waveguide 23) and the second core portion 2 (bent waveguide 24) are formed to become closer to each other as the distance to the preceding-stage mode conversion section 8 becomes shorter. Thus, it is possible to reduce unnecessary reflection of light.

As described above, in the preceding-stage mode conversion section 8, mode coupling on an input side is reduced by tapering the core portion 12, but since the linear waveguide 23 and the bent waveguide 24 become more distant from each other as the distance to the preceding-stage mode conversion section 8 becomes longer, it is possible to reliably reduce mode coupling compared with the tapered structure. Thus, it is possible to enhance mode conversion efficiency in the preceding-stage mode conversion section 8.

This is because a structure in which core portions become distant from each other has a higher effect of weakening coupling compared with a tapered structure.

In the planar optical waveguide device 20, the core portion 1 (core portion 11) includes the linear waveguide 23, and the core portion 2 (core portion 12) that has a width larger than that of the core portion 1 includes the bent waveguide 24. This is because light confinement is weak in the core portion 1 having a narrow width, and if curved, loss becomes large.

The planar optical waveguide device 20 has no problem of functioning as a planar optical waveguide device even when the linear waveguide 23 and the bent waveguide 24 are not provided. However, as described above, since there are advantages such as reduction of reflection and reduction of mode coupling, it is preferable that they (the linear waveguide 23 and the bent waveguide 24) be employed.

In the planar optical waveguide device 20 illustrated in FIGS. 15A and 15B, only the core portion 2 among the core portions 1 and 2 includes the bent waveguide 24. However, as long as the core portions 1 and 2 become closer to each other as the distance to the preceding-stage mode conversion section 8 becomes shorter in a bent waveguide, a position where the bent waveguide is formed is not limited to the example illustrated in the figures.

For example, a structure in which the core portion 2 includes a linear waveguide and the core portion 1 includes a bent waveguide may be employed, and a structure in which both of the core portions 1 and 2 include bent waveguides may be employed.

The planar optical waveguide device 20 may be manufactured by processing an SOI substrate. An intermediate SiO$_2$ layer (having a refractive index of 1.44) of the SOI substrate is used as a lower cladding, and an Si layer (having a refractive index of 3.47) is used as a core. After the core is formed, an SiO$_2$ layer is provided as an upper cladding.

In order to show that mode conversion is possible according to this example, a conversion efficiency (ratio of power of output TE$_1$ to power of input TE$_0$) in TE$_1$ output when TE$_0$ was input to the core portion 1 was calculated using a finite-difference time-domain (FDTD).

The length L$_2$ of the matching coupling element (the subsequent-stage mode conversion section 9 in FIGS. 15A and 15B) was set to 1 μm. A wavelength was set to 1550 nm. A calculation result is shown in FIG. 16.

Figure 16:
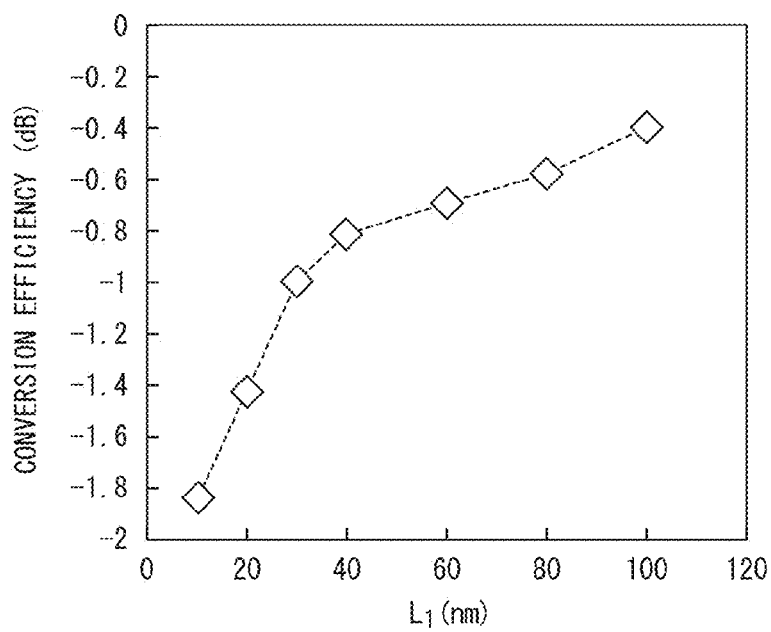
FIG. 16 is a graph illustrating a relationship between the length of the preceding-stage mode conversion section and conversion efficiency.

FIG. 16 is a diagram illustrating a relationship between a taper length L$_1$ (the length of tapered waveguide (core portion 12)) and conversion efficiency in the super mode-generating element.

It can be understood from FIG. 16 that as the taper length L$_1$ of the super mode-generating element becomes longer, the width of a core portion in the light waveguide direction becomes smoother, so that an adiabatic change condition is more easily satisfied and the conversion efficiency becomes higher.

Figure 17:
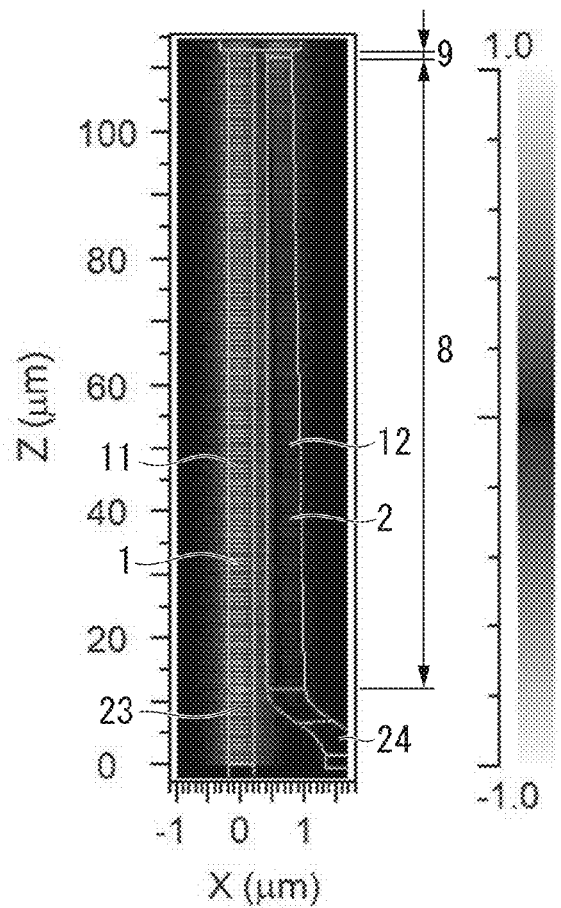
FIG. 17 is a diagram illustrating a simulation result showing an electric field distribution ($E_x$ component).

FIG. 17 is a diagram illustrating an electric field distribution when the taper length L$_1$ (the length of the core portion 12) of the super mode-generating element (preceding-stage mode conversion section 8) is 100 μm. FIG. 17 is a diagram illustrating an E$_x$ component when y is 0.1 μm in a case where TE$_0$ is input to the core portion 1 from the input end (lower end). The wavelength was set to 1550 nm.

It can be understood from FIG. 17 that light is coupled in the super mode-generating element and TE$_0$ is converted into an odd mode in which TE$_0$ is distributed in both core portions at an output end. Further, it can be also confirmed that the odd mode is changed to TE$_1$ by the matching coupling element.

Figure 18:
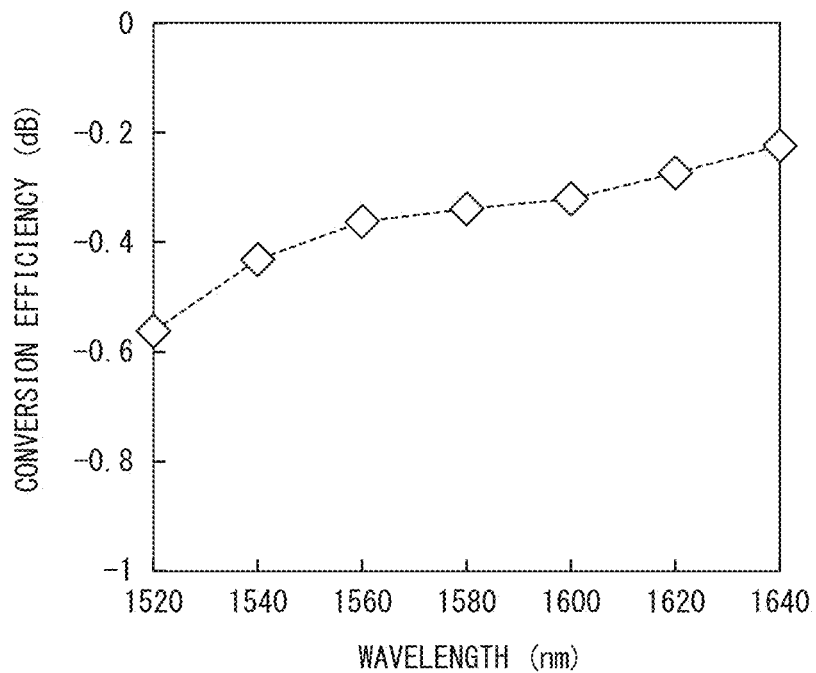
FIG. 18 is a graph illustrating a relationship between a wavelength of light and conversion efficiency.

FIG. 18 is a graph illustrating a result obtained by simulating wavelength dependency (a relationship between a wavelength and conversion efficiency) in this example using FDTD. The taper length L$_1$ of the super mode-generating element was set to 100 μm.

It can be confirmed from FIG. 18 that a high conversion efficiency which is equal to or greater than −0.56 dB from 1520 nm to 1640 nm is achieved in this example.

Since an electric field distribution more greatly spreads outside a core portion and coupling to a contiguous waveguide becomes stronger as a wavelength becomes longer, the conversion efficiency of the super mode-generating element is enhanced at a long wavelength, and thus, the overall conversion efficiency is enhanced.

Next, in order to confirm the influence of a manufacturing error in this example, a relationship between a wavelength and conversion efficiency when the widths of overall core portions (and an output portion) were changed by −30 nm was simulated using FDTD. The taper length L1 of the super mode-generating element was set to 100 μm.

Figure 19:
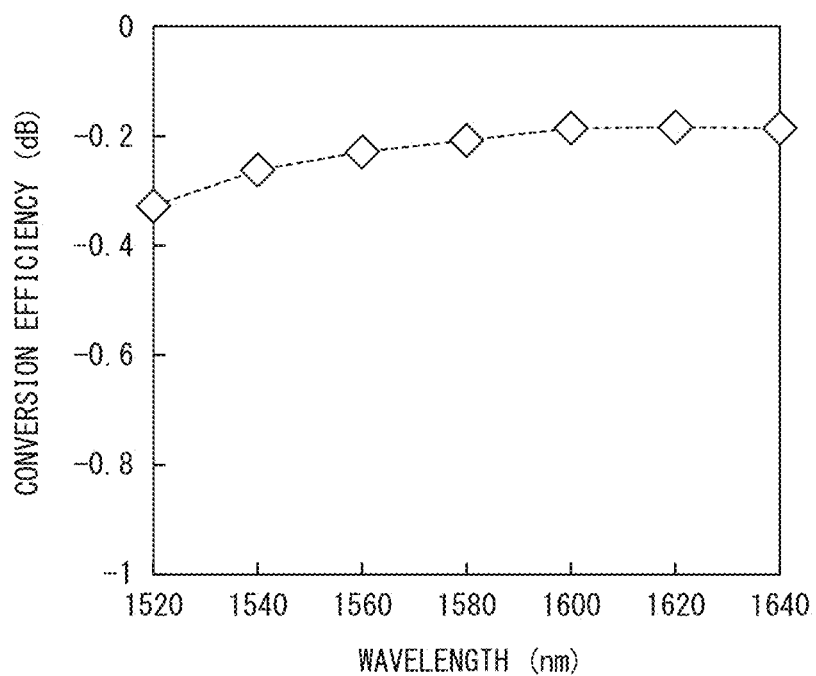
FIG. 19 is a graph illustrating a relationship between a wavelength and conversion efficiency in a case where the width of a core portion (and an output portion) is changed.

A calculation result is shown in FIG. 19.

When comparing FIG. 19 with FIG. 18, fluctuation in the conversion efficiency in a case where the widths of the core portions (and the output portion) are changed by −30 nm is within 0.24 dB at each wavelength, and high conversion efficiency is maintained.

It can be confirmed from FIG. 19 that this structure is less affected by a manufacturing error.

In a case where a manufacturing error is present (FIG. 19), the conversion efficiency is enhanced compared with a case where there is no manufacturing error (FIG. 18). The reason is as follows.

If the width of a core portion is changed, the level of light confinement into the core is changed. In a case where the width becomes small, since the confinement becomes weak, leakage from the core increases, and thus, coupling to a contiguous waveguide in the super mode-generating element becomes strong. Thus, the conversion efficiency increases in a case where there is a manufacturing error.

Here, there is a case where the confinement becomes strong according to a manufacturing error, but since the width of fluctuation in conversion efficiency is approximately at the same level between waveguides, there is no change in the fact that this structure is less affected by a manufacturing error.

Next, in this example (FIGS. 15A and 15B), mode multiplexing of TE$_0$ of the core portion 2 and TE$_1$ (mode which is converted from TE$_0$ input to the core portion 1) is possible, which will be described.

To this end, a transmittance in TE$_0$' output from the matching coupling element when TE$_0$ (written as TE$_0$' for distinction) was inputted to the core portion 2 from the input side (ratio of power in TE$_0$' output from the matching coupling element to power in TE$_0$' input to the core portion 2) was simulated using FDTD.

Figure 20:
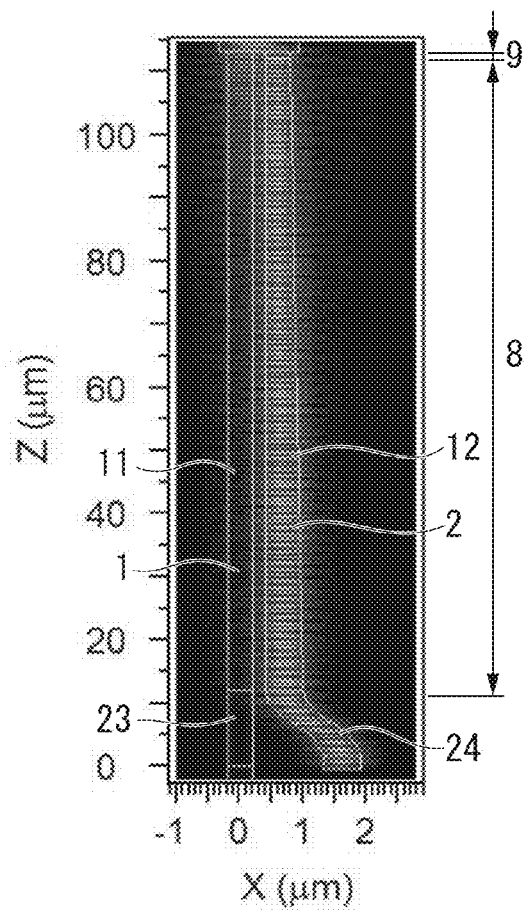
FIG. 20 is a diagram illustrating a simulation result showing an electric field distribution ($E_x$ component).

FIG. 20 is a diagram illustrating an electric field distribution calculated using FDTD when the taper length of the super mode-generating element is 100 μm. The wavelength was set to 1550 nm. FIG. 20 is a diagram illustrating an E$_x$ component when y is 0.1 μm in a case where TE$_0$ is input to the core portion 2 from the input end (lower end).

Here, it can be understood that the transmittance becomes −0.86 dB and a large amount of power is transmitted. As described above, mode coupling is possible in this example.

<Comparison with Related Art>

Figure 69A:
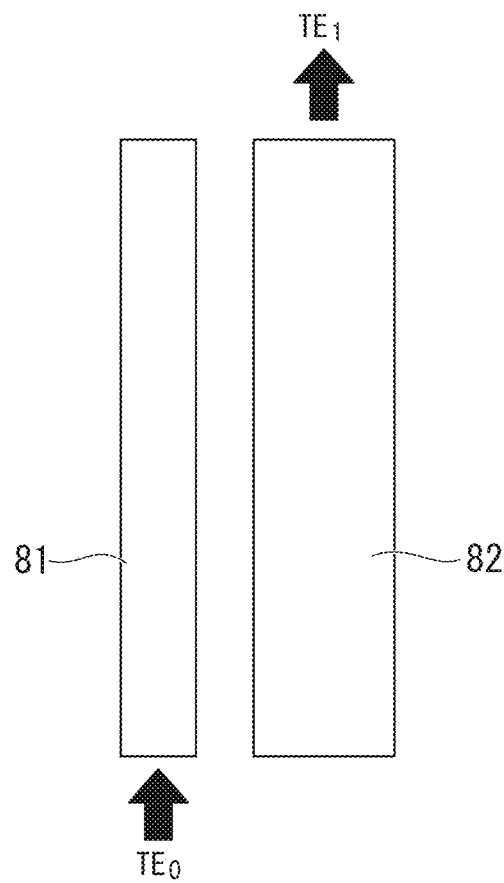
Figure 69B:
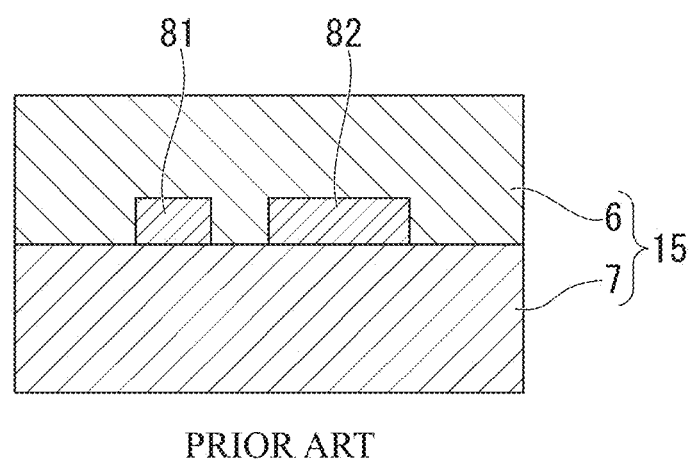
Figure 70:
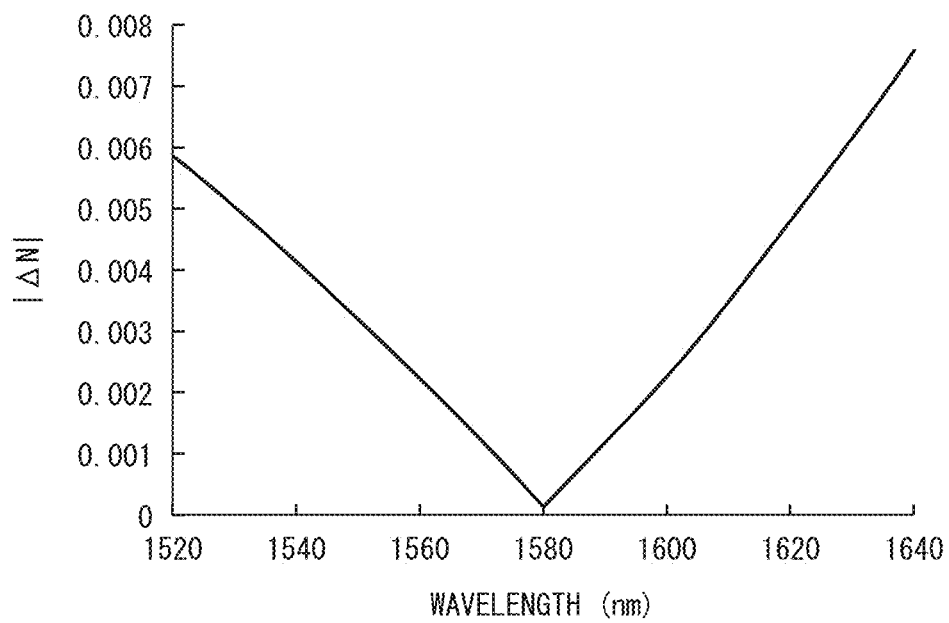

This example will be compared with performance of an asymmetric directional coupler which is a technique in the related art. Specifically, Example 1 will be compared with Comparative Example 1 having a structure shown in FIGS. 69A and 69B. First, validity of the comparison will be considered from the following viewpoints.

Both the super mode-generating element used in this example and the asymmetric directional coupler in the related art use the mode coupling principle.

In the mode coupling, as leakage of light into a contiguous waveguide becomes larger, the coupling becomes stronger, so that the efficiency becomes higher. For this purpose, it is sufficient if the width of a core portion is reduced and light confinement is weakened.

However, in consideration of actual manufacturing, if the width of the core portion is too narrow, there are problems such that reproducibility is lowered or a waveguide as mask design cannot be manufactured depending on the accuracy of lithography. Thus, the width of the core portion is set to have a minimum value capable of manufacturing a waveguide.

Accordingly, it is possible to perform the comparison between Example 1 and Comparative Example 1 by setting a minimum width of a core portion as the same condition. Since the coupling is also strengthened by decreasing a gap between core portions, the gaps between the core portions in Example 1 and Comparative Example 1 are set to be the same.

In Example 1, in a state where the width of an output end (a portion which was necessary for narrowing a core to the minimum) of the super mode-generating element that used the principle of mode coupling was set to 400 nm, the widths of core portions other than the output end were determined. The gap between the core portions was set to 200 nm.

In Comparative Example 1 (the asymmetric directional coupler shown in FIGS. 69A and 69B), the width of the core portion 1 (a portion which was necessary for narrowing a core to the minimum) that guided light in $TE_0$ which was a coupling target was set to 400 nm, and the width of the core portion 2 was determined so that phase matching was established.

Since the minimum width of the core portion and the gap between the core portions are under the same condition, it is possible to perform the comparison between Example 1 and Comparative Example 1.

Figure 21:
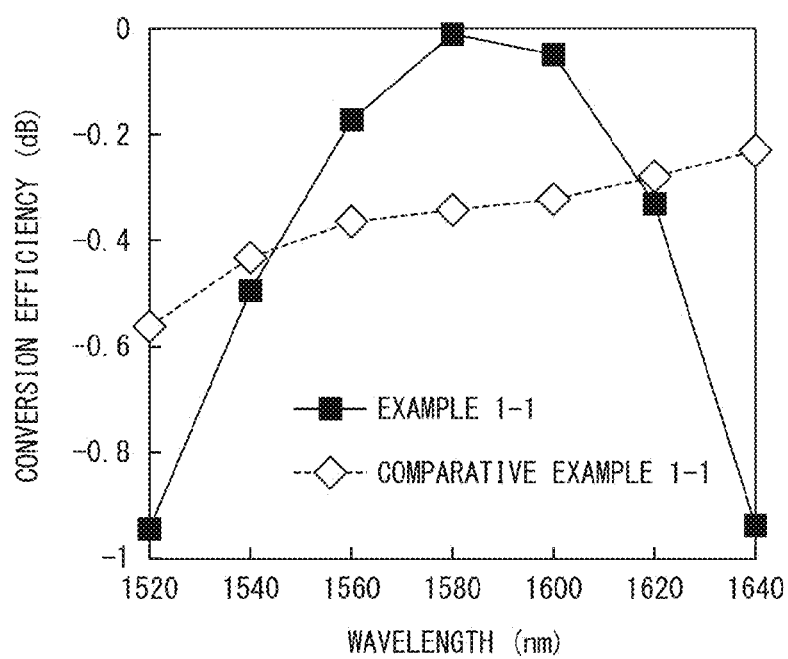
FIG. 21 is a graph illustrating a relationship between a wavelength of light and conversion efficiency.
Figure 71:
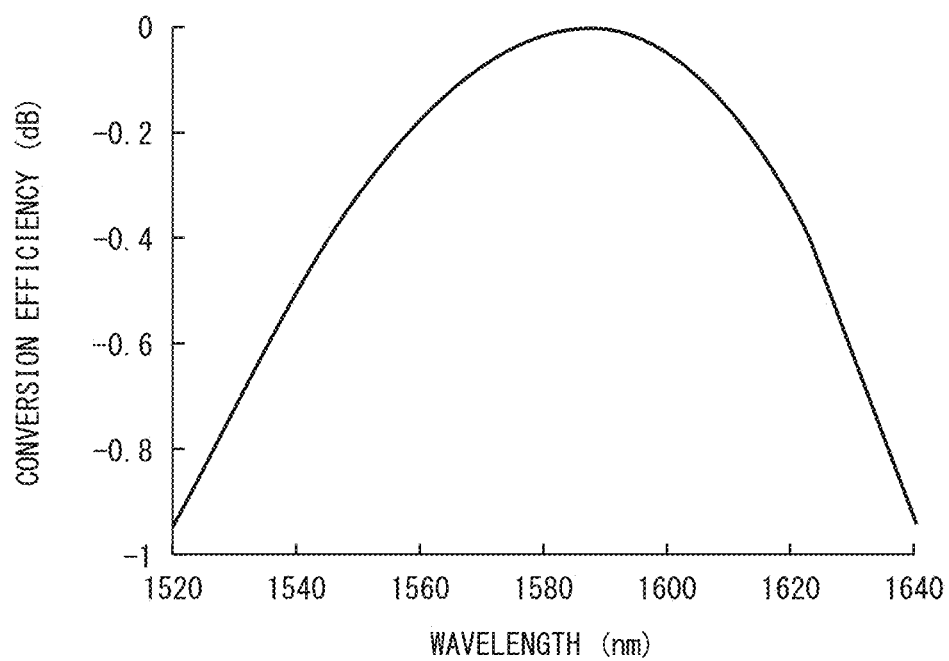
Figure 72:
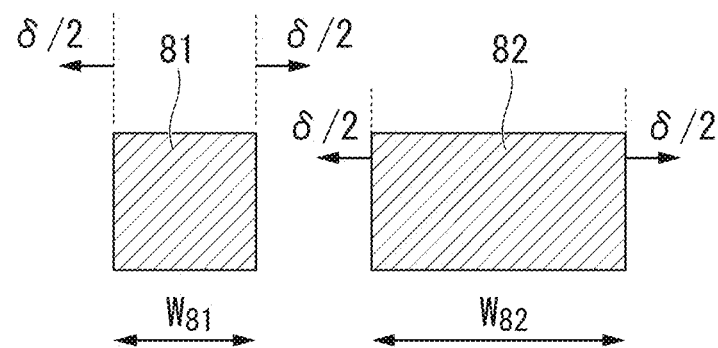
Figure 73:
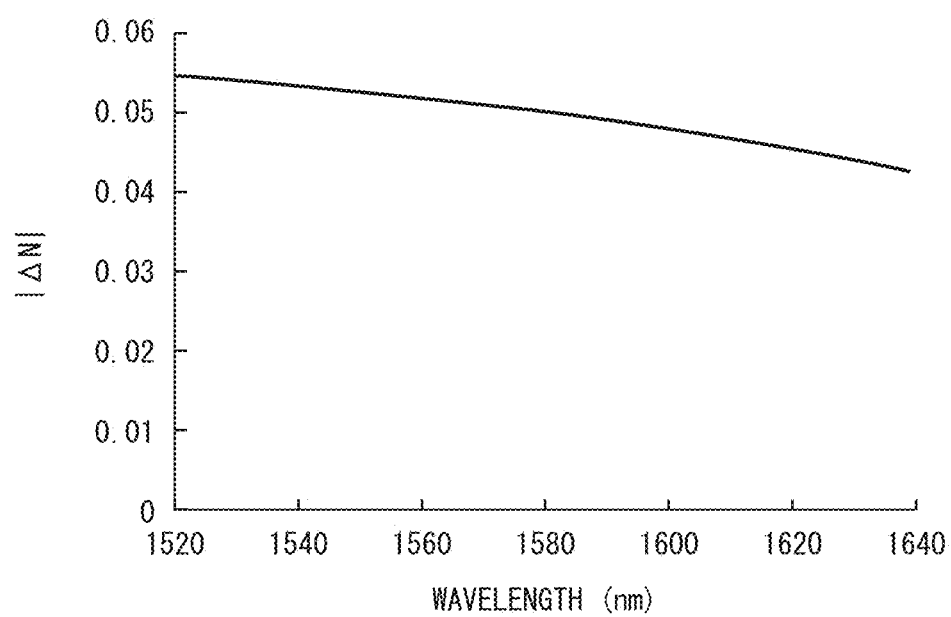

FIG. 21 shows comparison results of the influences of wavelengths on conversion efficiencies in Example 1 and Comparative Example 1. The results of Example 1 and Comparative Example 1 are written as Example 1-1 and Comparative Example 1-1, respectively. These results are the same as in graphs illustrated in FIGS. 18 and 71.

Referring to FIG. 21, in Comparative Example 1 (Comparative Example 1-1), loss is low compared with Example 1 in the vicinity of a wavelength of 1580 nm, but as the wavelength is changed, the conversion efficiency is greatly reduced. Thus, a loss change due to the wavelength is large.

On the other hand, Example 1 (Example 1-1) is inferior to Comparative Example 1 (Comparative Example 1-1) in the vicinity of 1580 nm, but a loss change depending on a wavelength is small at 1520 nm to 1640 nm (a wavelength range which covers a C+L band in optical communication).

Further, when comparing the minimum conversion efficiency in this wavelength range, it can be understood that Example 1 (Example 1-1) has a higher minimum conversion efficiency.

As described above, in Example 1 (Example 1-1), the conversion can be performed with high efficiency over a wide wavelength range compared with Comparative Example 1 (Comparative Example 1-1).

In Example 1 (Example 1-1), since the super mode-generating element uses adiabatic change, by increasing a taper length, it is possible to further lower loss.

On the other hand, in the asymmetric directional coupler of Comparative Example 1 (Comparative Example 1-1), since it is difficult to remarkably change the length, no further improvement in conversion efficiency can be expected.

Figure 22:
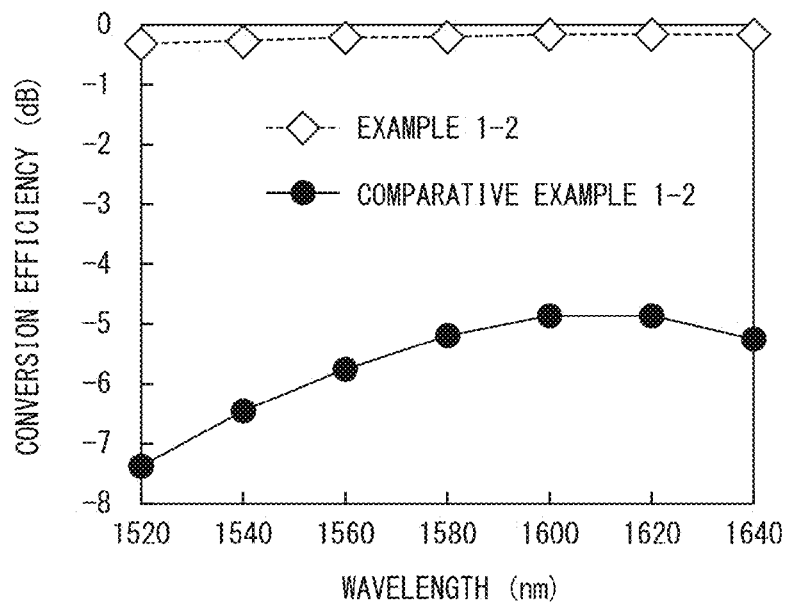
FIG. 22 is a graph illustrating a relationship between a wavelength and conversion efficiency in a case where the width of a core portion (and an output portion) is changed.

Subsequently, FIG. 22 shows comparison results of the influences of manufacturing errors on conversion efficiencies in Example 1 and Comparative Example 1. FIG. 22 shows a conversion efficiency when the width of a core portion (and an output portion) is changed by −30 nm. The results in Example 1 and Comparative Example 1 are written as Example 1-2 and Comparative Example 1-2. These results are the same as in graphs illustrated in FIG. 19 and FIG. 74.

Referring to FIG. 22, in Comparative Example 1 (Comparative Example 1-2), phase matching is not established and the conversion efficiency is reduced, but in Example 1 (Example 1-2), high conversion efficiency is maintained. Accordingly, Example 1 (Example 1-2) has a small influence due to a manufacturing error compared with Comparative Example 1 (Comparative Example 1-2).

It can be understood from these results that Example 1 has higher conversion efficiency in a wide wavelength band and is less influenced by a manufacturing error compared with the related art technique.

Example 2

<Planar Optical Waveguide Device>

Figure 23:
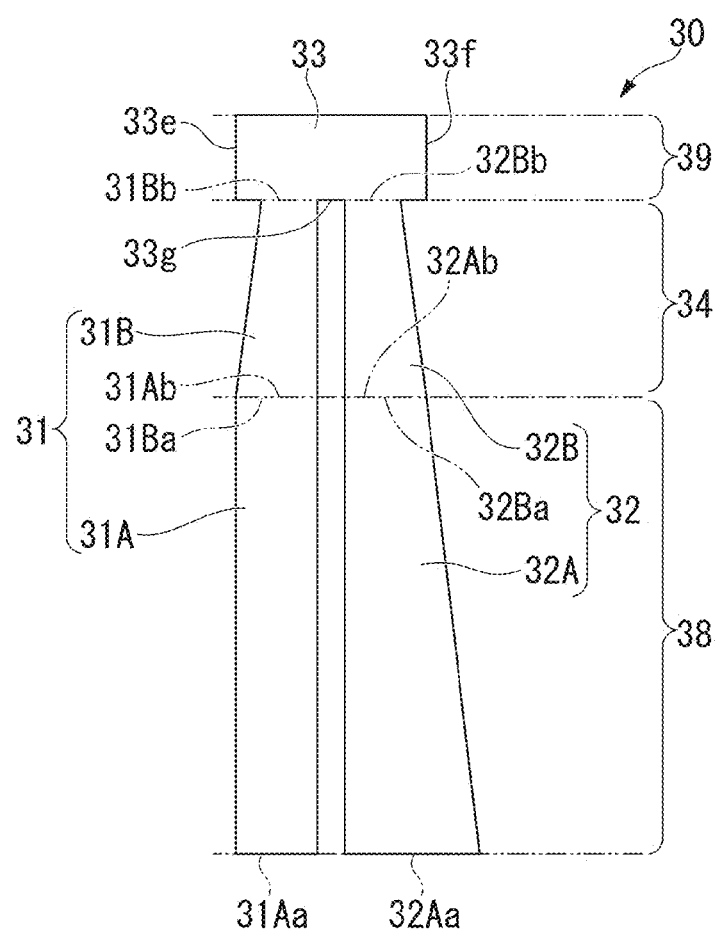
FIG. 23 is a plan view illustrating a first example of a planar optical waveguide device having a structure in which an intermediate core portion is provided between the preceding-stage mode conversion section and the subsequent-stage mode conversion section.

FIG. 23 is a plan view illustrating a planar optical waveguide device 30 (mode conversion element) according to Example 2. Example 2 corresponds to a first example of a structure in which an intermediate core portion is provided between a preceding-stage mode conversion section and a subsequent-stage mode conversion section, in which the intermediate core portion connects the preceding-stage mode conversion section and the subsequent-stage mode conversion section.

The planar optical waveguide device 30 includes a pair of core portions 31 and 32 which are disposed in parallel with each other, and an output portion 33 (subsequent-stage mode conversion section 39) provided on a subsequent-stage side (output-side) of the core portions 31 and 32. It is preferable that the heights of the core portions 31 and 32 and the output portion 33 be equal to each other.

The planar optical waveguide device 30 is different from the planar optical waveguide device 10 illustrated in FIGS. 1A and 1B in that an intermediate core portion 34 including tapered core portions 31B and 32B is interposed between a preceding-stage mode conversion section 38 and a subsequent-stage mode conversion section 39.

Among core portions 31A and 32A that form the preceding-stage mode conversion section 38, the core portion 31A linearly extends, and the width thereof is uniform in a length direction (light waveguide direction).

The core portion 32A is formed in a tapered shape in which the width thereof continuously decreases from an input end 32Aa to an output end 32Ab. A gap between the core portion 31A and 32A is uniform along the length direction.

In the preceding-stage mode conversion section 38, since the width of the core portion 32A is larger than the width of the core portion 31A at the input ends 31Aa and 32Aa, a cross section of the core portion 32A is larger than a cross section of the core portion 31A.

At the output ends 31Ab and 32Ab, since the widths of the core portions 31A and 32A are equal to each other, the shapes and sizes of the cross sections of the core portions 31A and 32A are equal to each other.

In the preceding-stage mode conversion section 38, phase matching is not established at the input ends 31Aa and 32Aa, and phase matching is established at the output ends 31Ab and 32Ab.

The core portion 31B among the core portions 31B and 32B that form the intermediate core portion 34 is formed to be connected to the core portion 31A, and is formed in a tapered shape in which the width continuously decreases from an input end 31Ba to an output end 31Bb.

The width of the input end 31Ba of the core portion 31B is the same as the width of the output end 31Ab of the core portion 31A.

The core portion 32B is formed to be connected to the core portion 32A, and is formed in a tapered shape in which the width continuously decreases from an input end 32Ba to an output end 32Bb.

The width of the input end 32Ba of the core portion 32B is the same as the width of the output end 32Ab of the core portion 32A. Thus, the shapes and sizes of the cross sections of the core portions 31B and 32B at the input ends 31Ba and 32Ba are equal to each other.

The widths of the core portions 31B and 32B at the output ends 31Bb and 32Bb are equal to each other. Thus, the shapes and sizes of the cross sections of the core portions 31B and 32B at the output ends 31Bb and 32Bb are equal to each other.

A gap between the core portions 31B and 32B are uniform in the length direction.

The output portion 33 may have a rectangular cross section.

The output portion 33 is a linear waveguide that linearly extends, and it is preferable that the width and the height be uniform in the length direction (light waveguide direction).

The width of the output portion 33 at an input end 33g is larger than the sum of the widths of the core portions 31B and 32B and the gap between the core portions 31B and 32B at the output ends 31Bb and 32Bb. Thus, the output portion 33 includes a protrusion 33e that protrudes outward from an outer edge of the core 31B, and a protrusion 33f that protrudes outward from an outer edge of the core 32B.

At a connection end (input end of the output portion 33), a central line of the output portion 33 in the width direction and a central line between the core portions 31B and 32B in the width direction match each other.

The central line between the core portions 31B and 32B is a line that passes through the center of a width directional range including the core portions 31B and 32B and the gap therebetween.

The central line of the output portion 33 is a line that extends along the direction where the output portion 33 extends, and passes through the center of the output portion 33 in the width direction.

In the planar optical waveguide device 30, since the intermediate core portion 34 having a tapered structure is provided, it is possible to smoothly change the width of the core portion 31 from the preceding-stage mode conversion section 38 to the subsequent-stage mode conversion section 39.

Thus, it is possible to connect the preceding-stage mode conversion section 38 and the subsequent-stage mode conversion section 39 with low loss, although the widths of the core portion 31A and the core portion 31C are different from each other.

Example 3

<Planar Optical Waveguide Device>

Figure 24:
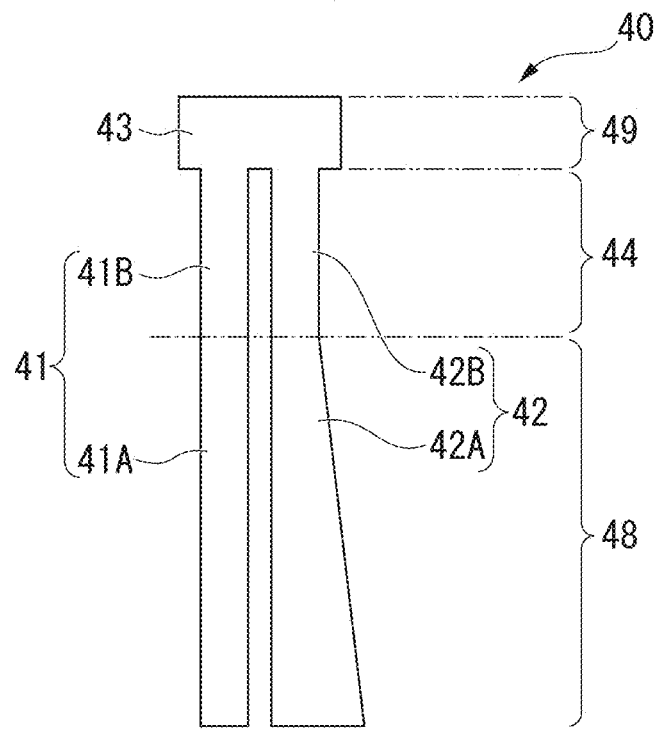
FIG. 24 is a plan view illustrating a second example of the planar optical waveguide device having the structure in which the intermediate core portion is provided between the preceding-stage mode conversion section and the subsequent-stage mode conversion section.

FIG. 24 is a plan view illustrating a planar optical waveguide device 40 (mode conversion element) according to Example 3. Example 3 corresponds to a second example of a structure in which an intermediate core portion is provided between a preceding-stage mode conversion section and a subsequent-stage mode conversion section.

The planar optical waveguide device 40 includes a pair of core portions 41 and 42 which are disposed in parallel with each other, and an output portion 43 provided on a subsequent-stage side (output-side) of the core portions 41 and 42. It is preferable that the heights of the core portions 41 and 42 and the output portion 43 be equal to each other.

The planar optical waveguide device 40 is different from the planar optical waveguide device 10 illustrated in FIGS. 1A and 1B in that an intermediate core portion 44 including tapered core portions 41B and 42B is interposed between a preceding-stage mode conversion section 48 and a subsequent-stage mode conversion section 49.

Among core portions 41A and 42A that form the preceding-stage mode conversion section 48, the core portion 41A linearly extends, and the width thereof is uniform in a length direction (light waveguide direction). The core portion 42A is formed in a tapered shape in which the width continuously decreases from an input end to an output end.

In the preceding-stage mode conversion section 48, since the width of the core portion 42A is larger than the width of the core portion 41A at input ends, a cross section of the core portion 42A is larger than a cross section of the core portion 41A.

Since the widths of the core portions 41A and 42A are equal to each other at output ends, the shapes and sizes of the cross sections of the core portions 41A and 42A are equal to each other.

In the preceding-stage mode conversion section 48, phase matching is not established at the input ends, and phase matching is established at the output ends.

The core portion 41B among the core portions 41B and 42B that form the intermediate core portion 44 is formed to be connected to the core portion 41A, and the width is uniform in the length direction (light waveguide direction). The core portion 41B linearly extends, and the width at the input end is the same as the width at the output end of the core portion 41A.

The core portion 42B is formed to be connected to the core portion 42A, and the width is uniform in the length direction (light waveguide direction). The core portion 42B linearly extends, and the width at the input end is the same as the width at the output end of the core portion 42A.

The widths of the core portions 41B and 42B are equal to each other. Thus, the shapes of cross sections of the core portions 41B and 42B are equal to each other over the entire length.

A gap between the core portions 41B and 42B is uniform.

The output ends of the core portions 41B and 42B are connected to the output portion 43.

The output portion 43 that forms the subsequent-stage mode conversion section 49 has the same structure as in the output portion 33 in the previous figure.

That is, the width of the output portion 43 at the input end is larger than the sum of the widths of the core portions 41B and 42B at the output ends and the gap between the core portions 41B and 42B. Thus, the output portion 43 is formed to protrude outward from outer edges of the cores 41B and 42B, respectively.

A central line of the output portion 43 in the width direction and a central line between the cores 41B and 42B in the width direction match each other, at a connection end (an input end of the output portion 43).

The central line between the core portions 41B and 42B is a line that passes through the center of a width directional range including the core portions 41B and 42B and the gap therebetween.

The central line of the output portion 43 is a line that extends in the direction where the output portion 43 extends, and passes through the center of the output portion 43 in the width direction.

In the planar optical waveguide device 40, since the linear intermediate core portion 44 is provided between the preceding-stage mode conversion section 48 and the subsequent-stage mode conversion section 49, it is possible to increase the degree of freedom in disposition of the subsequent-stage mode conversion section 49.

Example 4

<Planar Optical Waveguide Device>

Figure 25:
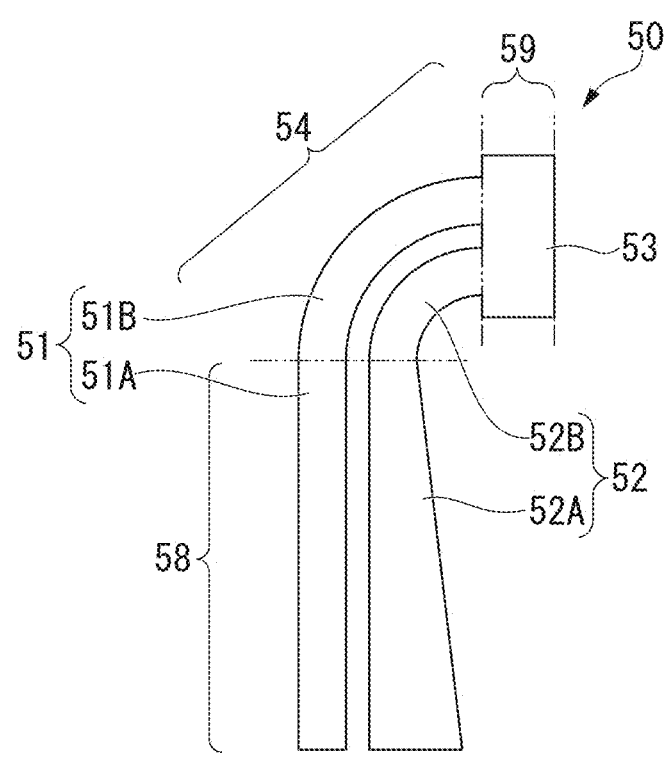
FIG. 25 is a plan view illustrating a third example of the planar optical waveguide device having the structure in which the intermediate core portion is provided between the preceding-stage mode conversion section and the subsequent-stage mode conversion section.

FIG. 25 is a plan view illustrating a planar optical waveguide device 50 (mode conversion element) according to Example 4. Example 4 corresponds to a third example of a structure in which an intermediate core portion is provided between a preceding-stage mode conversion section and a subsequent-stage mode conversion section.

The planar optical waveguide device 50 includes a pair of core portions 51 and 52 which are disposed in parallel with each other, and an output portion 53 provided on a subsequent-stage side (output-side) of the core portions 51 and 52. It is preferable that the heights of the core portions 51 and 52 and the output portion 53 be equal to each other.

The planar optical waveguide device 50 is different from the planar optical waveguide device 10 illustrated in FIGS. 1A and 1B in that an intermediate core portion 54 including curved core portions 51B and 52B is interposed between a preceding-stage mode conversion section 58 and a subsequent-stage mode conversion section 59.

Among core portions 51A and 52A that form the preceding-stage mode conversion section 58, the core portion 51A linearly extends, and the width thereof is uniform in a length direction (light waveguide direction). The core portion 52A is formed in a tapered shape in which the width continuously decreases from an input end to an output end.

In the preceding-stage mode conversion section 58, since the width of the core portion 52A is larger than the width of the core portion 51A at input ends, a cross section of the core portion 52A is larger than a cross section of the core portion 51A.

Since the widths of the core portions 51A and 52A are equal to each other at output ends, the shapes and sizes of the cross sections of the core portions 51A and 52A are equal to each other.

In the preceding-stage mode conversion section 58, phase matching is not established at the input ends, and phase matching is established at the output ends.

The core portion 51B among the core portions 51B and 52B that form the intermediate core portion 54 is formed to be connected to the core portion 51A, and the width is uniform in the length direction (light waveguide direction). The width of the input end of the core portion 51B is the same as the width at the output end of the core portion 51A.

The core portion 52B is formed to be connected to the core portion 52A, and the width is uniform in the length direction (light waveguide direction). The width of the input end of the core portion 52B is the same as the width at the output end of the core portion 52A.

It is preferable that planar shapes of the core portions 51B and 52B be arc shapes, but the planar shapes are not limited thereto, and may be arbitrary curve shapes. For example, a high-order curve shape (for example, a quadratic curve shape) such as an elliptical arc shape, a parabolic shape, or a hyperbolic shape may be employed.

It is preferable that the widths of the core portions 51B and 52B be equal to each other.

A gap between the core portions 51B and 52B is uniform in the length direction.

The output ends of the core portions 51B and 52B are connected to the output portion 53.

The output portion 53 that forms the subsequent-stage mode conversion section 59 has the same structure as in the output portion 43 in the previous figure.

That is, the width of the output portion 53 at the input end is larger than the sum of the widths of the core portions 51B and 52B at the output ends and the gap between the core portions 51B and 52B. Thus, the output portion 53 is formed to protrude outward from outer edges of the cores 51B and 52B, respectively.

A central line of the output portion 53 in the width direction and a central line between the cores 51B and 52B in the width direction match each other, at a connection end (an input end of the output portion 53).

The central line between the core portions 51B and 52B is a line that passes through the center of a width directional range including the core portions 51B and 52B and the gap therebetween.

The central line of the output portion 53 is a line that extends in the direction where the output portion 53 extends, and passes through the center of the output portion 53 in the width direction.

In the planar optical waveguide devices 30 to 50, the intermediate core portion may be included in the preceding-stage mode conversion section.

Example 5

<Planar Optical Waveguide Device>

Figure 26:
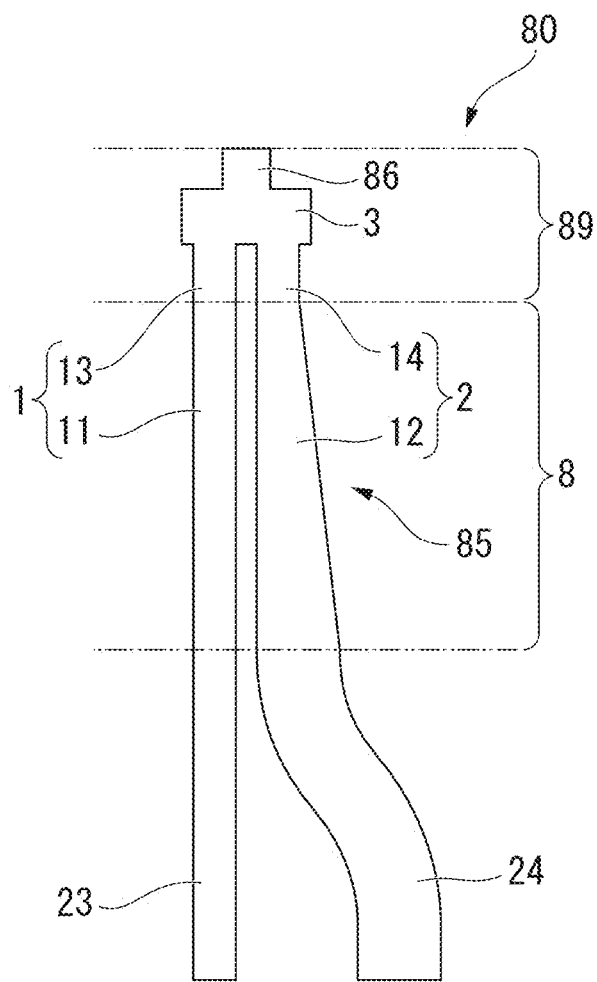
FIG. 26 is a plan view illustrating a planar optical waveguide device using a modification example of a matching coupling element.

FIG. 26 is a plan view illustrating a planar optical waveguide device 80 (mode conversion element) according to Example 5.

The planar optical waveguide device 80 has the same configuration as that of the planar optical waveguide device 20 illustrated in FIGS. 15A and 15B except that a core 85 instead of the core 5 is provided.

The core 85 includes a preceding-stage mode conversion section 8 and a subsequent-stage mode conversion section 89.

The subsequent-stage mode conversion section 89 includes core portions 13 and 14, an output portion 3 provided on an output-side of the core portions 13 and 14, and a single output-side core portion 86 that extends from an output-side of the output portion 3.

The width of the output-side core portion 86 is smaller than the width of the output portion 3. It is preferable that the output-side core portion 86 have a rectangular cross section.

The subsequent-stage mode conversion section 89 is configured so that two core portions 13 and 14 are connected to the input side of the output portion 3 and one output-side core portion 86 is connected to the output-side thereof. Thus, the subsequent-stage mode conversion section 89 may be used as a 1×2 MMI (multi-mode interferometer).

Example 6

<Planar Optical Waveguide Device>

Figure 27:
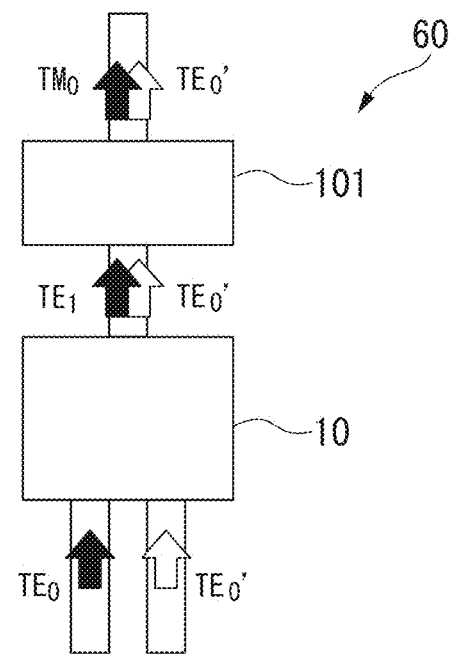
FIG. 27 is a plan view illustrating an example of a planar optical waveguide device using a high-order polarization conversion element.

FIG. 27 is a plan view illustrating a planar optical waveguide device 60 (polarization conversion element) according to Example 6.

The planar optical waveguide device 60 has a configuration in which a high-order polarization conversion element 101 (high-order polarization-converting section) is provided on the output-side of the planar optical waveguide device 10 (mode conversion element) illustrated in FIGS. 1A and 1B. The high-order polarization conversion refers to conversion between $TE_1$ and $TM_0$.

Figure 28A:
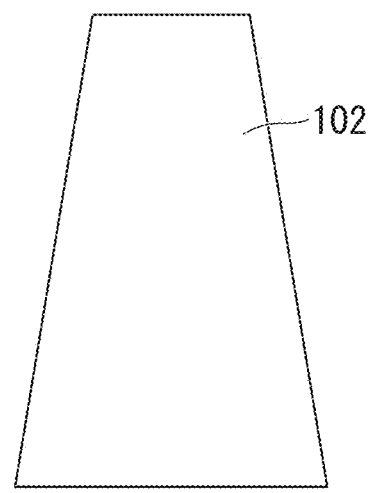
FIG. 28A is a plan view schematically illustrating an example of the high-order polarization conversion element shown in FIG. 27.
Figure 28B:
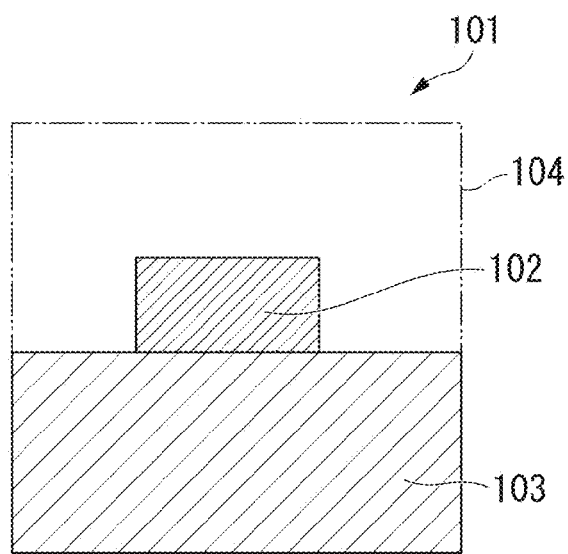
FIG. 28B is a sectional view schematically illustrating an example of the high-order polarization conversion element shown in FIG. 27.

FIGS. 28A and 28B are diagrams illustrating examples of a structure of the high-order polarization conversion element 101 (see Non-Patent Document 1), in which FIG. 28A is a plan view thereof, and FIG. 28B is a sectional view thereof. The high-order polarization conversion element 101 includes an optical waveguide that includes a core 102, a lower cladding 103 having a refractive index lower than that of the core, and an upper cladding 104 having a refractive index lower than that of the core 102.

The core 102 is formed of Si, for example. The lower cladding 103 is formed of $SiO_2$, for example. The upper cladding 104 is formed of air, for example.

In order to perform the high-order polarization conversion, it is necessary that the upper cladding 104 and the lower cladding 103 have different refractive index.

The planar optical waveguide device 60 illustrated in FIG. 27 is capable of converting $TE_0$ into $TE_1$ by the planar optical waveguide device 10, and is capable of converting $TE_1$ into $TM_0$ by the high-order polarization conversion element 101.

In the high-order polarization conversion element 101, since $TE_0$ is not converted into a different mode, $TE_0$ (written as $TE_0'$ for distinction) which is input to the core portion 2 and is output from the output portion 3 is not converted.

Thus, an output obtained by combining $TM_0$ and $TE_0'$ is output from an output-side of the high-order polarization conversion element 101. Accordingly, the planar optical waveguide device 60 can be used as an element for performing polarization multiplexing.

Example 7

<Planar Optical Waveguide Device (Polarization Conversion Element)>

In the planar optical waveguide device 60 in FIG. 27, a high-order polarization conversion element 61 illustrated in FIGS. 29A to 29D, instead of the high-order polarization conversion element 101, may be used.

Figure 29A:
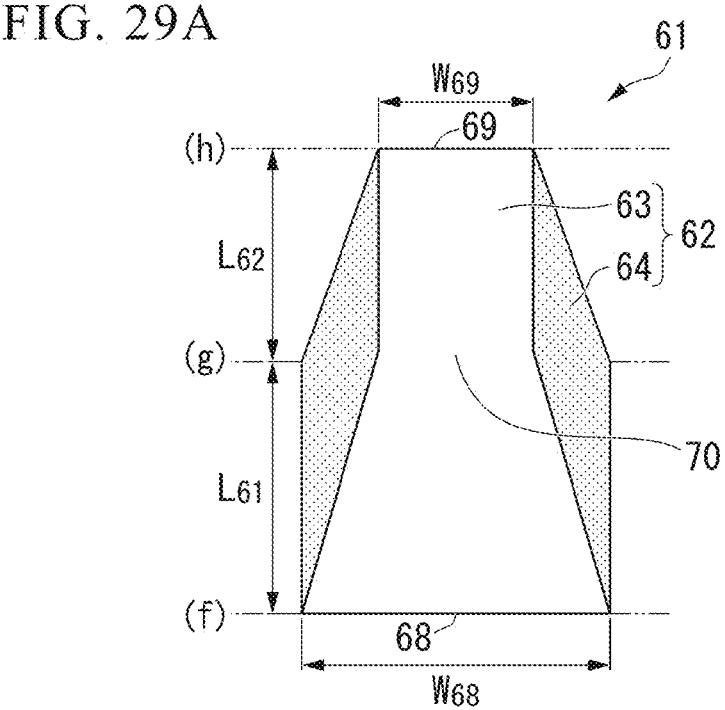
FIG. 29A is a plan view illustrating another example of the high-order polarization conversion element.
Figure 29B:
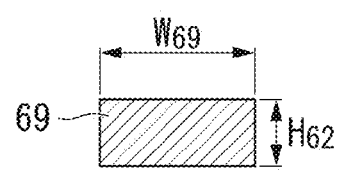
FIG. 29B is a sectional view at a sectional position (h), illustrating another example of the high-order polarization conversion element.
Figure 29C:
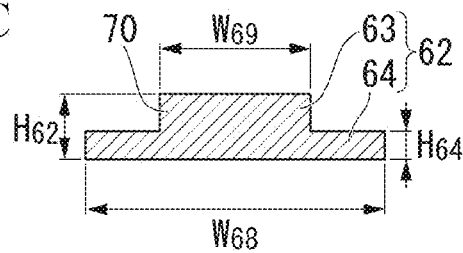
FIG. 29C is a sectional view at a sectional position (g), illustrating another example of the high-order polarization conversion element.
Figure 29D:
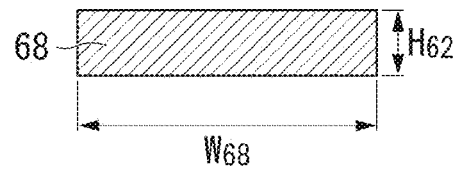
FIG. 29D is a sectional view at a sectional position (f), illustrating another example of the high-order polarization conversion element.

FIG. 29A is a plan view of a core 62, and FIGS. 29B to 29D are sectional views of an ending portion, an intermediate portion, and a starting portion of the core 62, respectively. A cladding (not shown) is provided in the vicinity of the core 62. In FIG. 29A, shading is given to a lower core 64.

In the high-order polarization conversion element 61, the core 62 includes the lower core 64 which has a rectangular cross section, and an upper core 63 which is formed on the lower core 64 and has a rectangular cross section. In a starting portion 68 and an ending portion 69, since both side edges of the upper core 63 are disposed at positions that overlap both side edges of the lower core 64, respectively, the core 62 is formed to have a rectangular cross section.

The width $W_{68}$ of the starting portion 68 is larger than the width W69 of the ending portion 69. Both the heights of the starting portion 68 and the ending portion 69 are $H_{62}$, and the height $H_{64}$ of the lower core 64 is lower than the core height $H_{62}$.

In a section $L_{61}$ from the starting portion 68 to the intermediate portion 70, the width of the lower core 64 is uniform, and the width of the upper core 13 gradually decreases from the starting portion 68 to the intermediate portion 70.

In a section $L_{62}$ from the intermediate portion 70 to the ending portion 69, the width of the lower core 64 gradually decreases from the intermediate portion 70 to the ending portion 69, and the width of the upper core 63 is uniform.

In the high-order polarization conversion element 61, the core 62 has an asymmetric structure in a height direction, and the width of a part of each of the upper core 63 and the lower core 64 is smoothly changed. Thus, it is possible to convert $TE_1$ into $TM_0$.

<Planar Optical Waveguide Device>

Figure 30A:
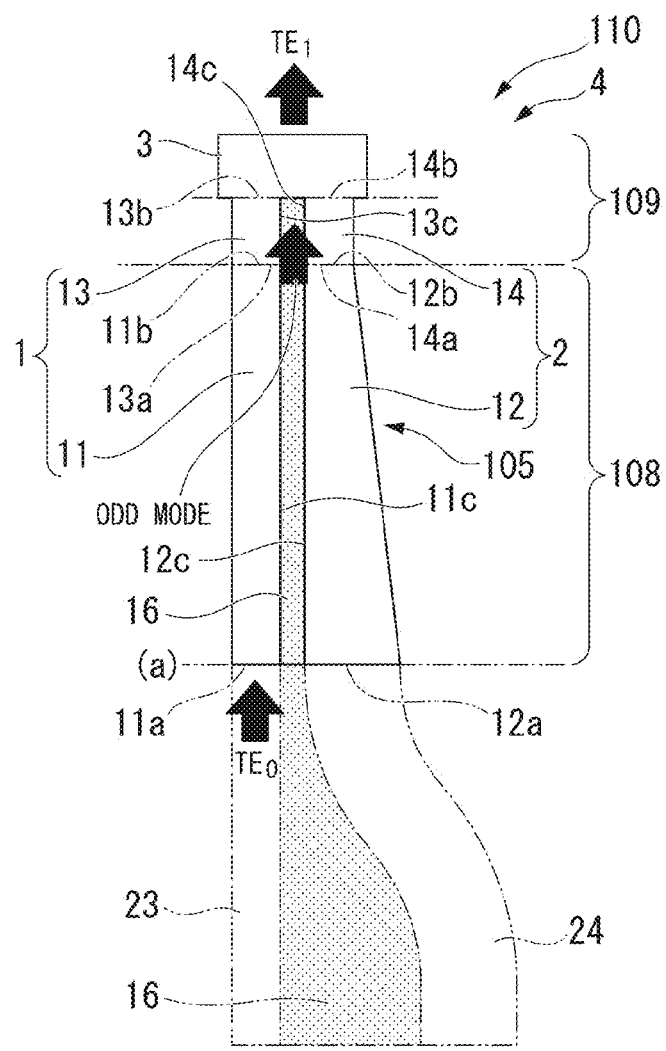
FIG. 30A is a plan view illustrating a planar optical waveguide device according to a second embodiment of the invention.
Figure 30B:
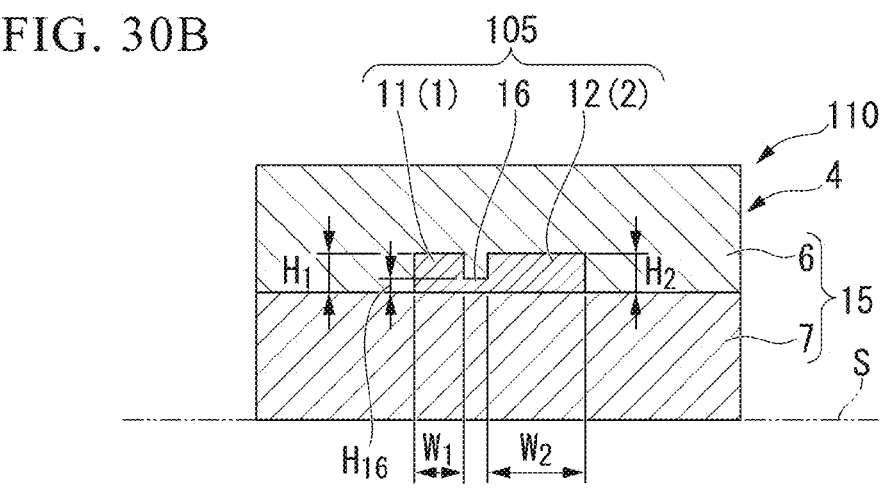
FIG. 30B is a sectional view at a sectional position (a), illustrating the planar optical waveguide device according to the second embodiment of the invention.

A structure of the planar optical waveguide device 110 according to a second embodiment of the invention will be described with reference to FIGS. 30A and 30B. FIG. 30A is a plan view illustrating the planar optical waveguide device 110, and FIG. 30B is a sectional view at a sectional position (a) in FIG. 30A. The same reference numerals are given to the same configurations as those of the above-described planar optical waveguide device 10 shown in FIGS. 1A and 1B, and description thereof will not be repeated.

As shown in FIGS. 30A and 30B, the planar optical waveguide device 110 (mode conversion element) has the same configuration as that of the planar optical waveguide device 10 illustrated in FIGS. 1A and 1B except that a core 105 is provided, instead of the core 5. In FIG. 30A, shading is given to a slab portion 16.

The core 105 includes a pair of core portions 1 and 2 (rib portions) which are disposed in parallel with each other, a slab portion 16 which is formed at least between the core portions 1 and 2, and an output portion 3 provided on a subsequent-stage side (output-side) thereof.

The slab portion 16 is formed to have a height lower than those of the core portions 1 and 2. That is, as shown in FIG. 30B, the height $H_{16}$ of the slab portion 16 is lower than the heights $H_1$ and $H_2$ of the core portions 1 and 2.

As shown in FIG. 30A, the slab portion 16 is formed to connect the core portions 1 and 2 in at least a part of the core portions 1 and 2 in a length direction.

The slab portion 16 is formed between opposite inner surfaces of the core portions 1 and 2 (that is, between side surfaces of inner edges 11c and 13c of the core portion 1 and side surfaces of inner edges 12c and 14c of the core portion 2).

In the example shown in the figures, the slab portion 16 is formed over the entire length of the core portions 1 and 2. Here, the slab portion 16 may be formed only over a partial length of the core portions 1 and 2.

The slab portion 16 is formed of the same material (preferably, Si) as those of the core portions 1 and 2, and is integrally formed with the core portions 1 and 2.

As shown in FIG. 30B, the slab portion 16 is formed to extend from lower parts of the inner surfaces of the core portions 1 and 2, and a lower surface of the slab portion 16 is continuous with lower surfaces of the core portions 1 and 2. The core portions 1 and 2 protrude upward from an upper surface of the slab portion 16.

The core 105 forms a so-called half-rib waveguide since the slab portion 16 is provided on only one side (inner side) of each of the core portions 1 and 2 in the width direction.

As shown in FIG. 30A, the core 105 includes a preceding-stage mode conversion section 108 (super mode-generating element) that converts a mode of light that propagates through the core portions 1 and 2, and a subsequent-stage mode conversion section 109 (matching coupling element) that converts a mode of light passed through the preceding-stage mode conversion section 108.

The preceding-stage mode conversion section 108 includes core portions 11 and 12 (rib portions), and the slab portion 16 provided therebetween.

The subsequent-stage mode conversion section 109 includes core portions 13 and 14 (rib portions), and the slab portion 16 provided therebetween. The subsequent-stage mode conversion section 109 is formed to be connected to a rear end (output-side) of the preceding-stage mode conversion section 108.

The planar optical waveguide device 110 may be manufactured by processing an SOI substrate. For example, an $SiO_2$ layer of the SOI substrate may be formed as a lower cladding, and an Si layer thereof may be formed as a core through a lithography/etching process.

The core may be formed by performing a lithography/etching process two times. That is, first, a core having a predetermined thickness is manufactured by a lithography/ etching process. Then, a part thereof is thinned by a lithography/etching process to be formed as a slab portion, to thereby form a core having core portions and a slab portion.

<Principle of Super Mode-Generating Element>

Figure 31A:
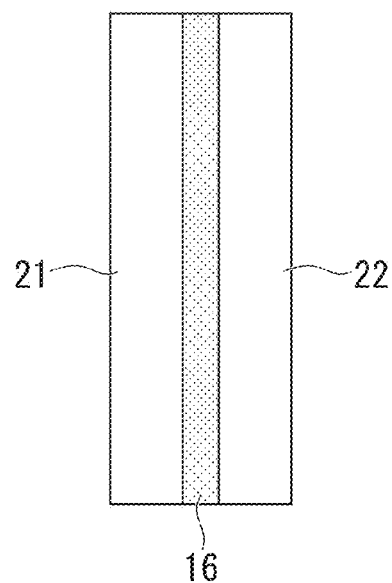
FIG. 31A is a plan view illustrating an example of an optical waveguide device.
Figure 31B:
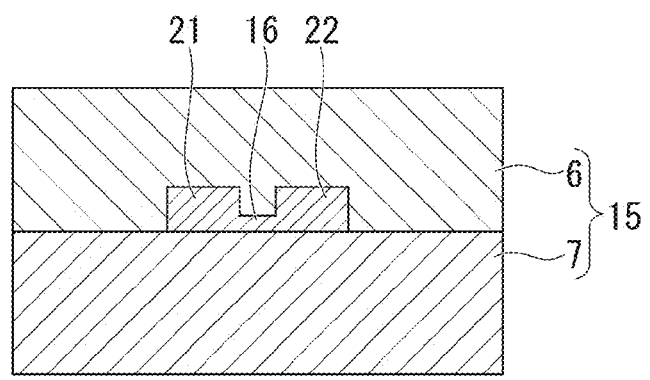
FIG. 31B is a sectional view illustrating the example of the optical waveguide device.

FIGS. 31A and 31B illustrate an optical waveguide device that includes core portions 21 and 22 of which the widths are equal to each other and a slab portion 16 formed between the core portions 21 and 22.

Figure 32A:
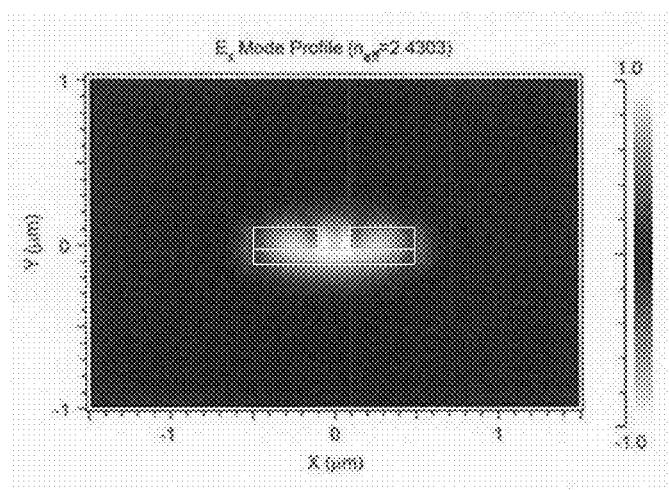
FIG. 32A is a diagram illustrating a simulation result of an electric field distribution ($E_x$ component) in an even mode in the optical waveguide device shown in FIGS. 31A and 31B.
Figure 32B:
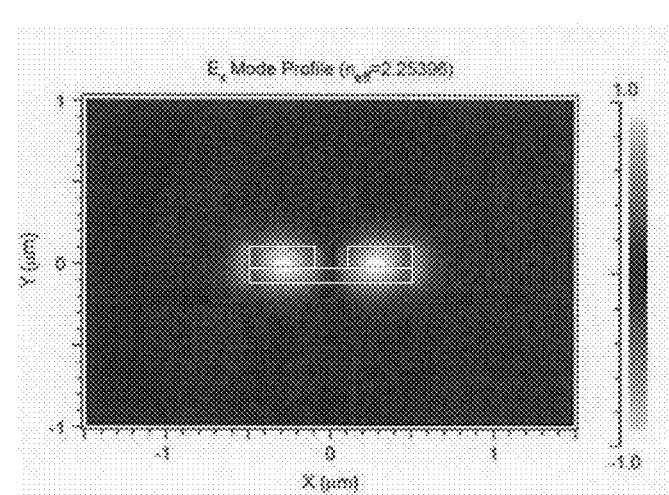
FIG. 32B is a diagram illustrating a simulation result of an electric field distribution ($E_x$ component) in an odd mode in the optical waveguide device shown in FIGS. 31A and 31B.
Figure 32C:
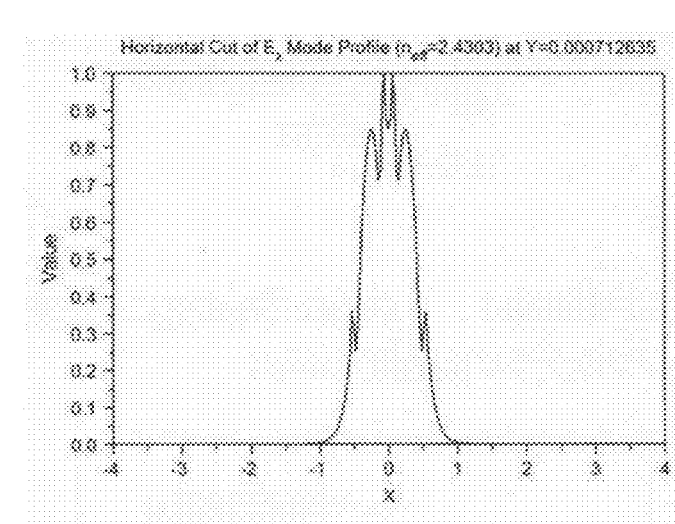
FIG. 32C is a graph of the electric field distribution ($E_x$ component) in the even mode in the optical waveguide device shown in FIGS. 31A and 31B.
Figure 32D:
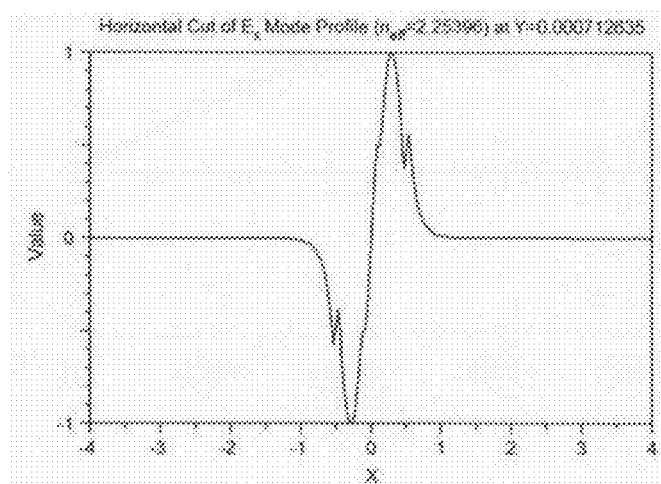
FIG. 32D is a graph of the electric field distribution ($E_x$ component) in the odd mode in the optical waveguide device shown in FIGS. 31A and 31B.

As shown in FIGS. 31 and 31B, modes when $TE_0$ and $TE_0$ are mode-coupled between contiguous waveguides are divided into an even mode as shown in FIGS. 32A and 32C, and an odd mode as shown in FIGS. 32B and 32D. These modes are collectively referred to as a super mode of $TE_0$ (or simply referred to as a super mode).

As described above, when phase matching is established, the lengths of waveguides necessary for movement of light leaked out from one waveguide to the other waveguide to form a super mode depend on a coupling coefficient $\chi$ which represents the strength of mode coupling.

<Specific Example of Super Mode-Generating Element>

The preceding-stage mode conversion section 108 which is a specific example of a super mode-generating element will be described with reference to FIGS. 30A and 301B, and FIGS. 33A to 33D.

Figure 33A:
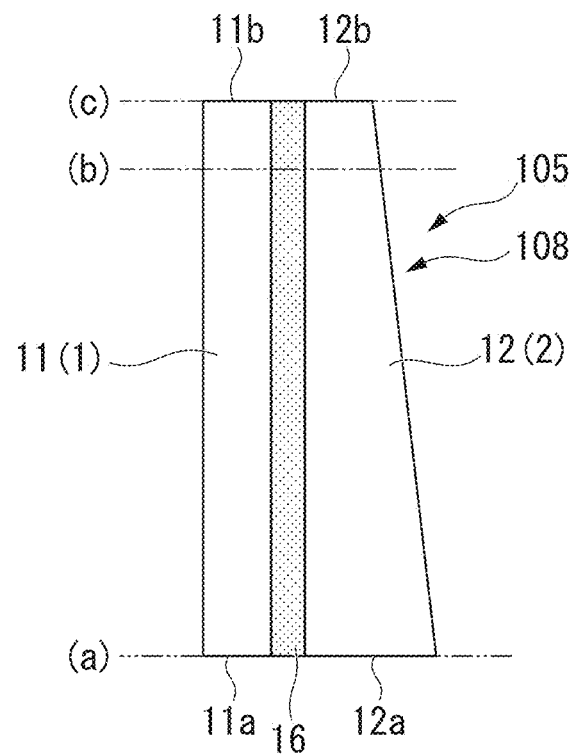
FIG. 33A is a plan view illustrating a structure of a preceding-stage mode conversion section.
Figure 33B:
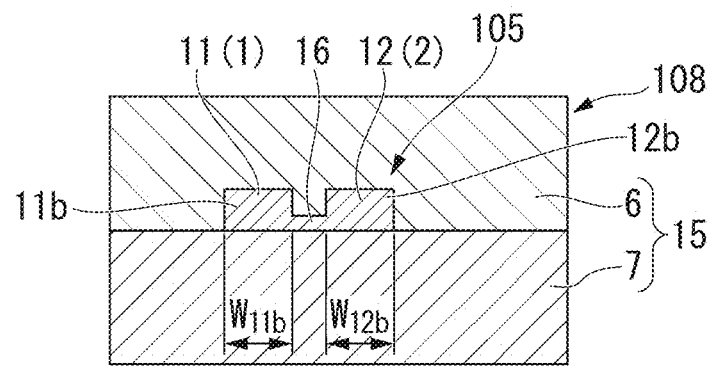
FIG. 33B is a sectional view at a sectional position (c), illustrating the structure of the preceding-stage mode conversion section.
Figure 33C:
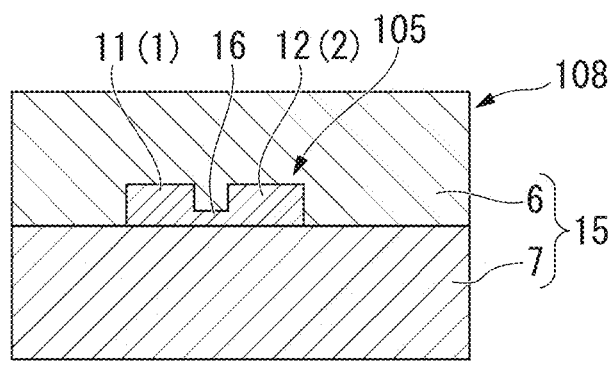
FIG. 33C is a sectional view at a sectional position (b), illustrating the structure of the preceding-stage mode conversion section.
Figure 33D:
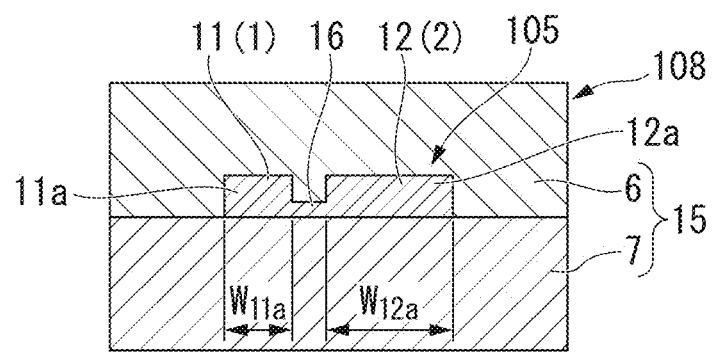
FIG. 33D is a sectional view at a sectional position (a), illustrating the structure of the preceding-stage mode conversion section.

FIG. 33A is a plan view thereof, FIG. 33B is a sectional view at a sectional position (c) in FIG. 33A, FIG. 33C is a sectional view at a sectional position (b), and FIG. 33D is a sectional view at a sectional position (a).

"Waveguide 1" corresponds to a waveguide having the core portion 11, and "waveguide 2" corresponds to the waveguide having the core portion 12.

The core portion 11 (core portion 1) and the core portion 12 (core portion 2) are formed of Si (having a refractive index of 3.48 (at a wavelength of 1580 nm)), and the upper cladding 6 and the lower cladding 7 are formed of $SiO_2$ (having a refractive index of 1.44 (at the wavelength of 1580 nm)). Further, the heights of the core portions 11 and 12 (core portions 1 and 2) are 220 nm. The height of the slab portion 16 is 95 nm. A gap between the core portions 11 and 12 (core portions 1 and 2) is 200 nm.

As shown in FIG. 33D, the width of the core portion 11 (core portion 1) is set to 400 [nm], and the width of the core portion 12 (core portion 2) is set to 400−X [nm](−200≤X≤0). Here, X is linearly changed from −200 to 0, from an input end 12a to an output end 12b. Thus, the core portion 12 (core portion 2) is formed in a tapered shape so that the width gradually decreases from the input end 12a (X=−200) to the output end 12b (X=0).

FIG. 33C shows a cross section at an intermediate position (X=−20) between the input ends 11a and 12a and the output ends 11b and 12b.

In the example illustrated in FIGS. 33A to 33D, at the input ends 11a and 12a, the width (width $W_{12a}$ in FIG. 33D) of the core portion 12 is larger than the width (width $W_{11a}$ in FIG. 33D) of the core portion 11. Thus, a cross section of the core portion 12 is formed to be larger than a cross section of the core portion 11. Thus, phase matching is not established, and mode coupling is not nearly performed.

On the other hand, at the output ends 11b and 12b, the widths (widths $W_{11b}$ and $W_{12b}$ in FIG. 33B) of the core portions 11 and 12 are equal to each other, and thus, the shapes and sizes of cross sections of the core portions 11 and 12 are equal to each other. Thus, phase matching is established.

Since the core portion 12 is formed in a tapered shape, phase matching is gradually performed along the light waveguide direction from the input end to the output end, and as a result, mode coupling is progressed. Thus, by sufficiently increasing the length (taper length) of the tapered waveguide (core portion 12), it is possible to convert $TE_0$ input to the waveguide 1 into the odd mode which is the super mode of $TE_0$ with almost no loss.

As described above, the lengths of waveguides necessary for movement of light leaked out from one waveguide to the other waveguide to form a super mode depend on the coupling coefficient $\chi$. Thus, as the coupling coefficient $\chi$ becomes larger, mode conversion may be performed with higher accuracy using shorter waveguides (shorter device length).

This principle will be described with reference to the above-described specific example.

Figure 34A:
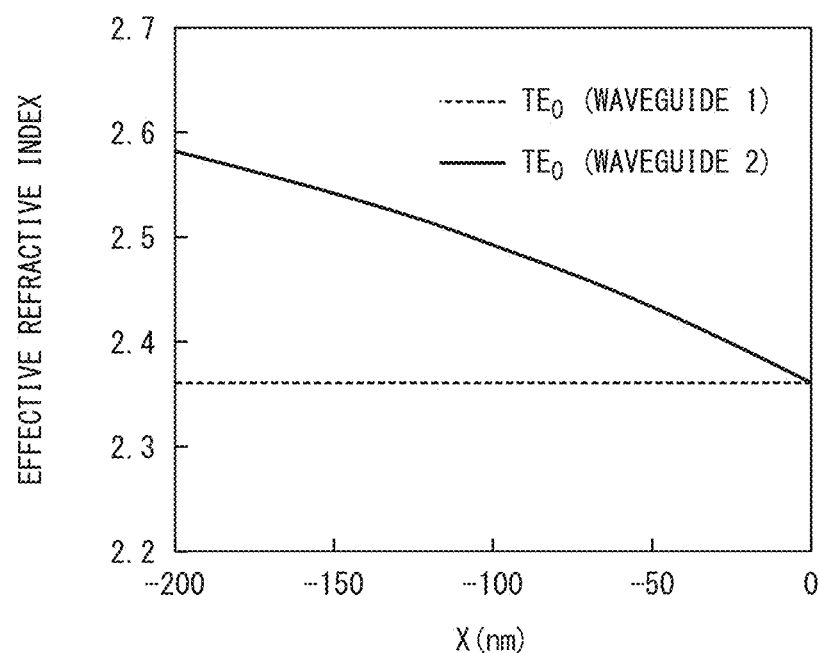
FIG. 34A is a diagram illustrating effective refractive indexes in a case where two waveguides are independently present.

In order to confirm that a phase-matching condition is broken at an input end by changing the width of a core portion in the light waveguide direction (that is, by tapering a waveguide), an effective refractive index in a mode in a case where the waveguides 1 and 2 are independently present are illustrated in FIG. 34A. Here, a wavelength was set to be 1580 nm (this is similarly applied hereinafter).

Figure 34B:
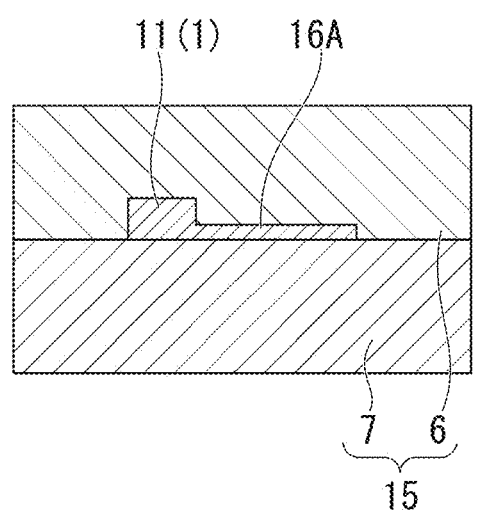
FIG. 34B is a sectional view illustrating a structure of one waveguide in a case where two waveguides are independently present.

FIG. 34B is a sectional view of the waveguide 1 in a case where the waveguide 1 having the core portion 1 is independently present. A core of the independent waveguide 1 includes a core portion 11 and a slab portion 16A (having a height of 95 nm) that extends from the core portion 11 in a width direction, and the entire width is the same as the width (400+200+(400−X) [nm]) of the core 105.

Figure 34C:
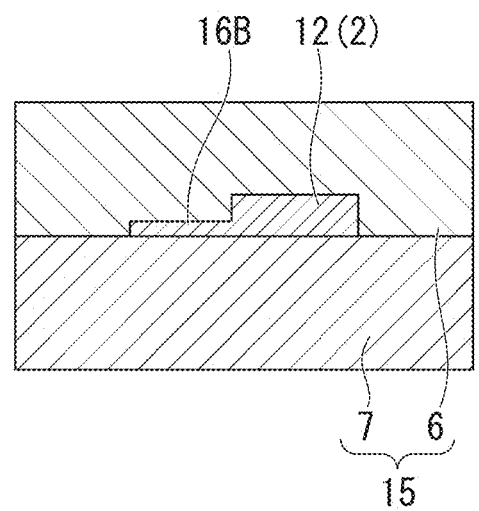
FIG. 34C is a sectional view illustrating a structure of the other waveguide in a case where two waveguides are independently present.

FIG. 34C is a sectional view illustrating the waveguide 2 in a case where the waveguide 2 having the core portion 12 is independently present. A core of the independent waveguide 2 includes a core portion 12 and a slab portion 16B (height of 95 nm) that extends from the core portion 12 in the width direction, and the entire width is the same as the width (400+200+(400−X) [nm]) of the core 105.

It can be understood from FIGS. 34A to 34C that effective refractive indexes in $TE_0$ of the waveguide 1 and $TE_0$ of the waveguide 2 are the same when X=0 and phase matching is established.

As X is separated from 0, deviation occurs in the effective refractive indexes in $TE_0$ and $TE_0$ of the waveguides 1 and 2, the phase-matching condition is broken.

Figure 35:
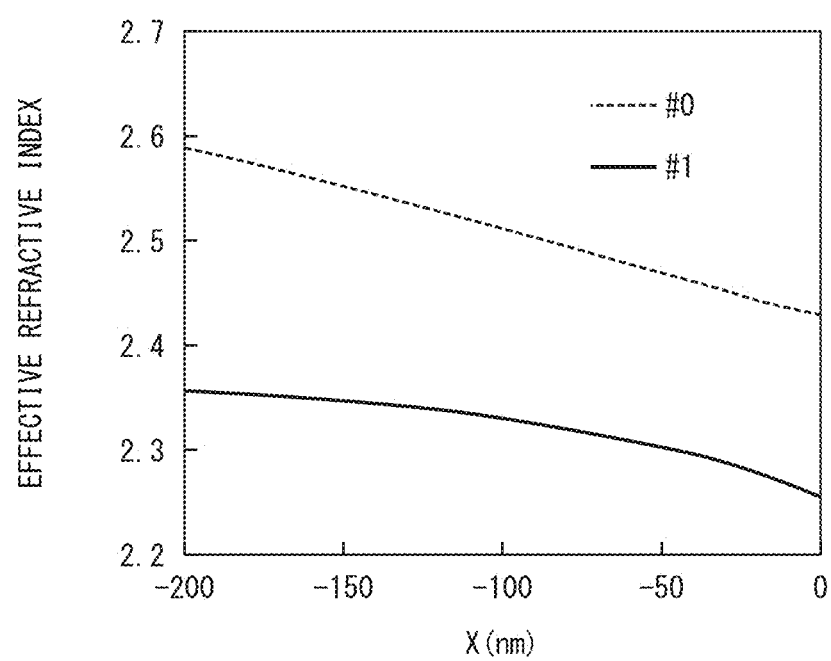
FIG. 35 is a diagram illustrating effective refractive indexes in a case where two waveguides are contiguous to each other.

FIG. 35 is a diagram illustrating effective refractive indexes in a case where waveguides 1 and 2 are contiguous to each other.

Compared with FIG. 34A illustrating the effective refractive index in a case where the waveguides are independently present, in FIG. 35, #0 and #1 do not match and are separated from each other when X=0.

This is because two modes mutually act due to mode coupling to form a mixed mode (super mode) since the phase-matching condition is satisfied between $TE_0$ of the waveguide 1 and $TE_0$ of the waveguide 2.

If X is separated from 0, since the phase-matching condition is not satisfied, such a mutual action does not occur, and the same mode distribution as in a case where the waveguides are independently present is obtained. As a result, the effective refractive indexes do not greatly change compared with a case where the waveguides are independently present.

In a structure in which a structure of a waveguide is gradually changed in a light waveguide direction, such as a tapered waveguide, it is known that mode conversion is performed so as to change on a curve of one effective refractive index (referred to as an adiabatic change).

Thus, in FIG. 35, by inputting $TE_0$ to the waveguide 1 when X=−200 (input end) and gradually changing X from −200 to 0 in the length direction of the waveguide, it is possible to convert $TE_0$ into the odd mode which is the super mode of $TE_0$ when X=0.

In order to confirm this mode conversion, FIGS. 36A to 36F illustrate electric field distributions in modes #0 and #1 at sectional positions (a) to (c) (see FIG. 33A).

Figure 36A:
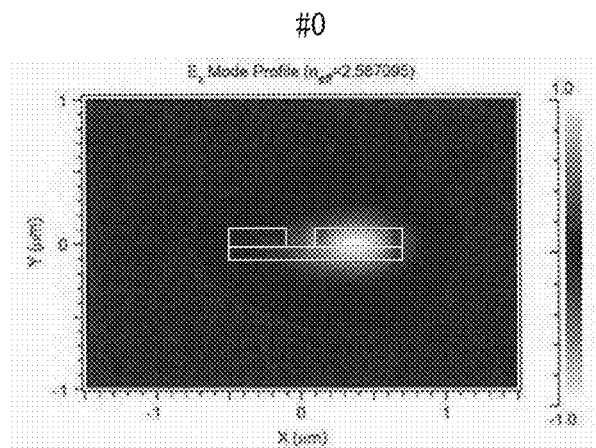
FIG. 36A is a diagram illustrating a simulation result of an electric field distribution ($E_x$ component) in a mode #0 at a sectional position (a) in FIG. 33A.
Figure 36B:
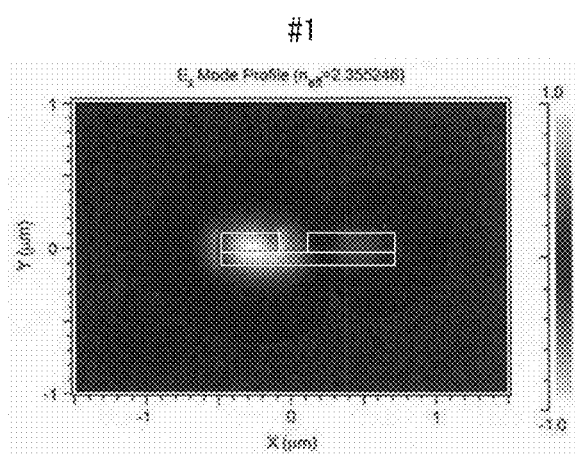
FIG. 36B is a diagram illustrating a simulation result of an electric field distribution ($E_x$ component) in a mode #1 at the sectional position (a) in FIG. 33A.
Figure 36C:
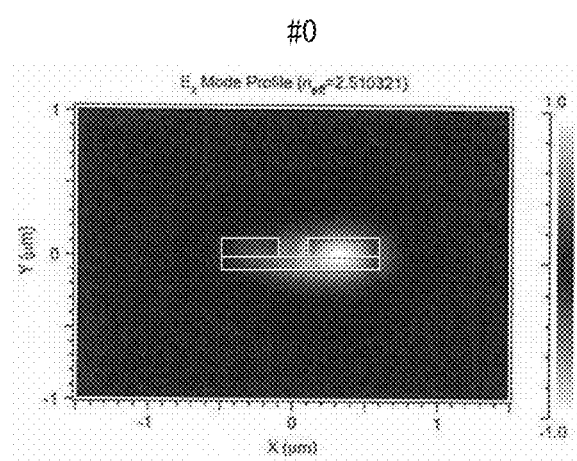
FIG. 36C is a diagram illustrating a simulation result of an electric field distribution ($E_x$ component) in the mode #0 at a sectional position (b) in FIG. 33A.
Figure 36D:
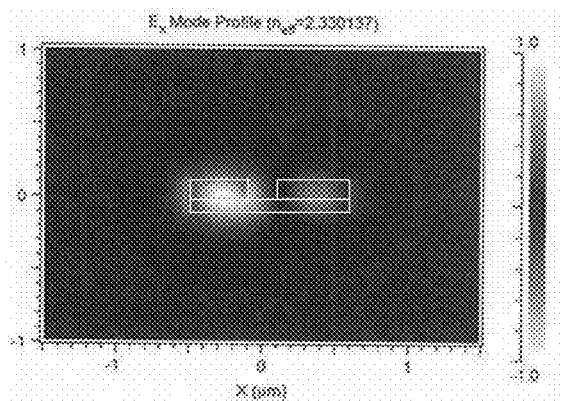
FIG. 36D is a diagram illustrating a simulation result of an electric field distribution ($E_x$ component) in the mode #1 at the sectional position (b) in FIG. 33A.
Figure 36E:
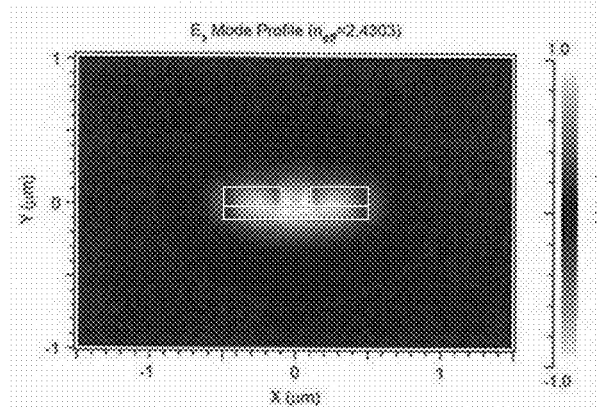
FIG. 36E is a diagram illustrating a simulation result of an electric field distribution ($E_x$ component) in the mode #0 at the sectional position (c) in FIG. 33A.
Figure 36F:
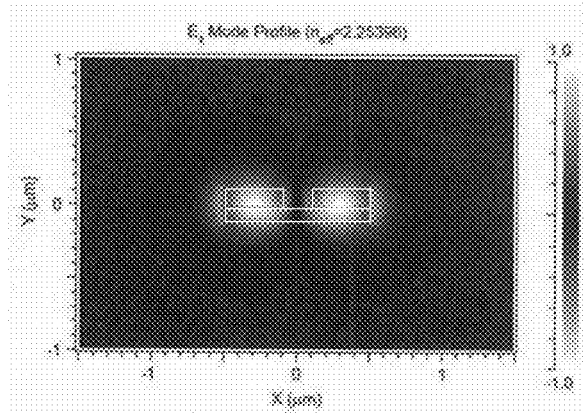
FIG. 36F is a diagram illustrating a simulation result of an electric field distribution ($E_x$ component) in the mode #1 at the sectional position (c) in FIG. 33A.

FIGS. 36A and 36B are diagrams illustrating simulation results (mode #0 in FIG. 36A and mode #1 in FIG. 36B) showing electric field distributions ($E_x$ components) at the sectional position (a). FIGS. 36C and 36D are diagrams illustrating simulation results (mode #0 in FIG. 36C and mode #1 in FIG. 36D) showing electric field distributions ($E_x$ components) at the sectional position (b). FIGS. 36E and 36F are diagrams illustrating simulation results (mode #0 in FIG. 36E and mode #1 in FIG. 36F) showing electric field distributions ($E_x$ components) at the sectional position (c).

Here, x and y represent a width direction and a height direction, respectively. The electric field distributions in FIGS. 36E and 36F are the same as in FIGS. 32A and 32B, respectively.

Referring to the mode #1, at the sectional position (a) (X=−200) illustrated in FIG. 36B, $TE_0$ is present in the waveguide 1.

At the sectional position (b) (X=−20) illustrated in FIG. 36D, it can be understood that mode coupling to $TE_0$ of the waveguide 2 starts.

At the sectional position (c) (X=0) illustrated in FIG. 36F, since the phase-matching condition is satisfied, an odd mode which is a super mode in which $TE_0$ of the waveguide 1 and $TE_0$ of the waveguide 2 are mixed can be viewed.

In this way, by gradually changing a waveguide structure in a light waveguide direction, it is possible to change $TE_0$ input to the waveguide 1 to an odd mode which is a super mode of $TE_0$.

<Specific Example of Matching Coupling Element>

The subsequent-stage mode conversion section 109 which is a specific example of a matching coupling element will be described with reference to FIGS. 37A to 37C.

Figure 37A:
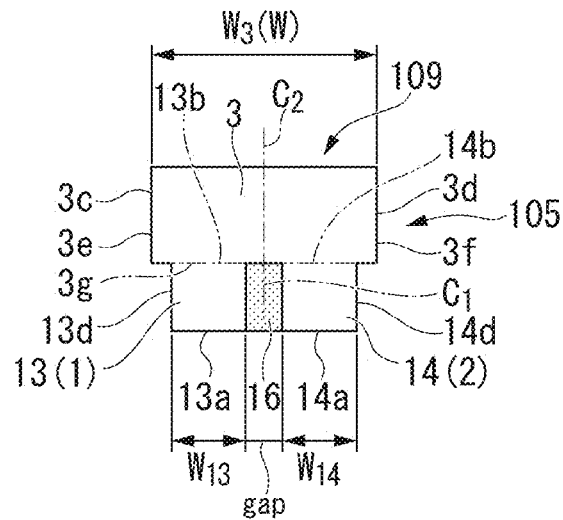
FIG. 37A is a plan view illustrating a structure of a subsequent-stage mode conversion section.
Figure 37B:
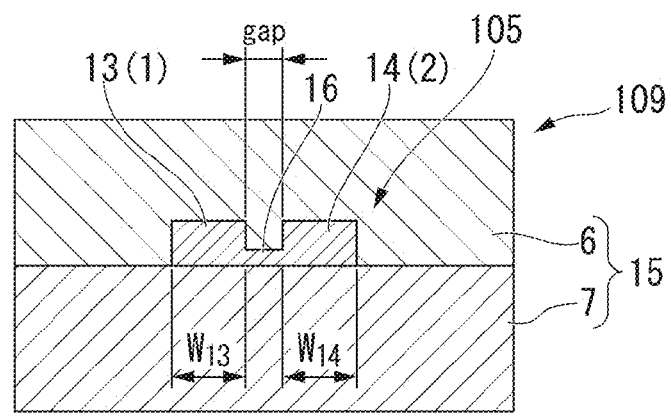
FIG. 37B is a sectional view of core portions, illustrating the structure of the subsequent-stage mode conversion section.
Figure 37C:
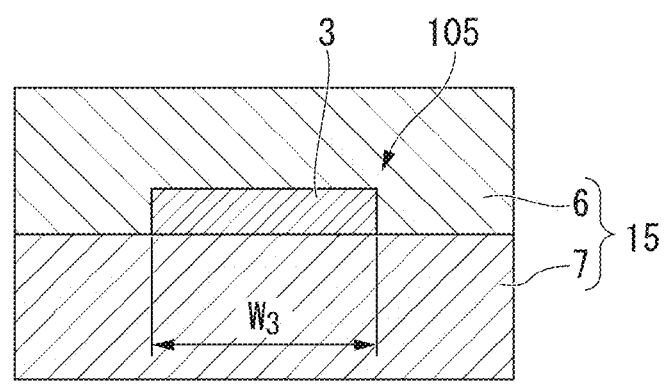
FIG. 37C is a sectional view of an output portion, illustrating the structure of the subsequent-stage mode conversion section.

FIGS. 37A to 37C illustrate the subsequent-stage mode conversion section 109, in which FIG. 37A is a plan view thereof, FIG. 37B is a sectional view of core portions, and FIG. 37C is a sectional view of an output portion.

In the subsequent-stage mode conversion section 109, "waveguide 1" corresponds to a waveguide having the core portion 13, and "waveguide 2" corresponds to a waveguide having a core portion 14. "Waveguide 3" corresponds to a waveguide having the output portion 3.

The core portion 13 (core portion 1) and the core portion 14 (core portion 2) are formed of Si (having a refractive index of 3.48 (at a wavelength of 1580 nm)), and the upper cladding 6 and the lower cladding 7 are formed of $SiO_2$ (having a refractive index of 1.44 (at the wavelength of 1580 nm)). Further, the heights of the core portions 13 and 14 (core portions 1 and 2) are 220 nm. The height of the slab portion 16 is 95 nm.

The widths $W_{13}$ and $W_{14}$ of the core portions 13 and 14 (core portions 1 and 2) are set to 400 [nm], respectively.

The gap between the core portions 13 and 14 (core portions 1 and 2) is set to "gap" [nm] ("gap"=200).

As shown in FIG. 37A, at the input end 3g, a central line $C_2$ of the output portion 3 in the width direction and a central line $C_1$ between the core portions 13 and 14 in the width direction match each other.

The central line $C_1$ between the core portions 13 and 14 is a line that passes through the center of a width directional range (range from the outer edge 13d of the core portion 13 to the outer edge 14d of the core portion 14) including the core portions 13 and 14 and the gap therebetween, at the output ends 13b and 14b (input end 3g), and extends along the direction where the core portions 13 and 14 extend.

The central line $C_2$ of the output portion 3 is a line that extends along the direction where the output portion 3 extends in a planar view.

First, a case where W which represents the width of the waveguide 3 is equal to the sum of the widths $W_{13}$ and $W_{14}$ of the waveguides 1 and 2 and the gap between the waveguides 1 and 2, that is, a case where $W=W_{13}+W_{14}+gap$ (=1000 nm) is satisfied may be considered.

Figure 38A:
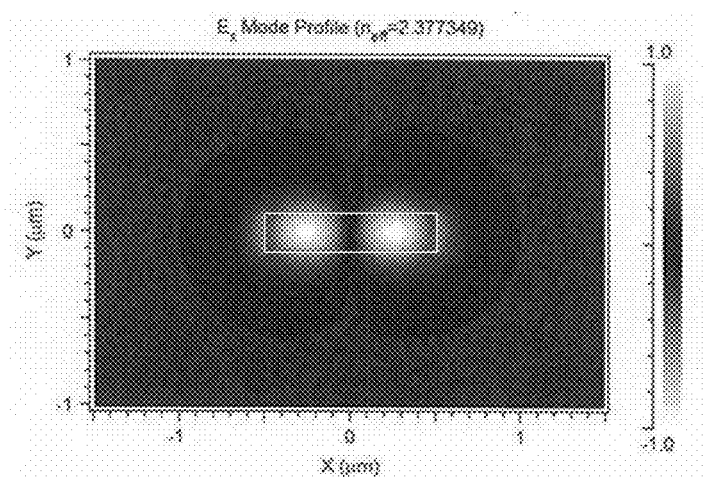
FIG. 38A is a diagram illustrating a simulation result showing an electric field distribution ($E_x$ component) in the output portion of the subsequent-stage mode conversion section.
Figure 38B:
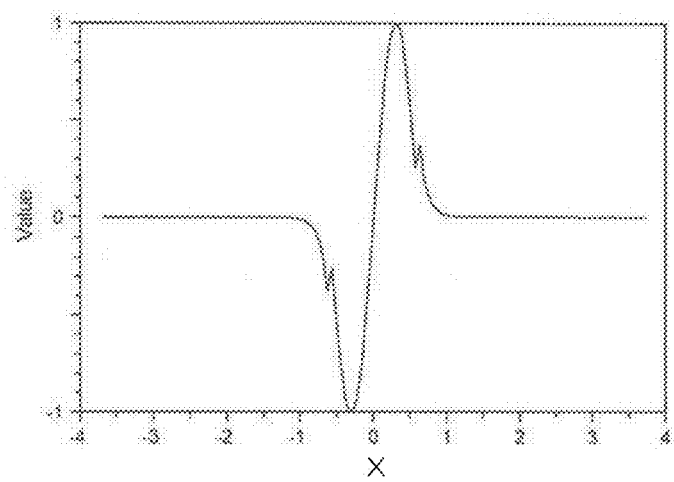
FIG. 38B is graph illustrating the electric field distribution ($E_x$ component) in the output portion of the subsequent-stage mode conversion section.

FIGS. 38A and 38B are diagrams showing an Ex component (y=0.00730942 μm) in $TE_1$ in the waveguide 3 (output portion 3) under the condition that W=1000. FIG. 38A is a diagram illustrating a simulation result showing an electric field distribution ($E_x$ component), and FIG. 38A is a graph illustrating the $E_x$ component.

Figure 39A:
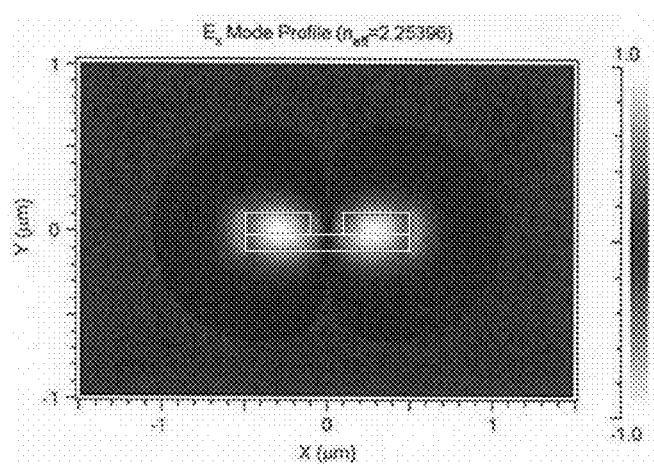
FIG. 39A is a diagram illustrating a simulation result showing an electric field distribution ($E_x$ component) in the core portions of the subsequent-stage mode conversion section.
Figure 39B:
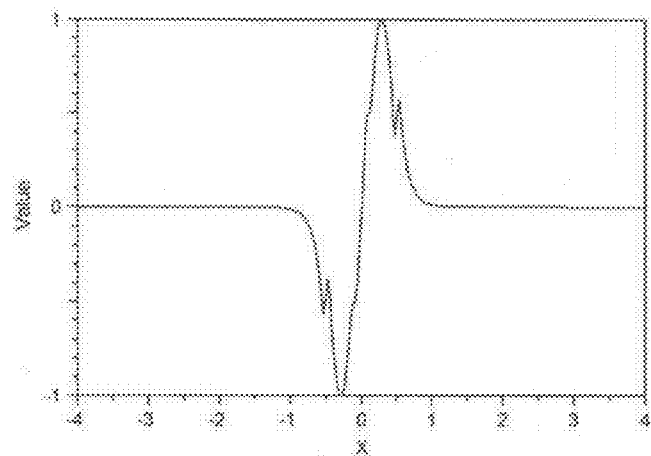
FIG. 39B is a graph illustrating the electric field distribution ($E_x$ component) in the core portions of the subsequent-stage mode conversion section.

FIGS. 39A and 39B are diagrams showing an odd mode in the waveguides 1 and 2 (core portions 13 and 14) under the same condition as in FIGS. 38A and 38B. FIG. 39A is a diagram illustrating a simulation result showing an electric field distribution ($E_x$ component), and FIG. 39B is a graph illustrating the $E_x$ component. Here, the electric field distributions in FIGS. 39A and 39B are the same as in FIGS. 32B and 32D, respectively.

When comparing FIGS. 38A and 38B (electric field distributions in $TE_1$ in the output portion 3) with FIGS. 39A and 39B (electric field distributions in the odd mode in the core portions 13 and 14), it can be understood that they are similar to each other.

In a case where the waveguides 1 and 2 and the waveguide 3 are discontinuously connected to each other, a conversion efficiency based on matching coupling therebetween is expressed as the above-described Expression (6) (here, since the $E_x$ component is a main component in the TE mode, contribution of other components is ignored).

It can be understood from Expression (6) that as the electric field distributions in the odd mode of the waveguides 1 and 2 and $TE_1$ of the waveguide 3 become more similar to each other, the conversion efficiency becomes higher. In reality, in the matching coupling element shown in FIG. 37A, a conversion efficiency at W=1000 becomes a high value (about −0.134 dB) (at a wavelength of 1550 nm).

Next, a case where the width W of the waveguide 3 is larger than the sum of the widths $W_{13}$ and $W_{14}$ of the waveguides 1 and 2 and the gap between the waveguides 1 and 2, that is, a case where $W>W_{13}+W_{14}+gap$ is satisfied may be considered.

By employing such a structure, it is possible to make the electric field distributions in the odd mode of the waveguides 1 and 2 and $TE_1$ of the waveguide 3 to be closer to each other, which will be described as follows.

Figure 40:
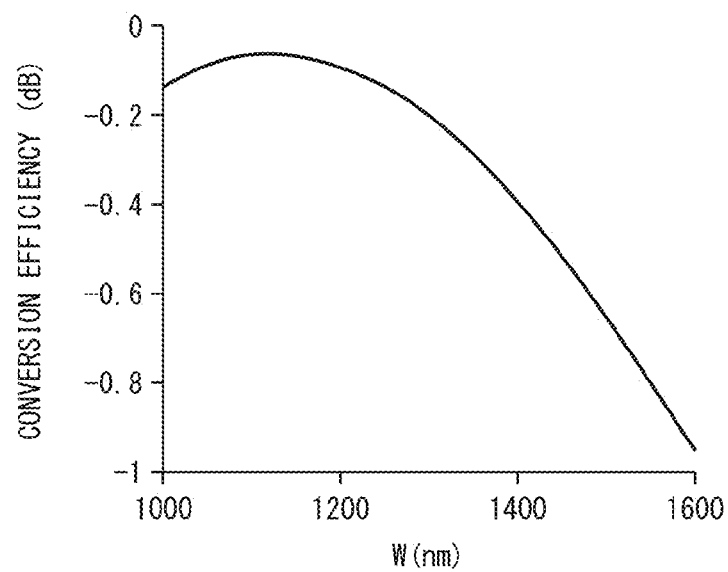
FIG. 40 is a graph illustrating a relationship between the width of the output portion and conversion efficiency.

FIG. 40 illustrates a relationship between the width of the waveguide 3 and a conversion efficiency between the odd mode and $TE_1$ (at a wavelength of 1550 nm).

As shown in FIG. 40, the conversion efficiency becomes a maximum value (−0.087 dB) in the vicinity of W=1200.

This is because peak positions with respect to the odd mode are aligned by increasing W and an integrated value of Expression (6) is increased.

Figure 41A:
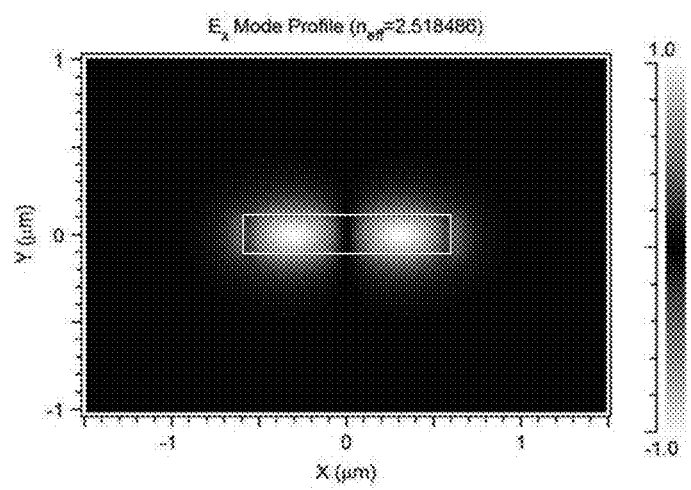
FIG. 41A is a diagram illustrating a simulation result showing an electric field distribution ($E_x$ component) in the output portion of the subsequent-stage mode conversion section.
Figure 41B:
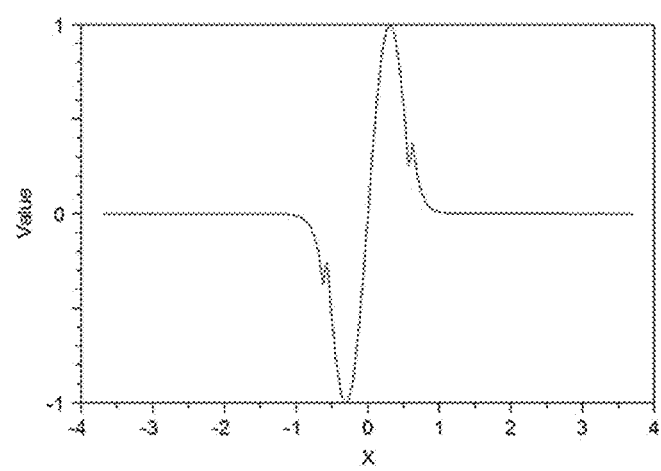
FIG. 41B is a graph illustrating the electric field distribution ($E_x$ component) in the output portion of the subsequent-stage mode conversion section.

FIGS. 41A and 41B are diagrams illustrating electric field distributions in $TE_1$ and an $E_x$ component in a case where W=1200, that is, $W(=W_3)>W_{13}+W_{14}+gap$.

When comparing FIG. 41B with FIG. 38B (W=1000), peak positions move outward in the width direction in FIG. 41B, compared with FIG. 38B. That is, it can be understood that the peak positions in FIG. 41B approach the peak positions in the odd mode in FIG. 39B. Thus, overlapping of the electric field distributions in the odd mode of the waveguides 1 and 2 and $TE_1$ of the waveguide 3 becomes large.

In this way, by forming the output portion of the matching coupling element to satisfy "$W_3>W_{13}+W_{14}+gap$", it is possible to convert the odd mode into $TE_1$ using similarity in electric field distributions of the odd mode and $TE_1$.

According to the present embodiment, the super mode-generating element (preceding-stage mode conversion section) converts $TE_0$ into an odd mode which is a super mode of $TE_0$ at output ends of first and second cores.

The matching coupling element (subsequent-stage mode conversion section) converts the odd mode into $TE_1$.

Thus, $TE_0$ input to the super mode-generating element is converted into the odd mode, and then, is input to the matching coupling element and is converted into $TE_1$.

Effects of the Present Embodiment

[Sixth Effect]

In the present embodiment, similar to the first embodiment, it is possible to secure high conversion efficiency in a wide wavelength band, and to secure mode conversion efficiency even in a case where a waveguide structure is changed due to a manufacturing error.

Further, in the present embodiment, by forming a slab portion between a pair of core portions, compared with a case where there is no slab portion, a refractive index difference between a core and a cladding becomes substantially smaller between two core portions, and leakage of light increases. Thus, a coupling coefficient $\chi$ becomes larger. As the coupling coefficient $\chi$ becomes larger, coupling of light between contiguous waveguides becomes stronger.

Accordingly, it is possible to perform mode conversion in a short distance, and thus, it is possible to reduce the device length.

[Seventh Effect]

In the present embodiment, since a structure in which a slab portion is formed between core portions is provided, it is possible to integrally form the core portions and the slab portion by performing a lithography/etching process two times.

That is, first, a core having a predetermined thickness is manufactured by a lithography/etching process. Then, a part thereof is thinned by a lithography/etching process to form a slab portion, to thereby form a core.

Since the height of the core and the height of the slab portion are not particularly limited, and since it is sufficient if a general condition for optical waveguides is satisfied, it is possible to easily perform integration with other optical waveguide devices (an optical modulator or the like including a rib-type phase modulator) having the slab portion.

[Eighth Effect]

In the present embodiment, similar to the planar optical waveguide device 10 according to the first embodiment illustrated in FIGS. 1A and 1B, it is possible to perform conversion over a wide wavelength band with high efficiency by using the super mode-generating element, and to secure efficient mode conversion even in a case where a waveguide structure is changed due to a manufacturing error.

Further, it is possible to perform conversion over a wide wavelength band with high efficiency using a matching coupling element, and to secure efficient mode conversion even in a case where a waveguide structure is changed due to a manufacturing error.

The reason is as follows.

In a case where a wavelength changes, an electric field distribution in a mode accordingly spreads (in a case where the wavelength increases) or shrinks (in a case where the wavelength decreases) with respect to a core.

Since the change is the same in an arbitrary mode, even in the case of the odd mode and $TE_1$, the same change of the electric field distribution occurs according to the change of the wavelength. Thus, the conversion efficiency of the matching coupling becomes a high value.

Figure 42:
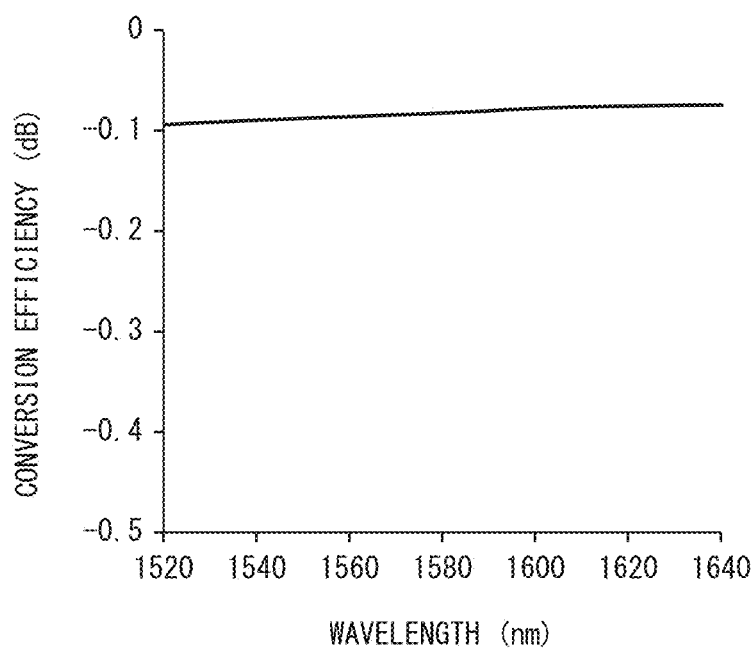
FIG. 42 is a graph illustrating a relationship between a wavelength of light and conversion efficiency.

In order to confirm this, FIG. 42 illustrates a relationship between a wavelength and conversion efficiency when W is 1200.

It can be understood from FIG. 42 that high conversion efficiency is maintained even though the wavelength changes.

Further, in a case where there is a manufacturing error due to lithography or etching or variation in the heights of layers of a wafer (SOI substrate or the like), its influence (change or the like in the width or height of a core) locally occurs in respective portions of waveguides by the same amount. Thus, the waveguides 1 and 2 and the waveguide 3 are changed in the same manner (for example, the widths increase or decrease together). Accordingly, electric field distributions in modes of the respective waveguides also spread or shrink in the same manner.

Thus, in the matching coupling element, reduction in conversion efficiency does not occur, and thus, it is possible to secure high conversion efficiency.

Figure 43:
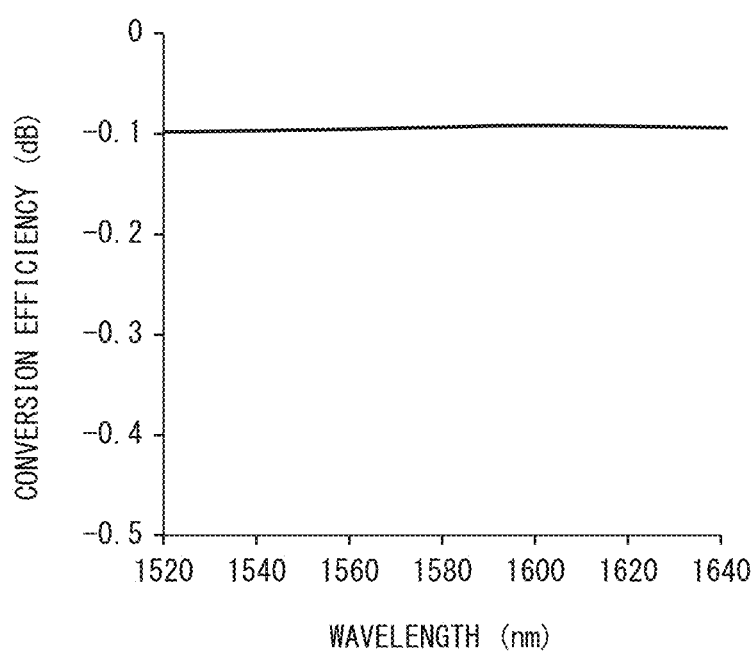
FIG. 43 is a graph illustrating a relationship between a wavelength and conversion efficiency in a case where the width of a core portion (and an output portion) is changed.

As a specific example, FIG. 43 is a graph illustrating a relationship between a wavelength and conversion efficiency in a case where core widths (in the figure, written as waveguide widths in FIG. 43) (for example, $W_3$, $W_{13}$, and $W_{14}$ in FIG. 37A) of the waveguides 1 to 3 of the matching coupling element (subsequent-stage mode conversion section) are all changed by −30 nm.

It can be understood from FIG. 43 that even when the core widths of the waveguides 1 to 3 are changed, high conversion efficiency is maintained.

Accordingly, in the present embodiment, by using the super mode-generating element (preceding-stage mode conversion section) and the matching coupling element (subsequent-stage mode conversion section), it is possible to perform conversion with high accuracy over a wide wavelength band, and to secure efficient mode conversion even in a case where a waveguide structure is changed due to a manufacturing error.

[Ninth Effect]

In the planar optical waveguide device 110, since the slab portion 16 is provided, in the subsequent-stage mode conversion section 9, conversion efficiency from an odd mode to $TE_1$ is enhanced, and conversion efficiency from an even mode to $TE_0$ is also enhanced.

Thus, the planar optical waveguide device 110 is advantageous in performing mode multiplexing between $TE_0$ and $TE_1$.

Example 8

<Planar Optical Waveguide Device>

Figure 44A:
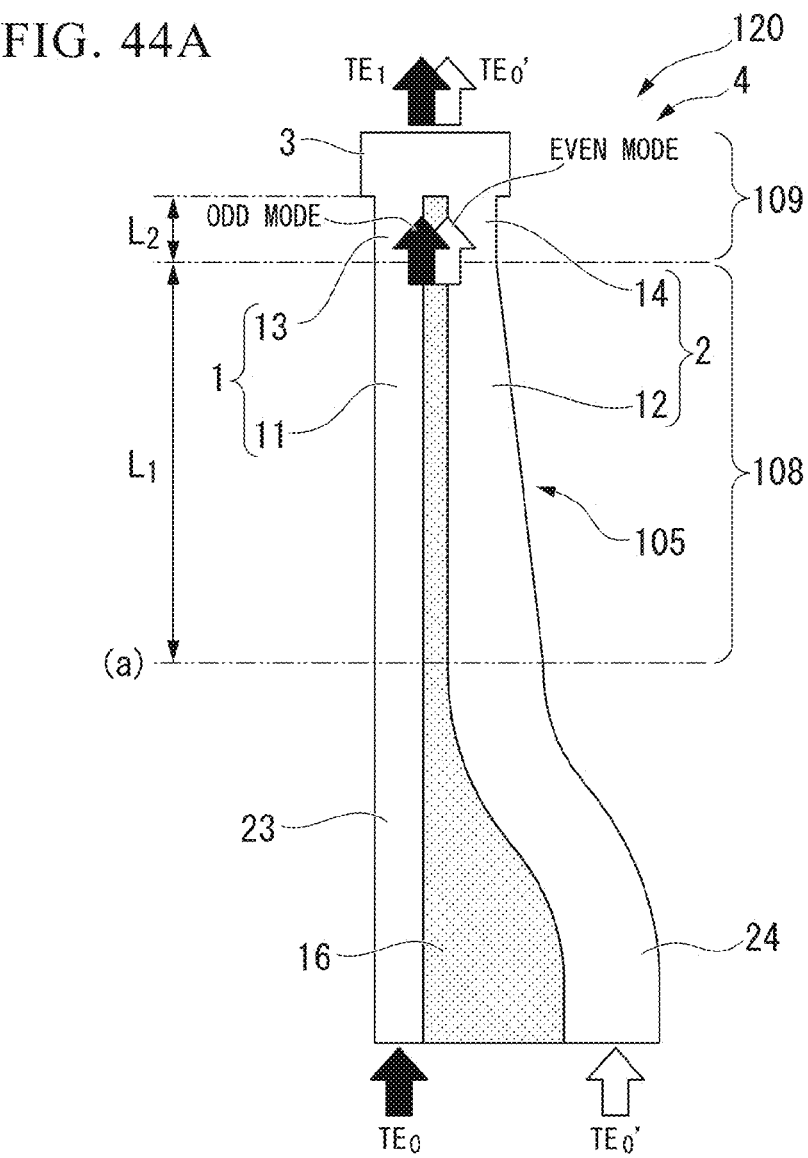
FIG. 44A is a plan view illustrating an example of a planar optical waveguide device having a bent waveguide.
Figure 44B:
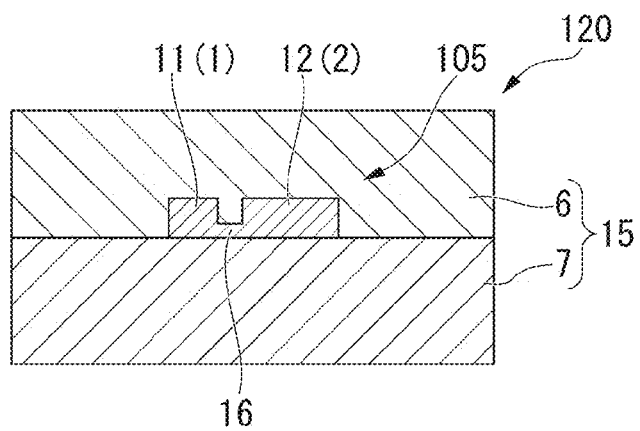
FIG. 44B is a sectional view at a sectional position (a), illustrating the example of the planar optical waveguide device having the bent waveguide.

FIGS. 44A and 44B are diagrams illustrating a planar optical waveguide device 120 (mode conversion element) according to Example 8 of the invention. FIG. 44A is a plan view thereof, and FIG. 44B is a sectional view at a sectional position (a) in FIG. 44A. The same reference numerals are given to the same configurations as those of the planar optical waveguide device 110 shown in FIGS. 30A and 30B, and description thereof will not be repeated.

The width of the core portion 11 (core portion 1) is set to 400 [nm], and the width of the core portion 12 (core portion 2) is set to 400-X [nm] (−200≤X≤0). Here, X is linearly changed from −200 to 0, from an input end 12a to an output end 12b. The widths of the core portions 13 and 14 are respectively 400 [nm]. A gap between the core portions 1 and 2 is 200 [nm]. The width of the output portion 3 is 1250 [nm]. The heights of the core portions 1 and 2 and the output portion 3 are 220 nm. The height of the slab portion 16 is 95 nm.

In the planar optical waveguide device 120, the first core portion 1 includes a linear waveguide 23, and the second core portion 2 includes a bent waveguide 24. The linear waveguide 23 is formed on an input side of the core portion 11, and the bent waveguide 24 is formed on an input side of the core portion 12.

In the planar optical waveguide device 120, the first core portion 1 (linear waveguide 23) and the second core portion 2 (bent waveguide 24) are formed to become closer to each other as a distance to the preceding-stage mode conversion section 108 becomes shorter. Thus, it is possible to reduce unnecessary reflection of light.

Since the linear waveguide 23 and the bent waveguide 24 become more distant from each other as the distance to the preceding-stage mode conversion section 108 becomes longer, it is possible to reliably reduce mode coupling compared with a tapered structure. Thus, it is possible to enhance mode conversion efficiency in the preceding-stage mode conversion section 108.

In order to show that mode conversion is possible according to this example, a conversion efficiency (ratio of power of output $TE_1$ to power of input $TE_0$) in $TE_1$ output when $TE_0$ was input to the core portion 1 was calculated using a finite-difference time-domain (FDTD).

The length $L_2$ of the matching coupling element (the subsequent-stage mode conversion section 109 in FIG. 44A) was set to 1 µm. A wavelength was set to 1550 nm. A calculation result is shown in FIG. 45.

Figure 45:
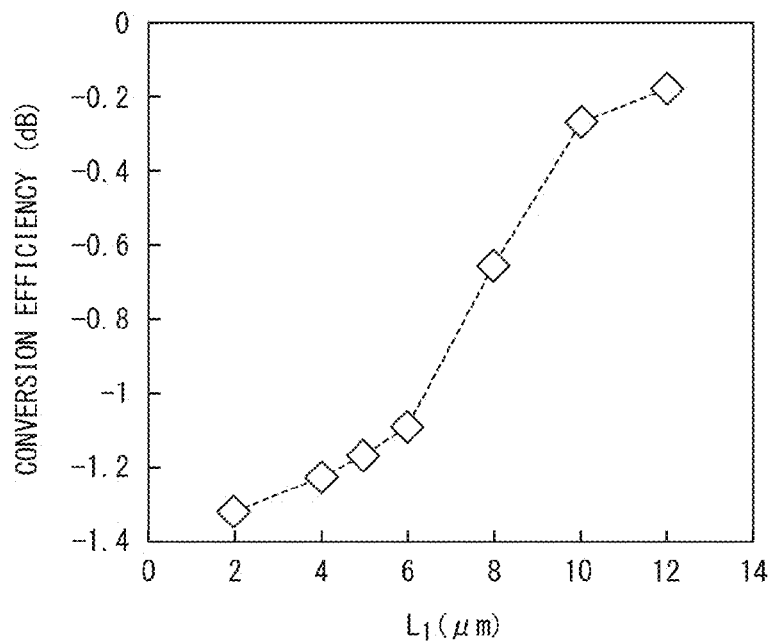
FIG. 45 is a graph illustrating a relationship between the length of the preceding-stage mode conversion section and conversion efficiency.

FIG. 45 is a diagram illustrating a relationship between a taper length $L_1$ (the length of a tapered waveguide (core portion 12)) and conversion efficiency in the super mode-generating element.

It can be understood from FIG. 45 that as the taper length $L_1$ of the super mode-generating element becomes longer, the width of a core portion in the light waveguide direction becomes smoother, so that an adiabatic change condition is more easily satisfied and the conversion efficiency becomes higher.

Figure 46:
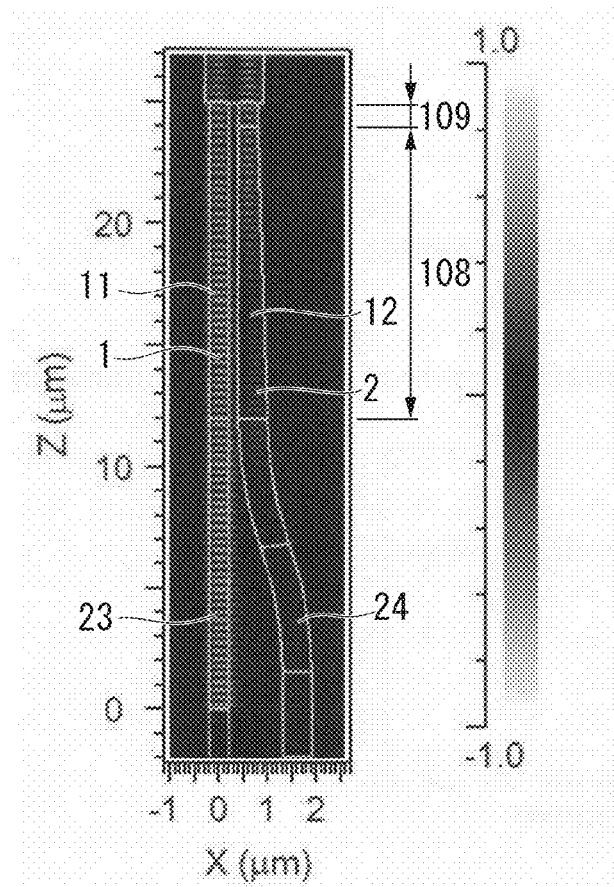
FIG. 46 is a diagram illustrating a simulation result showing an electric field distribution ($E_x$ component).

FIG. 46 is a diagram illustrating an electric field distribution when the taper length $L_1$ (the length of the core portion 12) of the super mode-generating element (preceding-stage mode conversion section 108) is 12 µm. FIG. 46 is a diagram illustrating an $E_x$ component when y is 0.1 µm in a case where $TE_0$ is input to the core portion 1 from the input end (lower end). The wavelength was set to 1550 nm.

It can be understood from FIG. 46 that light is coupled in the super mode-generating element and $TE_0$ is converted into an odd mode in which $TE_0$ is distributed in both core portions. Further, it can also be confirmed that the odd mode is changed to $TE_1$ by the matching coupling element.

Figure 47:
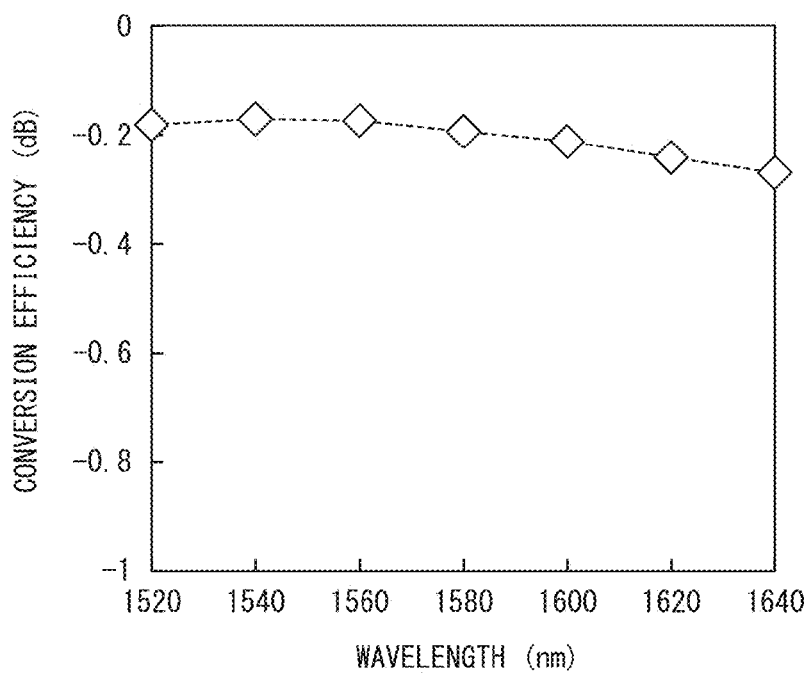
FIG. 47 is a graph illustrating a relationship between a wavelength of light and conversion efficiency.

FIG. 47 is a graph illustrating a result obtained by simulating wavelength dependency (relationship between a wavelength and conversion efficiency) in this example using FDTD. The taper length $L_1$ of the super mode-generating element was set to 12 µm.

It can be confirmed from FIG. 47 that a high conversion efficiency which is equal to or greater than −0.27 dB from 1520 nm to 1640 nm is achieved in this example.

Since an electric field distribution more greatly spreads outside a core portion and coupling to a contiguous waveguide becomes stronger as a wavelength becomes longer, the conversion efficiency of the super mode-generating element is enhanced at a long wavelength, and thus, the overall conversion efficiency is enhanced.

Next, in order to confirm the influence of a manufacturing error in this example, a relationship between a wavelength and conversion efficiency when the widths of overall core portions (and an output portion) were changed by −30 nm was simulated using FDTD. The taper length $L_1$ of the super mode-generating element was set to 12 µm.

Figure 48:
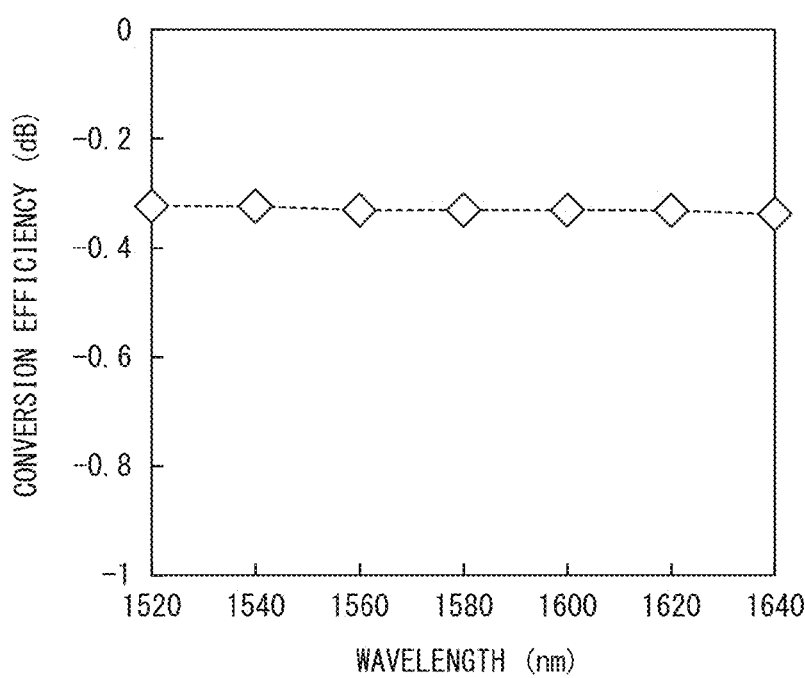
FIG. 48 is a graph illustrating a relationship between a wavelength and conversion efficiency in a case where the width of a core portion (and an output portion) is changed.

A calculation result is shown in FIG. 48.

When comparing FIG. 48 with FIG. 47, fluctuation in the conversion efficiency in a case where the widths of the core portions (and the output portion) are changed by −30 nm is within 0.15 dB at each wavelength, and high conversion efficiency is maintained.

It can be confirmed from FIG. 48 that this structure is less affected by a manufacturing error.

Next, in this example, mode multiplexing of $TE_0$ of the core portion 2 and $TE_1$ (mode which is converted from $TE_0$ input to the core portion 1) is possible, which will be described.

To this end, a transmittance in $TE_0'$ output from the matching coupling element when $TE_0$ (written as $TE_0'$ for distinction) was inputted to the core portion 2 from the input side (ratio of power in $TE_0'$ output from the matching coupling element to power in $TE_0'$ input to the core portion 2) was simulated using FDTD.

Figure 49:
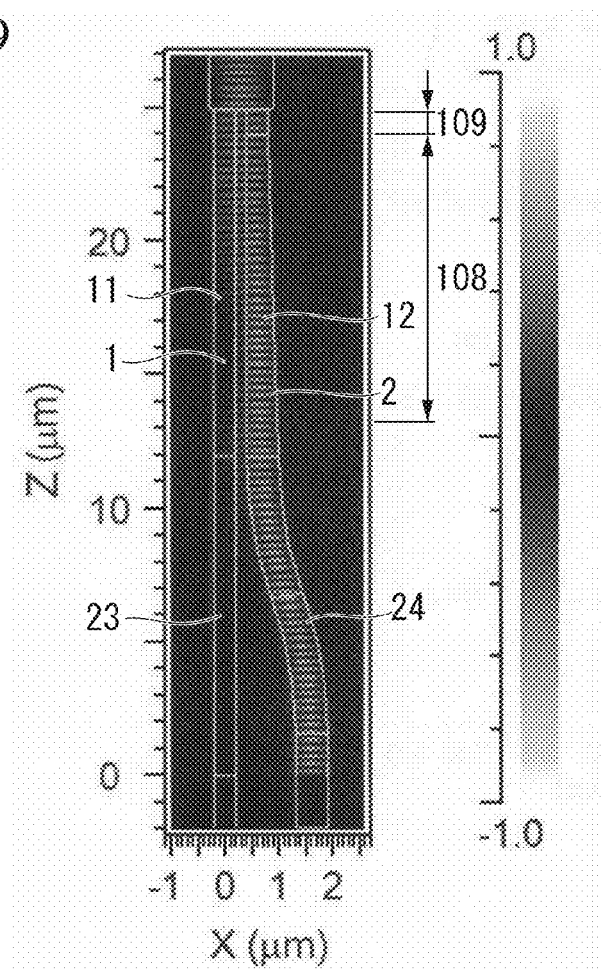
FIG. 49 is a diagram illustrating a simulation result showing an electric field distribution ($E_x$ component).

FIG. 49 is a diagram illustrating an electric field distribution calculated using FDTD when the taper length of the super mode-generating element is 12 µm. The wavelength was set to 1550 nm. FIG. 49 is a diagram illustrating an $E_x$ component when y is 0.1 µm in a case where $TE_0$ is input to the core portion 1 from the input end (lower end).

Here, it can be understood that the transmittance becomes −0.17 dB and a large amount of power is transmitted. As described above, mode coupling is possible in this example.

<Comparison with Related Art>

This example will be compared with performance of an asymmetric directional coupler which is a technique in the related art. Specifically, Example 8 will be compared with Comparative Example 1 having a structure shown in FIGS. 69A and 69B. First, validity of the comparison will be considered from the following viewpoints.

Both the super mode-generating element used in this example and the asymmetric directional coupler in the related art use the mode coupling principle.

In the mode coupling, as leakage of light into a contiguous waveguide becomes larger, the coupling becomes stronger, so that the efficiency becomes higher. For this purpose, it is sufficient if the width of a core portion is reduced and light confinement is weakened.

However, in consideration of actual manufacturing, if the width of the core portion is too narrow, there are problems such that reproducibility is lowered or a waveguide as mask design cannot be manufactured depending on the accuracy of lithography. Thus, the width of the core portion is set to have a minimum value capable of manufacturing a waveguide.

Accordingly, it is possible to perform the comparison between Example 8 and Comparative Example 1 by setting a minimum width of a core portion as the same condition. Since the coupling is also strengthened by decreasing a gap between core portions, the gaps between the core portions in Example 8 and Comparative Example 1 are set to be the same.

In Example 8, in a state where the width of an output end (a portion which was necessary for narrowing a core to the minimum) of the super mode-generating element that used the principle of mode coupling was set to 400 nm, the widths of core portions other than the output end were determined. The gap between the core portions was set to 200 nm.

In Comparative Example 1 (the asymmetric directional coupler shown in FIGS. 69A and 69B), the width of the core portion 1 (a portion which was necessary for narrowing a core to the minimum) that guided light in $TE_0$ which was a coupling target was set to 400 nm, and the width of the core portion 2 was determined so that phase matching was established.

Since the minimum width of the core portion and the gap between the core portions are under the same condition, it is possible to perform the comparison between Example 8 and Comparative Example 1.

Figure 50:
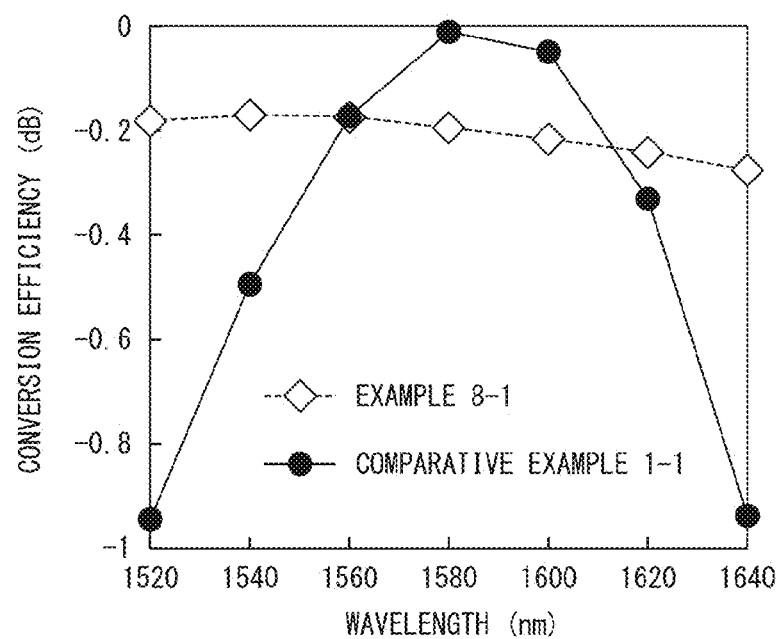
FIG. 50 is a graph illustrating a relationship between a wavelength of light and conversion efficiency.

FIG. 50 shows comparison results of the influences of wavelengths on conversion efficiencies in Example 8 and Comparative Example 1. The results of Example 8 and Comparative Example 1 are written as Example 8-1 and Comparative Example 1-1, respectively. These results are the same as in graphs illustrated in FIGS. 47 and 71.

Referring to FIG. 50, in Comparative Example 1 (Comparative Example 1-1), loss is low compared with Example 8 in the vicinity of a wavelength of 1580 nm, but as the wavelength is changed, the conversion efficiency is greatly reduced. Thus, a loss change due to the wavelength is large.

On the other hand, Example 8 (Example 8-1) is inferior to Comparative Example 1 (Comparative Example 1-1) in the vicinity of 1580 nm, but a loss change depending on a wavelength is small at 1520 nm to 1640 nm (a wavelength range which covers a C+L band in optical communication).

Further, when comparing the minimum conversion efficiency in this wavelength range, it can be understood that Example 8 (Example 8-1) is a higher minimum conversion efficiency.

As described above, in Example 8 (Example 8-1), the conversion can be performed with high efficiency over a wide wavelength range compared with Comparative Example 1 (Comparative Example 1-1).

In Example 8 (Example 8-1), since the super mode-generating element uses adiabatic change, by increasing a taper length, it is possible to further lower loss.

On the other hand, in the asymmetric directional coupler of Comparative Example 1 (Comparative Example 1-1), since it is difficult to remarkably change the length, no further improvement in conversion efficiency can be expected.

Figure 51:
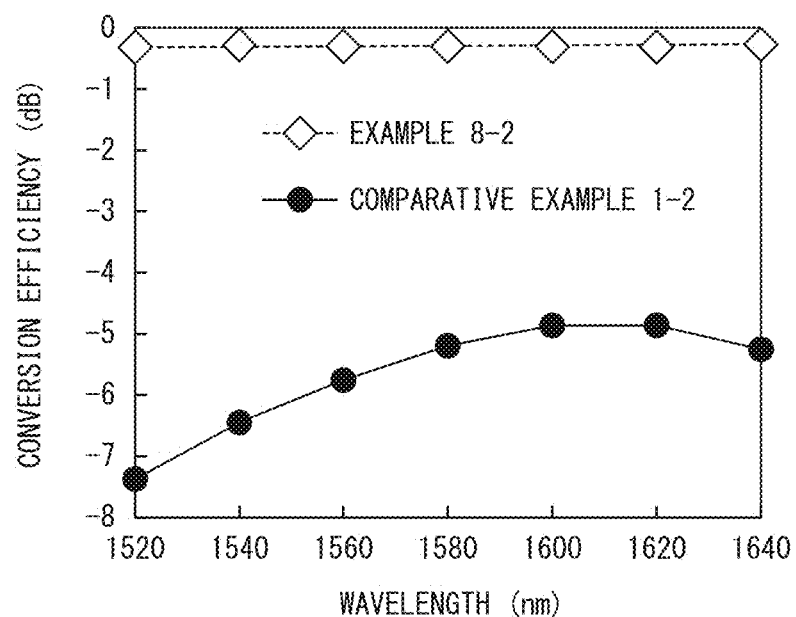
FIG. 51 is a graph illustrating a relationship between a wavelength and conversion efficiency in a case where the width of a core portion (and an output portion) is changed.

Subsequently, FIG. 51 shows comparison results of the influences of manufacturing errors on conversion efficiencies in Example 8 and Comparative Example 1. FIG. 51 shows a conversion efficiency when the width of a core portion (and an output portion) is changed by −30 nm. The results in Example 8 and Comparative Example 1 are written as Example 8-2 and Comparative Example 1-2. These results are the same as in graphs illustrated in FIG. 48 and FIG. 74.

Referring to FIG. 51, in Comparative Example 1 (Comparative Example 1-2), phase matching is not established and the conversion efficiency is reduced, but in Example 8 (Example 8-2), high conversion efficiency is maintained.

Accordingly, Example 8 (Example 8-2) has a small influence due to a manufacturing error compared with Comparative Example 1 (Comparative Example 1-2).

The planar optical waveguide device 120 having the structure of Example 8 was actually manufactured.

Figure 52:
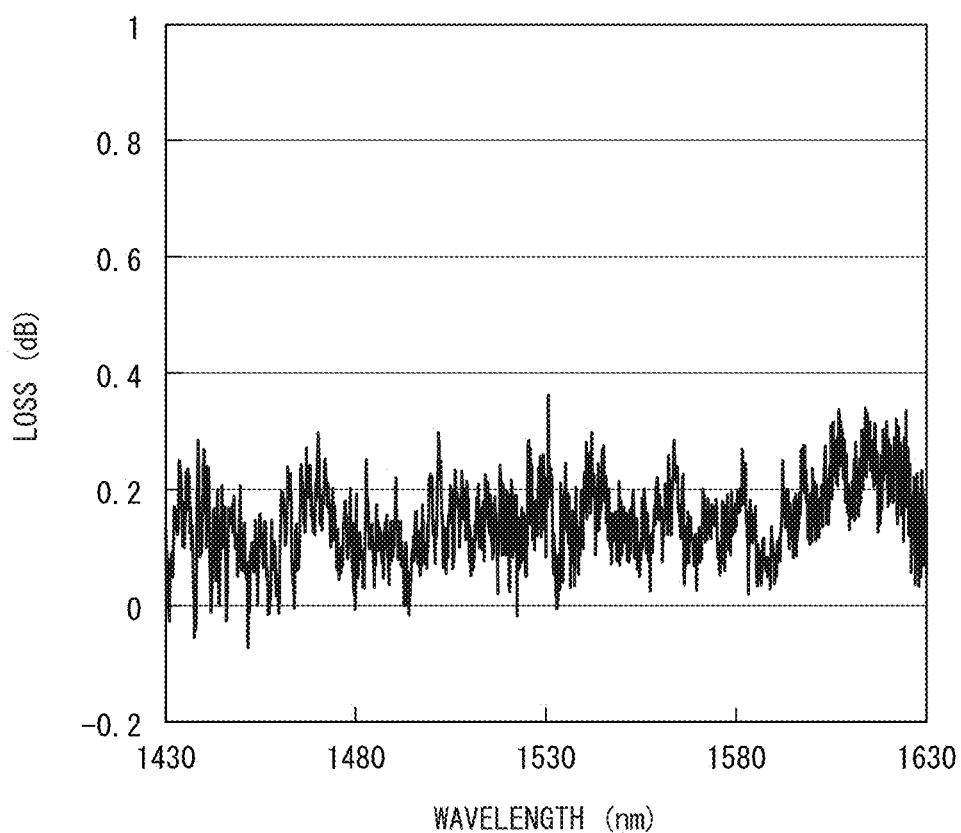
FIG. 52 is a graph illustrating a relationship between a wavelength of light and loss.

FIG. 52 shows a measurement result of a loss (conversion efficiency (dB) which is assigned a negative (−) sign) when $TE_0$ is converted into $TE_1$, with respect to a wavelength. It can be understood from FIG. 52 that conversion of $TE_0$ to $TE_1$ can be sufficiently performed.

A conversion loss in this case is equal to or smaller than 0.4 dB in a wide wavelength band from 1430 nm to 1630 nm, which is extremely low. This is because wavelength dependency of the planar optical waveguide device is small and the influence due to a manufacturing error is also small.

It can be understood from the results shown in FIGS. 50 to 52 that Example 8 has higher conversion efficiency in a wide wavelength band and is strong against a manufacturing error compared with the related art technique.

Example 9

<Planar Optical Waveguide Device>

Figure 53A:
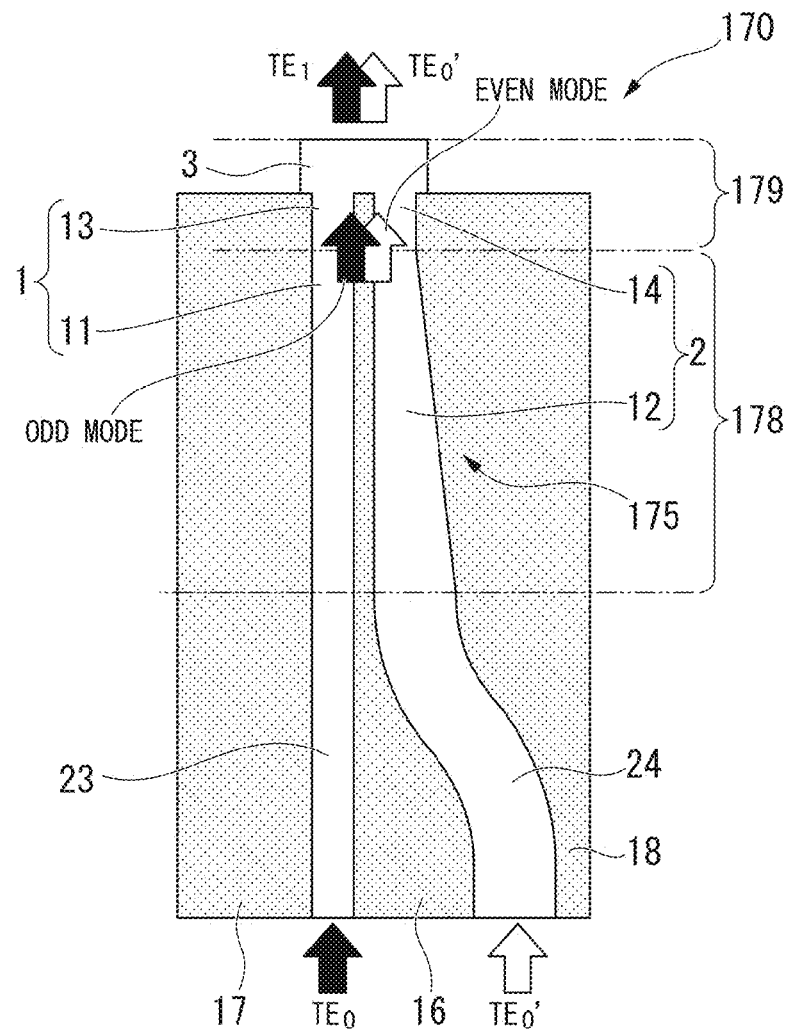
FIG. 53A is a plan view illustrating a first example of a planar optical waveguide device that employs a rib waveguide structure.
Figure 53B:
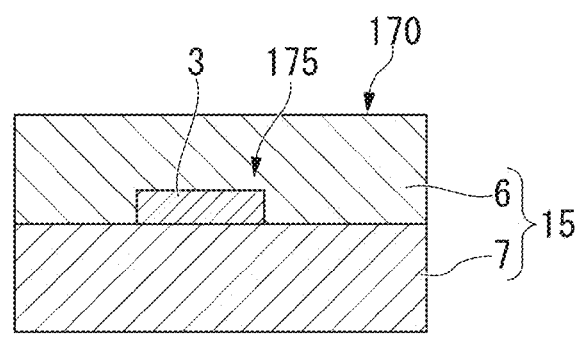
FIG. 53B is a sectional view of an output portion, illustrating the first example of the planar optical waveguide device that employs the rib waveguide structure.
Figure 53C:
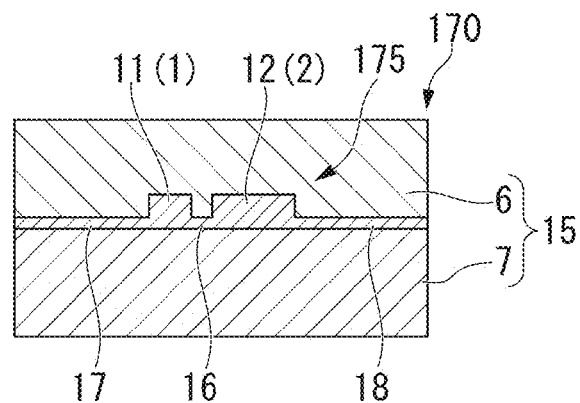
FIG. 53C is a sectional view of core portions, illustrating the first example of the planar optical waveguide device that employs the rib waveguide structure.

FIGS. 53A to 53C illustrate a planar optical waveguide device 170 (mode conversion element) according to Example 9 of the invention. Example 9 corresponds to a first example of a planar optical waveguide device that employs a rib waveguide structure. FIG. 53A is a plan view thereof, FIG. 53B is a sectional view of an output portion 3, and FIG. 53C is a sectional view of core portions 1 and 2.

The planar optical waveguide device 170 has the same configuration as that of the planar optical waveguide device 120 illustrated in FIGS. 44A and 44B except that a core 175 instead of the core 105 is provided.

The core 175 includes a pair of core portions 1 and 2 which are disposed in parallel with each other, a slab portion 16 (intermediate region) which is formed to connect the core portions 1 and 2, and slab portions 17 and 18 (outer extension regions) that are formed to extend outward in the width directions from the respective core portions 1 and 2. Shading is given to the slab portions 16 to 18 in FIG. 53A.

The slab portions 17 and 18 are formed to be lower in height than the core portions 1 and 2, similar to the slab portion 16.

Lower surfaces of the slab portions 16 to 18 are continuous with lower surfaces of the core portions 1 and 2. Thus, the core portions 1 and 2 protrude upward from upper surfaces of the slab portions 16 to 18.

The core 175 forms a so-called rib waveguide since the slab portions 17 and 18 are also provided, similar to one side (inner side) of each of the core portions 1 and 2 in the width direction, on the other side (outer side) thereof.

The core 175 includes a preceding-stage mode conversion section 178 and a subsequent-stage mode conversion section 179. The slab portions 17 and 18 are not formed in an output portion 3 of the subsequent-stage mode conversion section 179.

In the planar optical waveguide device 170, since the core 175 includes the slab portions 16 to 18, it is possible to strengthen light coupling between waveguides and to shorten a device length, compared with a case where there is no slab portion.

Since the planar optical waveguide device 170 includes the slab portions 17 and 18 that extend outward from the core portions 1 and 2, leakage of light outward from the core portions 1 and 2 becomes larger. Thus, a coupling coefficient χ becomes smaller compared with the planar optical waveguide device 120 shown in FIGS. 44A and 44B. On the other hand, there is an advantage in that it is possible to reduce a detrimental influence (increase in loss due to light scattering) due to roughness on side walls of core portions (surface roughening), generated in a process such as dry etching.

The reason why the influence of roughness on the side walls of the core portions can be reduced is that since the planar optical waveguide device 170 is provided with the slab portions 16 to 18 on both sides of the core portions 1 and 2, the areas of the side surfaces of the core portions 1 and 2 are small.

Accordingly, from the viewpoint of reducing loss due to roughness of side walls, this example (rib waveguide) is preferable.

Example 10

Figure 54A:
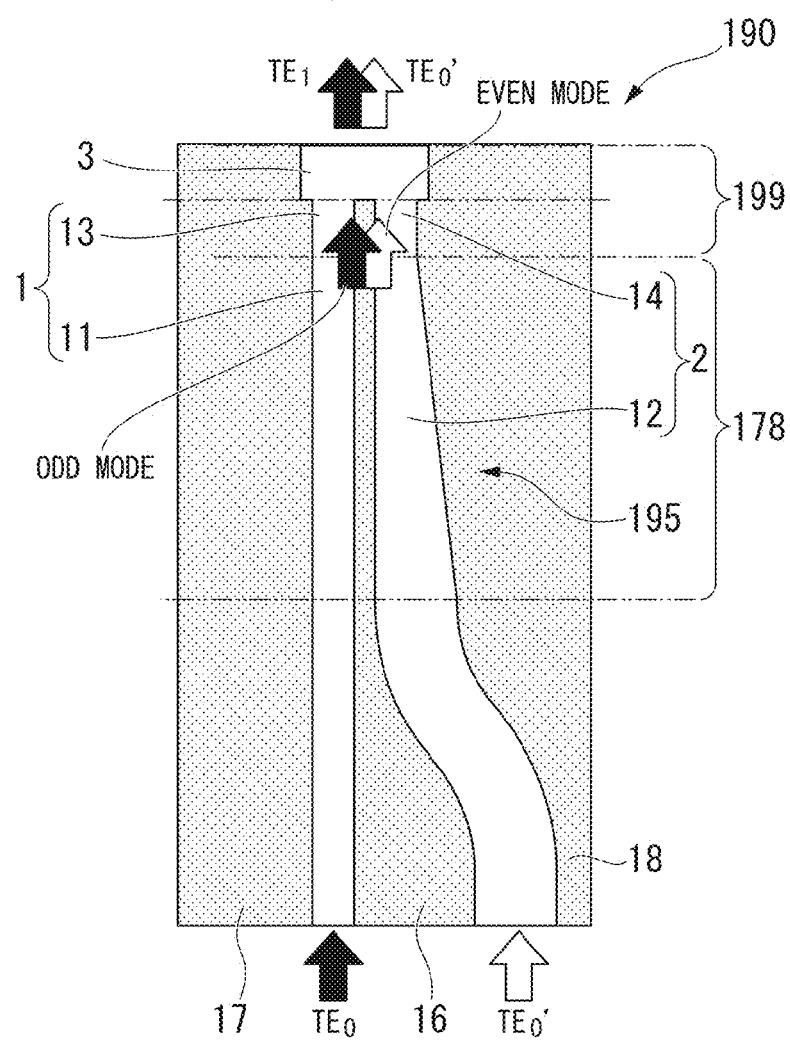
FIG. 54A is a plan view illustrating a second example of the planar optical waveguide device that employs the rib waveguide structure.
Figure 54B:
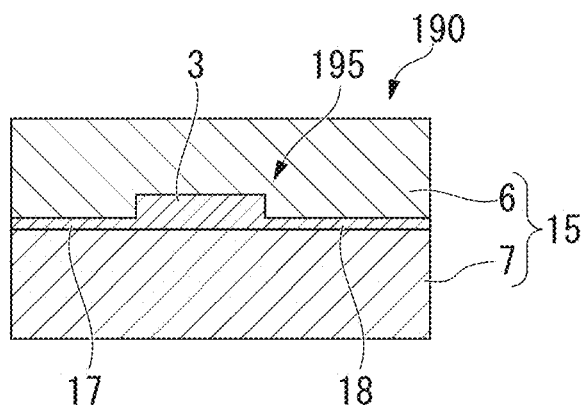
FIG. 54B is a sectional view of an output portion, illustrating the second example of the planar optical waveguide device that employs the rib waveguide structure.
Figure 54C:
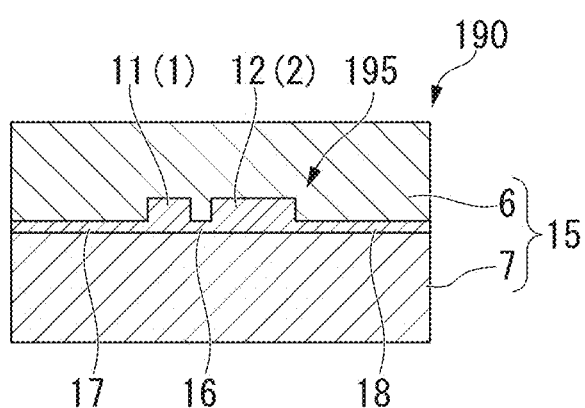
FIG. 54C is a sectional view of core portions, illustrating the second example of the planar optical waveguide device that employs the rib waveguide structure.

<Planar Optical Waveguide Device>
FIGS. 54A to 54C illustrate a planar optical waveguide device 190 (mode conversion element) according to Example 10 of the invention. Example 10 corresponds to a second example of the planar optical waveguide device that employs the rib waveguide structure. FIG. 54A is a plan view thereof, FIG. 54B is a sectional view of an output portion 3, and FIG. 54C is a sectional view of core portions 1 and 2.

The planar optical waveguide device 190 has the same configuration as that of the planar optical waveguide device 170 illustrated in FIGS. 53A to 53C except that a core 195 instead of the core 175 is provided.

The core 195 includes a preceding-stage mode conversion section 178 and a subsequent-stage mode conversion section 199.

The subsequent-stage mode conversion section 199 is different from the subsequent-stage mode conversion section 179 in FIG. 53A in that the slab portions 17 and 18 are also formed in the output portion 3.

In the planar optical waveguide device 190 can achieve the same effects as in the planar optical waveguide device 170 in FIGS. 53A to 53C.

Since the planar optical waveguide device 190 includes the subsequent-stage mode conversion section 199 that employs the rib waveguide structure, it is possible to reduce loss when being connected to a high-order polarization conversion element (see FIGS. 64A to 64D) having an asymmetric structure in a height direction.

Example 11

Figure 55A:
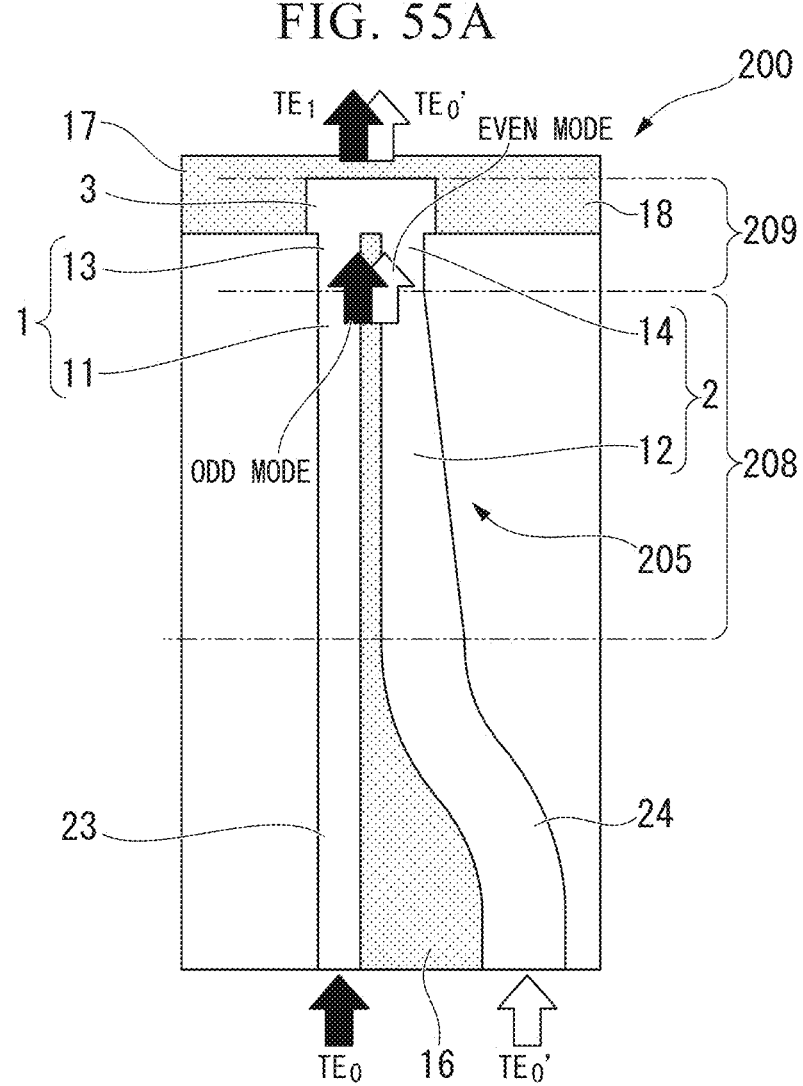
FIG. 55A is a plan view illustrating a third example of the planar optical waveguide device that employs the rib waveguide structure.
Figure 55B:
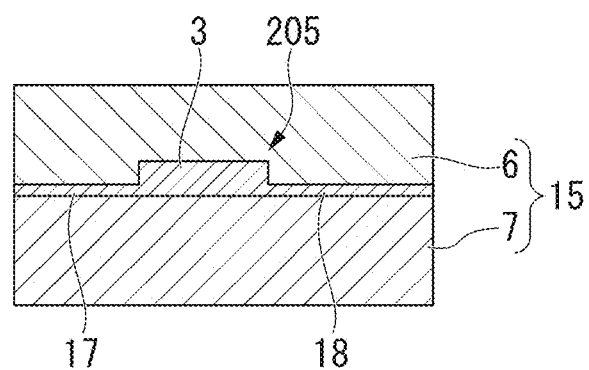
FIG. 55B is a sectional view of an output portion, illustrating the third example of the planar optical waveguide device that employs the rib waveguide structure.
Figure 55C:
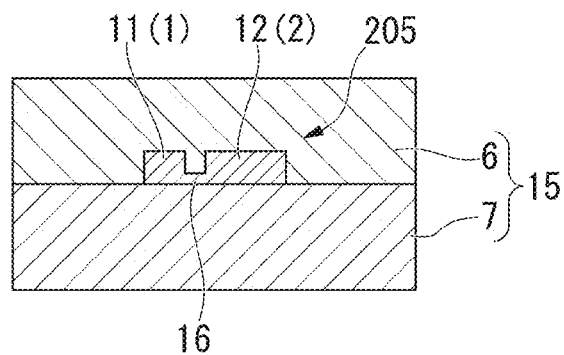
FIG. 55C is a sectional view of core portions, illustrating the third example of the planar optical waveguide device that employs the rib waveguide structure.

<Planar Optical Waveguide Device>
FIGS. 55A to 55C illustrate a planar optical waveguide device 200 (mode conversion element) according to Example 11 of the invention. Example 11 corresponds to a third example of the planar optical waveguide device that employs the rib waveguide structure. FIG. 55A is a plan view thereof, FIG. 55B is a sectional view of an output portion 3, and FIG. 55C is a sectional view of core portions 1 and 2.

The planar optical waveguide device 200 has the same configuration as that of the planar optical waveguide device 190 illustrated in FIGS. 54A to 54C except that a core 205 instead of the core 195 is provided.

The core 205 includes a preceding-stage mode conversion section 208 and a subsequent-stage mode conversion section 209.

The core 205 is formed so that slab portions 17 and 18 (outer extension regions) are formed in the output portion 3, but the slab portions 17 and 18 are not formed in the core portions 1 and 2.

The planar optical waveguide device 200 shows the same effects as in the planar optical waveguide device 170 in FIGS. 53A to 53C.

Since the planar optical waveguide device 200 includes the subsequent-stage mode conversion section 209 that employs the rib waveguide structure, it is possible to reduce loss when being connected to a high-order polarization conversion element (see FIGS. 64A to 64D) having an asymmetric structure in a height direction.

Example 12

Figure 56:
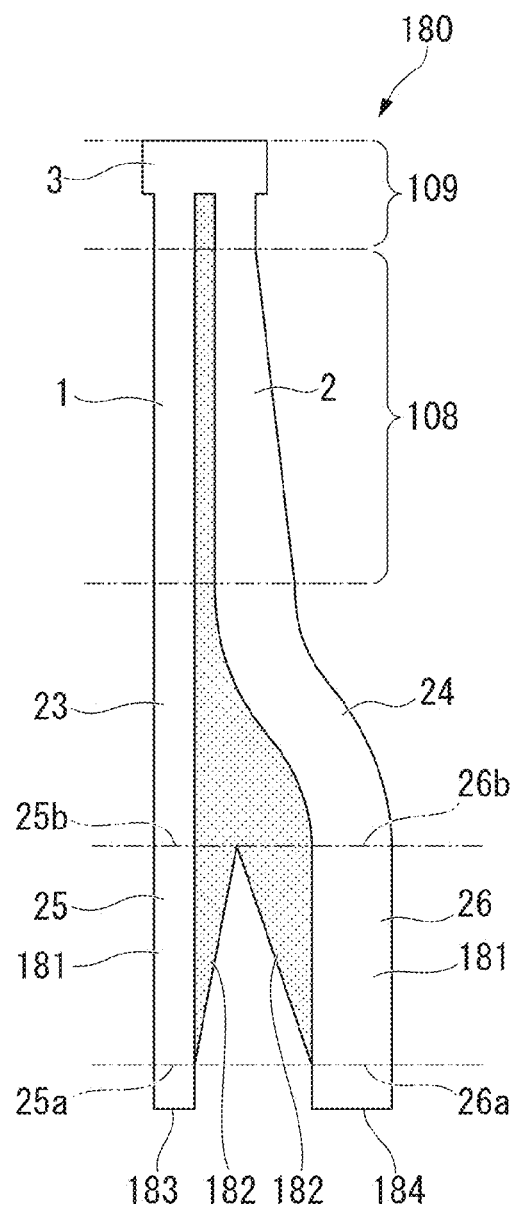
FIG. 56 is a plan view illustrating an example of a planar optical waveguide device having a tapered waveguide.

<Planar Optical Waveguide Device>
FIG. 56 is a plan view illustrating a planar optical waveguide device 180 according to Example 12 of the invention.

The planar optical waveguide device 180 (mode conversion element) has the same configuration as that of the planar optical waveguide device 120 illustrated in FIGS. 44A and 44B except that a first core portion 1 includes a one-side tapered waveguide 25 and a second core portion 2 includes a one-side tapered waveguide 26.

The one-side tapered waveguide 25 is provided on an input side of a linear waveguide 23, and the one-side tapered waveguide 26 is provided on an input side of a bent waveguide 24.

Figure 57A:
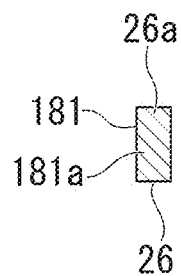
FIG. 57A is a diagram illustrating an example of the tapered waveguide, which is a sectional view of one end thereof.
Figure 57B:
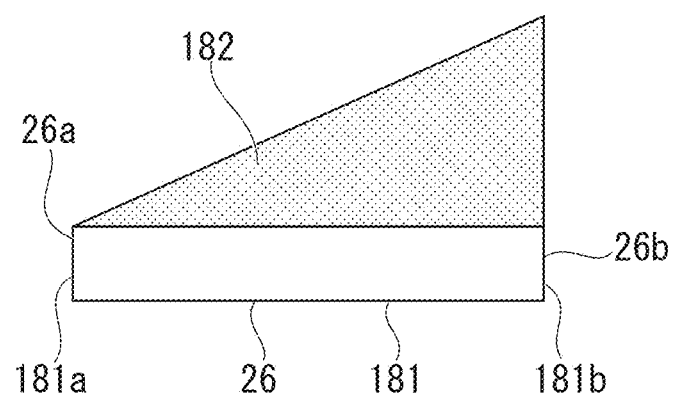
FIG. 57B is a plan view illustrating the example of the tapered waveguide.
Figure 57C:
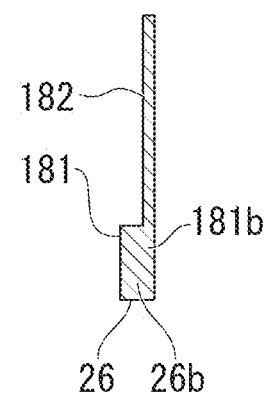
FIG. 57C is a diagram illustrating the example of the tapered waveguide, which is a sectional view of the other end thereof.

FIGS. 57A to 57C are diagrams illustrating an example of the one-side tapered waveguide 26, in which FIG. 57A is a sectional view of an input end, FIG. 57B is a plan view thereof, and FIG. 57C is a sectional view of an output end.

The one-side tapered waveguide 26 includes a rib portion 181, and a slab portion 182 that is formed to extend from the rib portion 181 on one side surface of the rib portion 181.

The rib portion 181 has a uniform width in a length direction.

The slab portion 182 is formed in a tapered shape in which the width gradually increases from one end 181a to the other end 181b in the length direction of the rib portion 181.

Since the slab portion 182 is formed using the end 181a of the rib portion 181 as a starting point, the one-side tapered waveguide 26 is a rectangular waveguide at an input end 26a and is a half-rib waveguide at an output end 26b.

The one-side tapered waveguide 25 may also employ the same structure.

Thus, by using the one-side tapered waveguides 25 and 26, it is possible to smoothly change the waveguide structure in the length direction at connecting portions between the rectangular waveguides 183 and 184 and the half-rib waveguides (linear waveguide 23 and bent waveguide 24), to thereby realize connection with low loss.

Figure 58A:
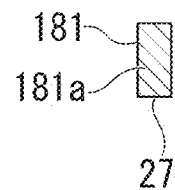
FIG. 58A is a diagram illustrating another example of the tapered waveguide, which is a sectional view of one end thereof.
Figure 58B:
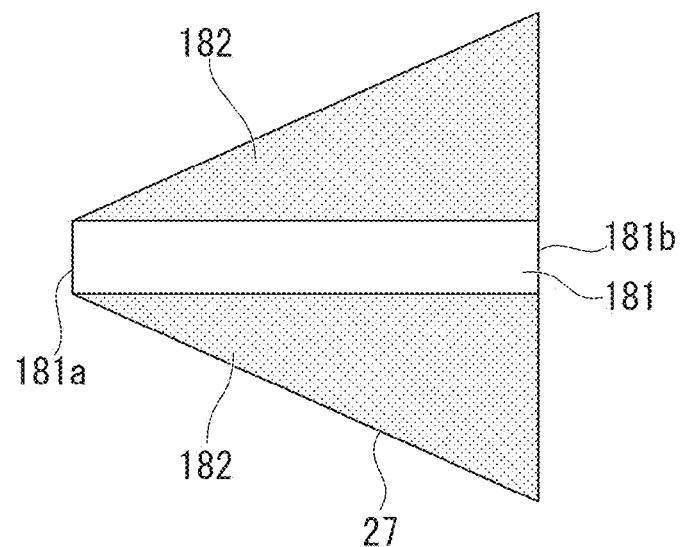
FIG. 58B is a plan view illustrating another example of the tapered waveguide.
Figure 58C:
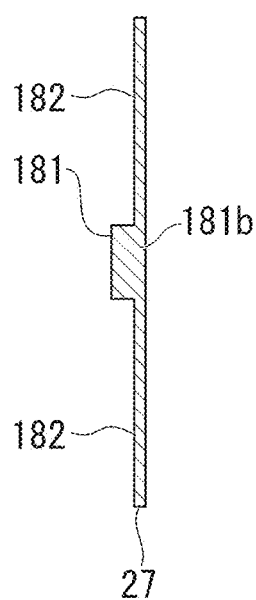
FIG. 58C is a diagram illustrating another example of the tapered waveguide, which is a sectional view of the other end thereof.

In the planar optical waveguide device 180 illustrated in FIG. 56, connection between a half-rib waveguide in which a slab portion is present only one side and a rectangular waveguide is assumed. However, this structure is not particularly limiting, and in the case of connection between a rib waveguide in which a slab portion is present on both sides and a rectangular waveguide, a double-side tapered waveguide 27 illustrated in FIGS. 58A to 58C may be used.

The double-sided tapered waveguide 27 includes a rib portion 181 and a slab portion 182 formed on each of both side surfaces of the rib portion 181.

Since the slab portion 182 is formed using one end 181a as a starting point, the double-side tapered waveguide 27 is a rectangular waveguide at an input end and is a rib waveguide at an output end.

Thus, by using the double-side tapered waveguide 27, it is possible to realize connection with low loss at a connecting portion between an external rectangular waveguide and a rib waveguide in which a slab portion is present on both sides thereof.

Example 13

<Planar Optical Waveguide Device>

Figure 59:
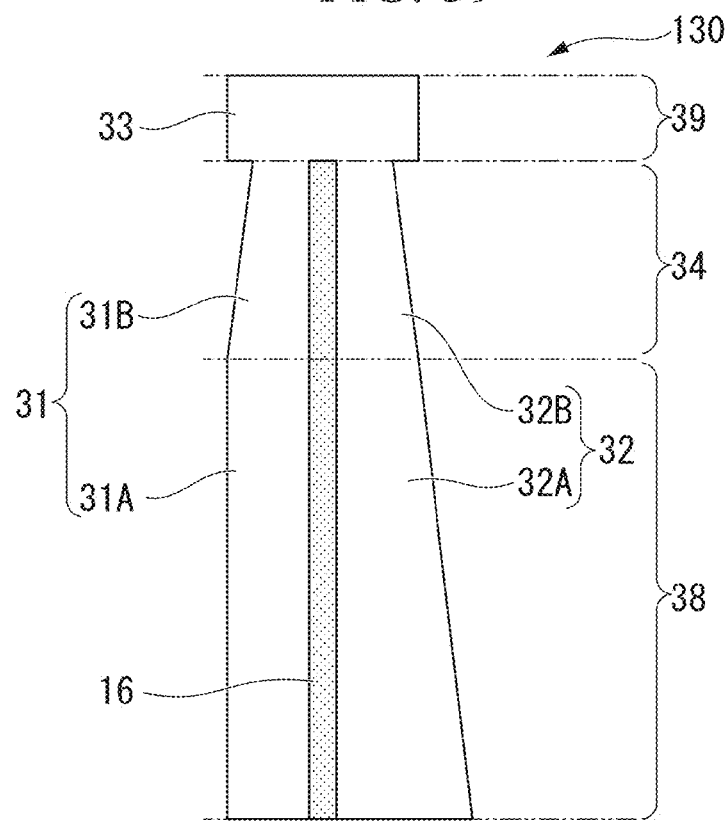
FIG. 59 is a plan view illustrating a fourth example of the planar optical waveguide device having the structure in which the intermediate core portion is provided between the preceding-stage mode conversion section and the subsequent-stage mode conversion section.

FIG. 59 is a plan view illustrating a planar optical waveguide device 130 (mode conversion element) according to Example 13. Example 13 corresponds to a fourth example having a structure in which an intermediate core portion is provided between a preceding-stage mode conversion section and a subsequent-stage mode conversion section.

The planar optical waveguide device 130 has the same configuration as that of the planar optical waveguide device 30 illustrated in FIG. 23 except that a slab portion 16 is formed between core portions 31 and 32.

In the planar optical waveguide device 130, similar to the planar optical waveguide device 30, since an intermediate core portion 34 having a tapered structure is provided, it is possible to connect a preceding-stage mode conversion section 38 and a subsequent-stage mode conversion section 39 with low loss.

Example 14

<Planar Optical Waveguide Device>

Figure 60:
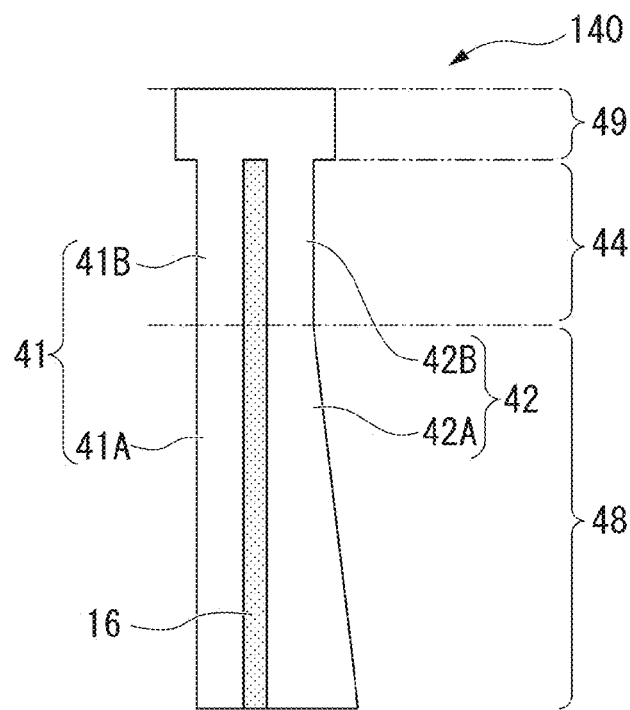
FIG. 60 is a plan view illustrating a fifth example of the planar optical waveguide device having the structure in which the intermediate core portion is provided between the preceding-stage mode conversion section and the subsequent-stage mode conversion section.

FIG. 60 is a plan view illustrating a planar optical waveguide device 140 (mode conversion element) according to Example 14. Example 14 corresponds to a fifth example having a structure in which an intermediate core portion is provided between a preceding-stage mode conversion section and a subsequent-stage mode conversion section.

The planar optical waveguide device 140 has the same configuration as that of the planar optical waveguide device 40 illustrated in FIG. 24 except that a slab portion 16 is formed between core portions 41 and 42.

In the planar optical waveguide device 140, similar to the planar optical waveguide device 40, since an intermediate core portion 44 of a linear shape is provided, it is possible to enhance the degree of freedom in disposition of a subsequent-stage mode conversion section 49.

Example 15

<Planar Optical Waveguide Device>

Figure 61:
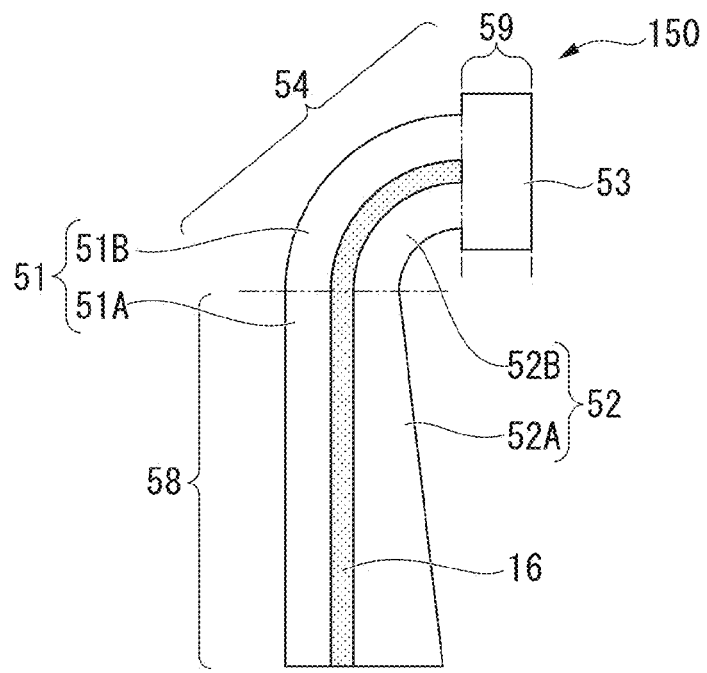
FIG. 61 is a plan view illustrating a sixth example of the planar optical waveguide device having the structure in which the intermediate core portion is provided between the preceding-stage mode conversion section and the subsequent-stage mode conversion section.

FIG. 61 is a plan view illustrating a planar optical waveguide device 150 (mode conversion element) according to Example 15. Example 15 corresponds to a sixth example having a structure in which an intermediate core portion is provided between a preceding-stage mode conversion section and a subsequent-stage mode conversion section.

The planar optical waveguide device 150 has the same configuration as that of the planar optical waveguide device 50 illustrated in FIG. 25 except that a slab portion 16 is formed between core portions 51 and 52.

In the planar optical waveguide device 150, similar to the planar optical waveguide device 50, since an intermediate core portion 54 of a curved shape is provided, it is possible to enhance the degree of freedom in disposition of a subsequent-stage mode conversion section 59.

Example 16

<Planar Optical Waveguide Device>

Figure 62:
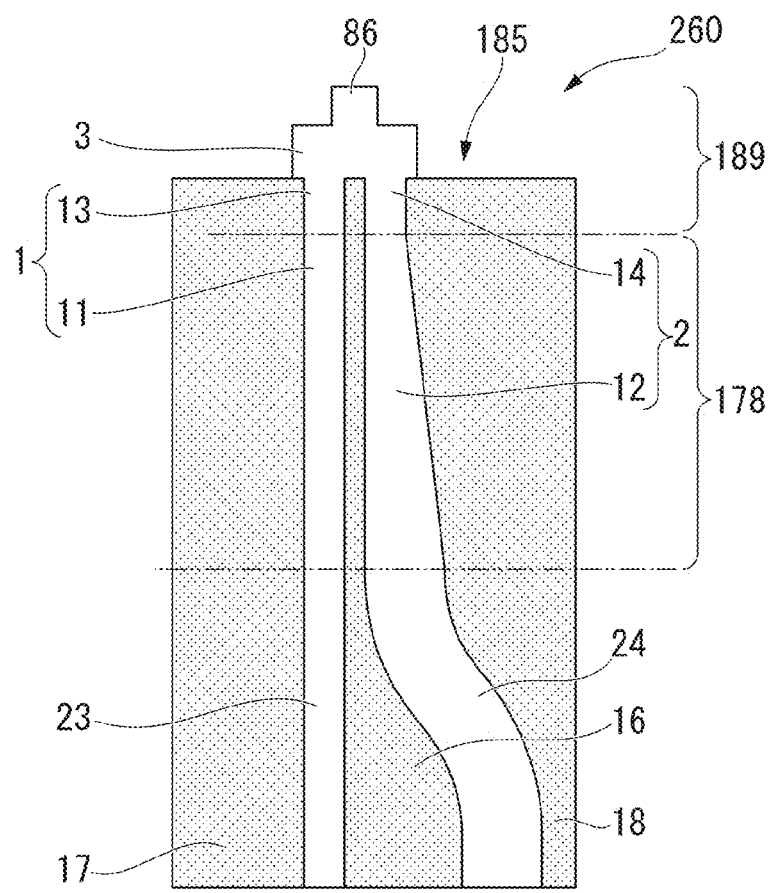
FIG. 62 is a plan view illustrating a planar optical waveguide device using a modification example of a matching coupling element.

FIG. 62 is a plan view illustrating a planar optical waveguide device 260 (mode conversion element) according to Example 16.

The planar optical waveguide device 260 is a planar optical waveguide device that employs a rib waveguide structure, and has the same configuration as that of the planar optical waveguide device 80 illustrated in FIG. 26 except that a core 185 instead of the core 85 is provided.

The core 185 includes a preceding-stage mode conversion section 178 and a subsequent-stage mode conversion section 189, and is different from the planar optical waveguide device 80 illustrated in FIG. 26 in that slab portions 16 to 18 are formed in the core portions 1 and 2.

The subsequent-stage mode conversion section 189 may be used as a 1×2MMI (multi-mode interferometer) since two core portions 13 and 14 are connected to an input side of the output portion 3 and one output-side core portion 86 is connected to an output-side (rear end of the output portion 3).

Example 17

<Planar Optical Waveguide Device (Polarization Conversion Element)>

Figure 63:
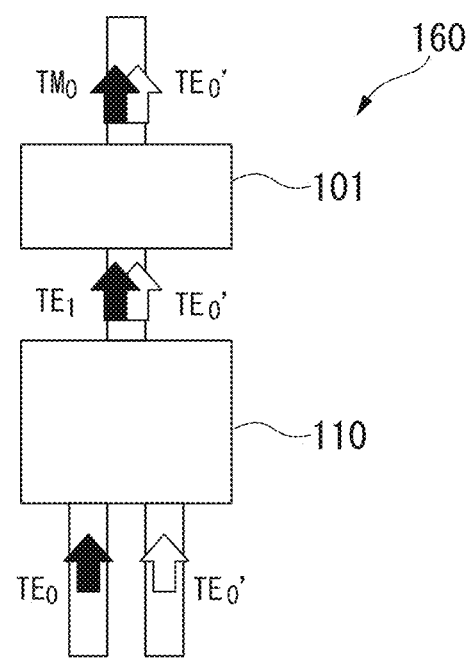
FIG. 63 is a plan view illustrating an example of a planar optical waveguide device (polarization conversion element) using a high-order polarization conversion element.

FIG. 63 is schematic view illustrating a planar optical waveguide device 160 (polarization conversion element) according to Example 17.

The planar optical waveguide device 160 has a configuration in which a high-order polarization conversion element 101 (high-order polarization-converting section) is provided on the output-side of the planar optical waveguide device 110 (mode conversion element) illustrated in FIG. 30A. The high-order polarization conversion refers to conversion between $TE_1$ and $TM_0$.

As the high-order polarization conversion element 101, the high-order polarization conversion element shown in FIG. 28B may be used. Instead of the high-order polarization conversion element 101, the high-order polarization conversion element 61 shown in FIG. 29A may be used.

The planar optical waveguide device 160 in FIG. 63 is capable of converting $TE_0$ into $TE_1$ by the planar optical waveguide device 110, and is capable of converting $TE_1$ into $TM_0$ by the high-order polarization conversion element 101.

Since $TE_0$ is not converted into a separate mode in the high-order polarization conversion element 101, $TE_0$ (written as $TE_0'$ for distinction) inputted to a core portion 2 and output from an output portion 3 is not converted.

Thus, an output obtained by combining $TM_0$ and $TE_0'$ is output from an output-side of the high-order polarization conversion element 101. Accordingly, the planar optical waveguide device 160 can be used as an element for performing polarization multiplexing.

Example 18

<Planar Optical Waveguide Device (Polarization Conversion Element)>

Figure 64A:
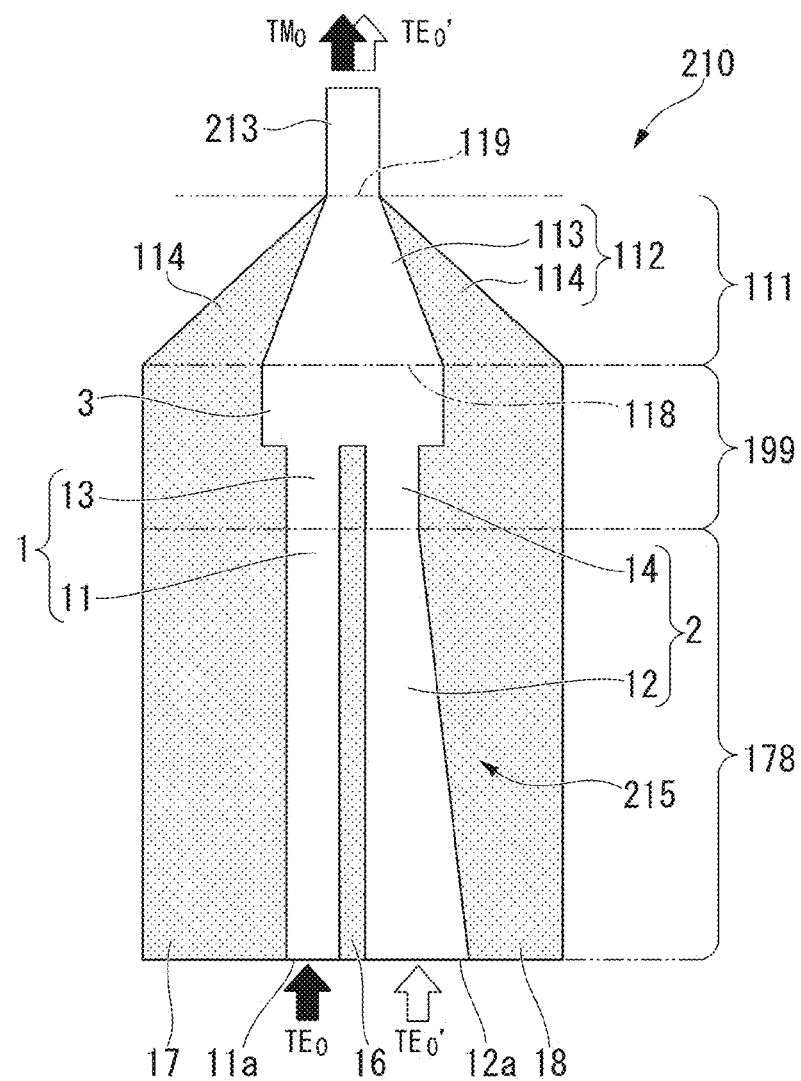
FIG. 64A is an overall plan view illustrating an example of the planar optical waveguide device using the high-order polarization conversion element.
Figure 64B:
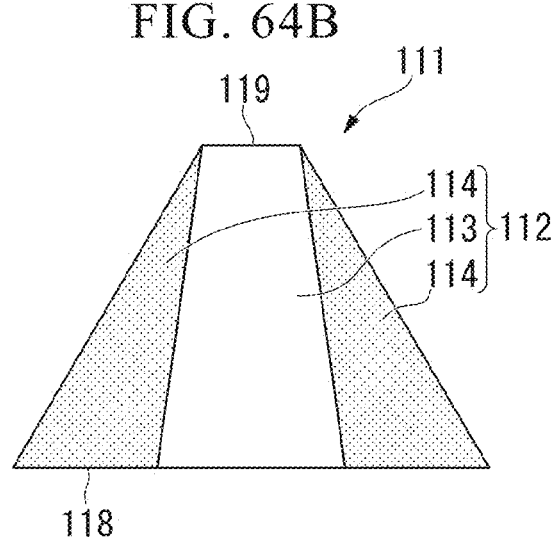
FIG. 64B is a plan view of the high-order polarization conversion element, illustrating the example of the planar optical waveguide device using the high-order polarization conversion element.
Figure 64C:
Figure 64D:

FIGS. 64A and 64B illustrate a planar optical waveguide device 210 (polarization conversion element) according to Example 18, in which FIG. 64A is an overall plan view thereof, FIG. 64B is a plan view of the high-order polarization conversion element, FIG. 64C is a sectional view of an ending portion of the high-order polarization conversion element, and FIG. 64D is a sectional view of a starting portion of the high-order polarization conversion element.

A core 215 of the planar optical waveguide device 210 includes a preceding-stage mode conversion section 178 and a subsequent-stage mode conversion section 199.

The planar optical waveguide device 210 includes a high-order polarization conversion element 111 (high-order polarization-converting section) on an output-side of the subsequent-stage mode conversion section 199.

As shown in FIG. 64A, the preceding-stage mode conversion section 178 and the subsequent-stage mode conversion section 199 may be formed to be the same as the preceding-stage mode conversion section and the subsequent-stage mode conversion section used in the planar optical waveguide device 190 illustrated in FIGS. 54A to 54C.

As shown in FIGS. 64B to 64D, in a high-order polarization conversion element 111, a core 112 is formed by a lower core 114 and an upper core 113, and the upper core 113 and the lower core 114 are formed in a tapered shape in which the widths continuously decrease in a light waveguide direction.

The core 112 has an asymmetric structure in a height direction, in which the width of the upper core 113 and the width of the lower core 114 are different from each other.

The lower core 114 may be integrally formed with slab portions 17 and 18 of the subsequent-stage mode conversion section 199.

The high-order polarization conversion element 111 may perform polarization conversion between $TE_1$ of a starting portion 118 and $TM_0$ of an ending portion 119.

The planar optical waveguide device 210 is capable of converting $TE_0$ into $TE_1$ by the preceding-stage mode conversion section 178 and the subsequent-stage mode conversion section 199, and is capable of converting $TE_1$ into $TM_0$ by the high-order polarization conversion element 111.

$TE_0$ (written as $TE_0'$ for distinction) which is input to the core portion 2 and is input to the high-order polarization conversion element 111 is not converted.

Thus, an output obtained by combining $TM_0$ and $TE_0'$ is input from an output-side of the high-order polarization conversion element 111 to an output portion 213 which is a rectangular waveguide.

Accordingly, the planar optical waveguide device 210 can be used as an element for performing polarization multiplexing.

Since the planar optical waveguide device 210 includes the subsequent-stage mode conversion section 199 that employs a rib waveguide structure, it is possible to perform connection to the high-order polarization conversion element 111 having an asymmetric structure with low loss.

Example 19

<Planar Optical Waveguide Device (Polarization Conversion Element)>

Figure 65:
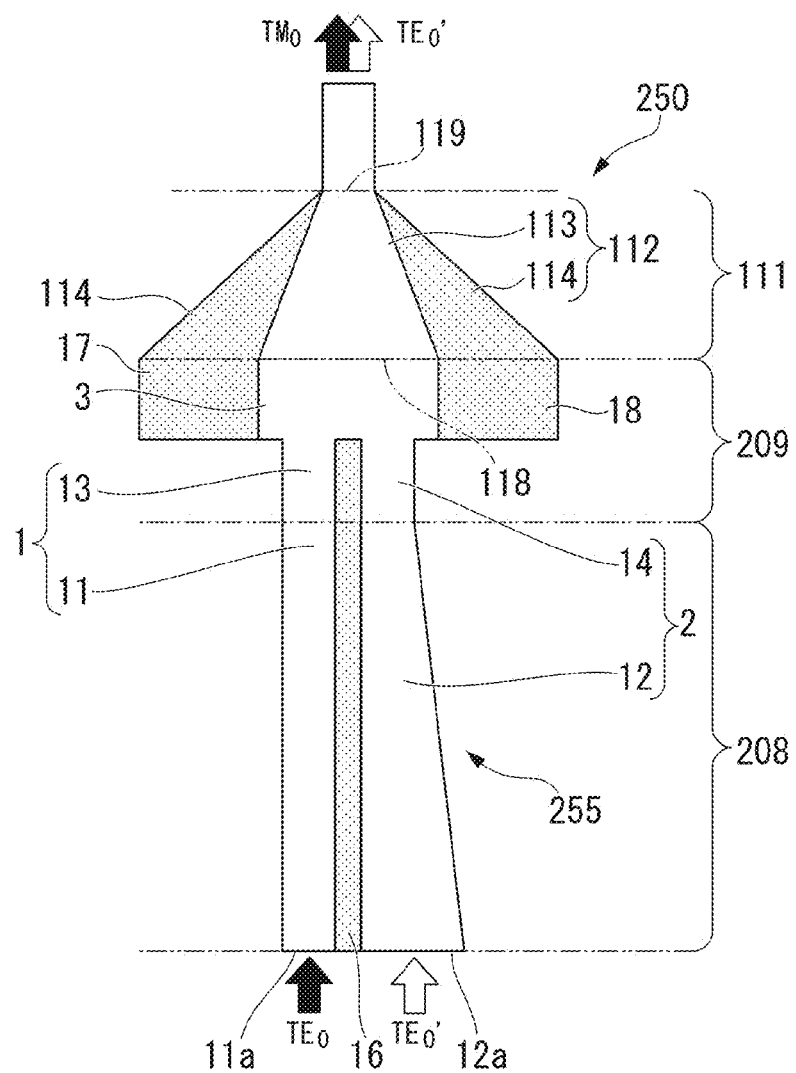

FIG. 65 is a plan view illustrating a planar optical waveguide device 250 (polarization conversion element) according to Example 19.

The planar optical waveguide device 250 has the same configuration as that of the planar optical waveguide device 210 illustrated in FIGS. 64A to 64D except that a core 255 instead of the core 195 is provided.

A subsequent-stage mode conversion section 209 of the core 255 is different from the subsequent-stage mode conversion section 199 in FIGS. 64A to 64D in that slab portions 17 and 18 (outer extension regions) are formed in an output portion 3 but the slab portions 17 and 18 are not present in core portions 1 and 2.

A preceding-stage mode conversion section 208 of the core 205 is different from the preceding-stage mode conversion section 178 in FIGS. 64A to 64D in that the slab portions 17 and 18 are not present in core portions 11 and 12.

The preceding-stage mode conversion section 208 and the subsequent-stage mode conversion section 209 may have the same configuration as in the preceding-stage mode conversion section and the subsequent-stage mode conversion section used in the planar optical waveguide device 200 illustrated in FIGS. 55A to 55C.

The planar optical waveguide device 250 is capable of converting $TE_0$ into $TE_1$ by the preceding-stage mode conversion section 208 and the subsequent-stage mode conversion section 209, and is capable of converting $TE_1$ into $TM_0$ by the high-order polarization conversion element 111.

$TE_0$ (written as $TE_0'$ for distinction) which is input to the core portion 2 and is input to the high-order polarization conversion element 111 is not converted.

Thus, an output obtained by combining $TM_0$ and $TE_0'$ is input from an output-side of the high-order polarization conversion element 111 to an output portion 213 which is a rectangular waveguide.

Accordingly, the planar optical waveguide device 250 can be used as an element for performing polarization multiplexing.

Example 20

<Polarization Multiplexing 4-Value Phase (Dual Polarization-Quadrature Phase Shift Keying (DP-QPSK)) Modulator>

The planar waveguide device of the invention may be used, for example, for a DP-QPSK modulator disclosed in P. Dong, C. Xie, L. Chen, L. L. Buhl, and Y.-K. Chen, "112-Gb/s Monolithic PDM-QPSK Modulator in Silicon," in European Conference and Exhibition on Optical Communication (2012), Vol. 1, p. Th. 3. B. 1.

Figure 66:
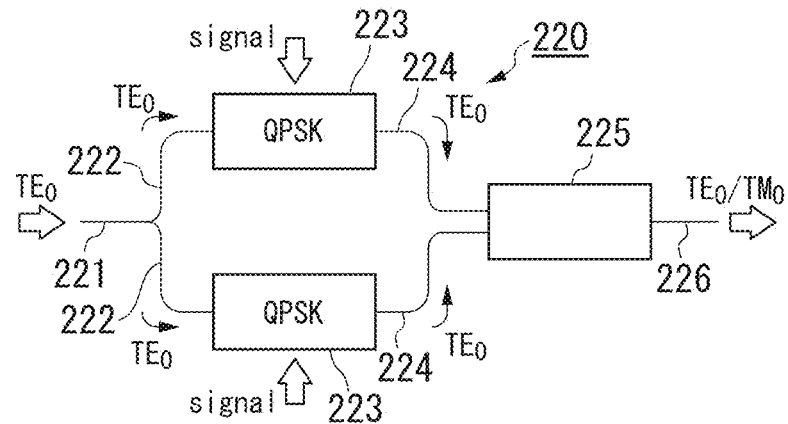

FIG. 66 is a diagram schematically illustrating an example of a DP-QPSK modulator.

A DP-QPSK modulator 220 performs DP-QPSK modulation having a QPSK signal independent of both modes of $TE_0$ and $TM_0$ using the fact that two modes of $TE_0$ and $TM_0$ can be present in a normal optical waveguide.

Specifically, the DP-QPSK modulator 220 splits light input in the $TE_0$ mode from an input section 221 into two optical waveguides 222 and 222, and modulates the split light components into QPSK signals using QPSK modulators 223 and 223, respectively. Then, the DP-QPSK modulator 220 converts $TE_0$ of one of optical waveguides 224 and 224 into $TM_0$ by a polarization conversion element 225, combines the two modes on the same optical waveguide using a polarization beam combiner, and then, outputs signals independent of $TE_0$ and $TM_0$ to an output portion 226.

Example 21

<Coherent Receiver>

A planar optical waveguide device according to this example may be used, for example, for a polarization diversity coherent receiver on an Si optical waveguide of a polarization multiplexing signal through which $TE_0$ and $TM_0$ are simultaneously transmitted, as disclosed in C. Doerr, et al., "Packaged Monolithic Silicon 112-Gb/s Coherent Receiver," IEEE Photonics Technology Letters. Vol. 23, p.p. 762, 2011.

Figure 67:
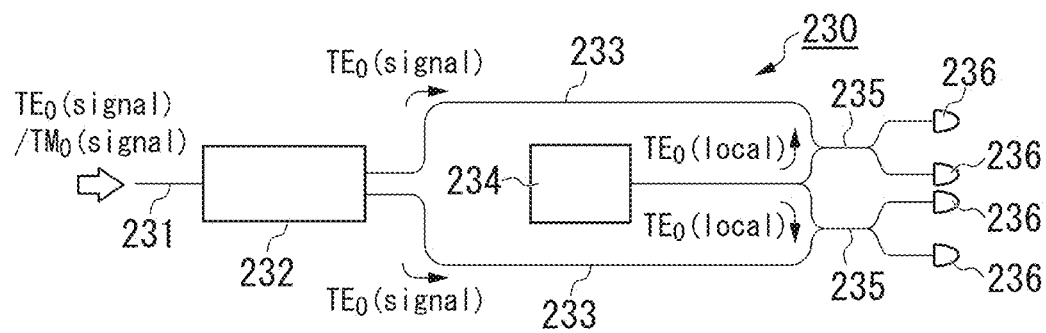

FIG. 67 is a diagram schematically illustrating an example of a polarization diversity coherent receiver.

In a coherent receiver 230, an optical waveguide 231 of a polarization multiplexing signal through which $TE_0$ and $TM_0$ are simultaneously transmitted is connected to a polarization conversion element 232 capable of simultaneously performing polarization conversion and polarization beam splitter, and a signal in $TE_0$ is input to one of optical waveguides 233 and 233 and a signal in $TE_0$ converted from $TM_0$ is input to the other one of the optical waveguides 233 and 233. As a local light-emitting section 234, a semiconductor laser light source, which is generally used, uses only a single polarized wave, for example, an output in $TE_0$ (local). In a case where such a light source is used, in the related art, it is necessary to perform polarization conversion of local light emission.

However, in the coherent receiver 230, since any signal light after polarization separation becomes a $TE_0$ signal (signal), it is not necessary to perform polarization conversion of local light emission. Signal light and local light emission unit are output from a coupling section 236 through an optical multiplexing section 235.

In a case where an optical waveguide type structure is used in the polarization conversion element 232, light coupling with the outside of an element in the coupling section 236 may be performed using a coupler that does not have a polarization split function, such as a reverse taper type mode field converter in which coupling is performed from a lateral side of a substrate. The coupler may employ a reverse taper type structure disclosed in Qing Fang, et al., "Suspended optical fiber-to-waveguide mode size converter for Silicon photonics", OPTICS EXPRESS, Vol. 18, No. 8, 7763 (2010), for example.

Example 22

<Polarization Diversity>

A planar optical waveguide device according to this example may be used for executing a polarization diversity method in a case where an element for assigning the same operation is to be used with respect to both modes in polarization multiplexing transmission in which $TE_0$ and $TM_0$ are simultaneously transmitted or in random transmission of one polarization, as disclosed in Hiroshi Fukuda, et al., "Silicon photonic circuit with polarization diversity," Optics Express, Vol. 16, No. 7, 2008, for example.

Figure 68:
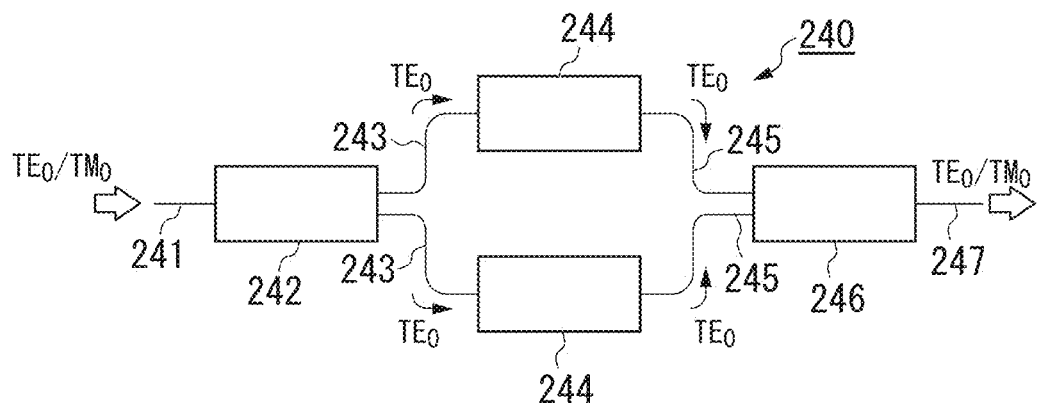

In a polarization diversity 240 shown in FIG. 68, an optical waveguide 241 of a polarization multiple signal through which $TE_0$ and $TM_0$ are simultaneously transmitted is connected to a polarization conversion element 242 capable of simultaneously performing polarization conversion and polarization beam splitter. Further, a signal in $TE_0$ is input to one of the optical waveguides 243 and 243 and a signal in $TE_0$ converted from $TM_0$ is input to the other one of the optical waveguides 243 and 243. Signal light components in $TE_0$ operated by elements 244 and 244 are combined by a polarization conversion element 246 from optical waveguides 245 and 245, and are output to an optical waveguide 247 of a polarization multiple signal through which $TE_0$ and $TM_0$ are simultaneously transmitted.

Similar to the polarization diversity coherent receiver, the polarization conversion element according to the present embodiment capable of simultaneously performing polarization conversion and polarization beam splitter may be used as the polarization conversion element 242.

Further, similar to the DP-QPSK modulator, the polarization conversion element according to the present embodiment capable of simultaneously performing polarization conversion and polarization beam combiner may be used as the polarization conversion element 246.

The invention is not limited to the above-described embodiments, and various modifications may be made in a range without departing from the concept of the invention.

What is claimed is:

1. A planar optical waveguide device, comprising:
a substrate; and
an optical waveguide that comprises a core and a cladding, the core including a first core portion and a second core portion that are disposed in parallel on the substrate, the cladding having a refractive index smaller than that of the core,
wherein the core forms a preceding-stage mode conversion section and a subsequent-stage mode conversion section, the preceding-stage mode conversion section being configured to convert a mode of input light, the subsequent-stage mode conversion section being configured to convert a mode of light output from the preceding-stage mode conversion section,
wherein sectional shapes of the first core portion and the second core portion are not congruent with each other at an input end of the preceding-stage mode conversion section, the sectional shape or size of at least one core is continuously changed along a light waveguide direction, and sectional shapes of the first core portion and the second core portion are congruent with each other at an output end of the preceding-stage mode conversion section,
wherein the subsequent-stage mode conversion section includes an output portion to which the first core portion and the second core portion are connected with a gap being provided therebetween in a width direction,
wherein at a connection end at which the first core portion and the second core portion are connected to the output portion, the center of the output portion in the width direction and the center of a width directional range including the first core portion, the second core portion, and a gap between the first core portion and the second core portion match each other,
wherein at the connection end, a width of the output portion is larger than a sum of a width of the first core portion, a width of the second core portion, and the gap between the first core portion and the second core portion, and
wherein only at the connection end, the subsequent-stage mode conversion section is configured to convert the mode of the light.

2. A planar optical waveguide device, comprising:
a substrate; and
an optical waveguide that comprises a core and a cladding, the core including a first core portion and a second core portion that are disposed in parallel on the substrate, the cladding having a refractive index smaller than that of the core,
wherein the core forms a preceding-stage mode conversion section and a subsequent-stage mode conversion section, the preceding-stage mode conversion section being configured to convert a mode of input light, the subsequent-stage mode conversion section being configured to convert a mode of light output from the preceding-stage mode conversion section, wherein sectional shapes of the first core portion and the second core portion are not congruent with each other at an input end of the preceding-stage mode conversion section, the sectional shape or size of at least one core is continuously changed along a light waveguide direction, and sectional shapes of the first core portion and the second core portion are congruent with each other at an output end of the preceding-stage mode conversion section, wherein the subsequent-stage mode conversion section includes an output portion to which the first core portion and the second core portion are connected with a gap being provided therebetween in a width direction, wherein at a connection end at which the first core portion and the second core portion are connected to the output portion, the center of the output portion in the width direction and the center of a width directional range including the first core portion, the second core portion, and a gap between the first core portion and the second core portion match each other, wherein the core further comprises a slab portion that extends in the width direction of the first core portion and the second core portion, wherein the slab portion has a height dimension smaller than those of the first core portion and the second core portion, is provided at least between the first core portion and the second core portion, and is formed to connect the first core portion and the second core portion, and wherein only at the connection end, the subsequent-stage mode conversion section is configured to convert the mode of the light.

3. The planar optical waveguide device according to claim 2, wherein the slab portion has an outer extension region that is formed to extend outward in the width direction from each of the first core portion and the second core portion.

4. The planar optical waveguide device according to claim 2, wherein the slab portion has an outer extension region that is formed to extend outward in the width direction from the output portion.

5. The planar optical waveguide device according to claim 2, wherein the slab portion does not have a portion that is formed to extend outward in the width direction from the first core portion and the second core portion.

6. The planar optical waveguide device according to claim 1, wherein the first core portion, the second core portion and the output portion have rectangular sections vertical to the light waveguide direction.

7. The planar optical waveguide device according to claim 1, wherein in the preceding-stage mode conversion section, the heights of the first core portion and the second core portion are same, and the width of the first core portion having a larger section than that of the second core portion at the input end continuously decreases along the light waveguide direction so that the sectional shapes of the first core portion and the second core portion are congruent with each other at the output end.

8. The planar optical waveguide device according to claim 1, wherein the preceding-stage mode conversion section is configured to convert $TE_0$ into an odd mode which is a super mode of $TE_0$, and wherein the subsequent-stage mode conversion section is configured to convert the odd mode which is the super mode into $TE_1$.

9. The planar optical waveguide device according to claim 1, wherein the core includes a bent waveguide formed by bending at least one of the first core portion and the second core portion in a planar view on an input side of the preceding-stage mode conversion section, and wherein in the bent waveguide, the first core portion and the second core portion become closer to each other as a distance to the preceding-stage mode conversion section becomes shorter.

10. The planar optical waveguide device according to claim 1, further comprising:

an intermediate core portion that is provided between the preceding-stage mode conversion section and the subsequent-stage mode conversion section and connects the preceding-stage mode conversion section and the subsequent-stage mode conversion section.

11. The planar optical waveguide device according to claim 1, wherein the core is formed of Si, and the cladding is formed of $SiO_2$.

12. The planar optical waveguide device according to claim 1, further comprising:

a high-order polarization-converting section that is connected to an output-side of the subsequent-stage mode conversion section and is capable of converting $TE_1$ obtained in the subsequent-stage mode conversion section into $TM_0$.

13. A polarization multiplexing 4-value phase modulator comprising the planar optical waveguide device according to claim 1.

14. A coherent receiver comprising the planar optical waveguide device according to claim 1.

15. A polarization diversity comprising the planar optical waveguide device according to claim 1.

* * * * *